(12) United States Patent
Yoshida et al.

(10) Patent No.: US 10,725,399 B2
(45) Date of Patent: Jul. 28, 2020

(54) DEVELOPER CONTAINER, DEVELOPING APPARATUS, PROCESS CARTRIDGE, IMAGE FORMING APPARATUS, AND MANUFACTURING METHOD OF DEVELOPER CONTAINER

(71) Applicant: CANON KABUSHIKI KAISHA, Tokyo (JP)

(72) Inventors: Masatomi Yoshida, Kawasaki (JP); Tsukasa Abe, Yokohama (JP); Kazuhiro Tenyaku, Kawasaki (JP); Kazuhiko Abe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/371,253

(22) Filed: Apr. 1, 2019

(65) Prior Publication Data

US 2019/0302650 A1 Oct. 3, 2019

(30) Foreign Application Priority Data

Apr. 3, 2018 (JP) ................................. 2018-071758

(51) Int. Cl.
*G03G 15/08* (2006.01)
*B29C 65/08* (2006.01)
*G03G 21/18* (2006.01)

(52) U.S. Cl.
CPC ......... *G03G 15/0877* (2013.01); *B29C 65/08* (2013.01); *G03G 15/086* (2013.01); *G03G 21/181* (2013.01)

(58) Field of Classification Search
CPC ............. G03G 15/086; G03G 15/0877; G03G 21/181; B29C 65/08
See application file for complete search history.

(56) References Cited

U.S. PATENT DOCUMENTS

| 9,658,566 B2 | 5/2017 | Shindo et al. | |
| 2012/0148271 A1* | 6/2012 | Fukita | G03G 15/0856 399/27 |
| 2015/0016838 A1* | 1/2015 | Nishino | G03G 21/1821 399/111 |
| 2016/0246251 A1* | 8/2016 | Satomura | G03G 21/181 |

FOREIGN PATENT DOCUMENTS

| JP | 2015087747 A | 5/2015 |
| JP | 2016142790 A | 8/2016 |

* cited by examiner

*Primary Examiner* — Gregory H Curran
(74) *Attorney, Agent, or Firm* — Rossi, Kimms & McDowell LLP

(57) ABSTRACT

A developer container includes: an accommodating portion which has a first frame and a second frame and is configured to accommodate a developer; and a conductive sheet. The second frame has a joining surface for joining the second frame to the conductive sheet, the first frame and the second frame share an uneven fitting portion where the first frame and the second frame fit with each other in a direction of intersecting the joining surface, the uneven fitting portion has a contact face where the first frame and the second frame are being in contact with each other, a gap is formed by the first frame, the second frame and the conductive sheet, and the contact face is a face facing the gap and being disposed in a direction along the joining surface.

14 Claims, 38 Drawing Sheets

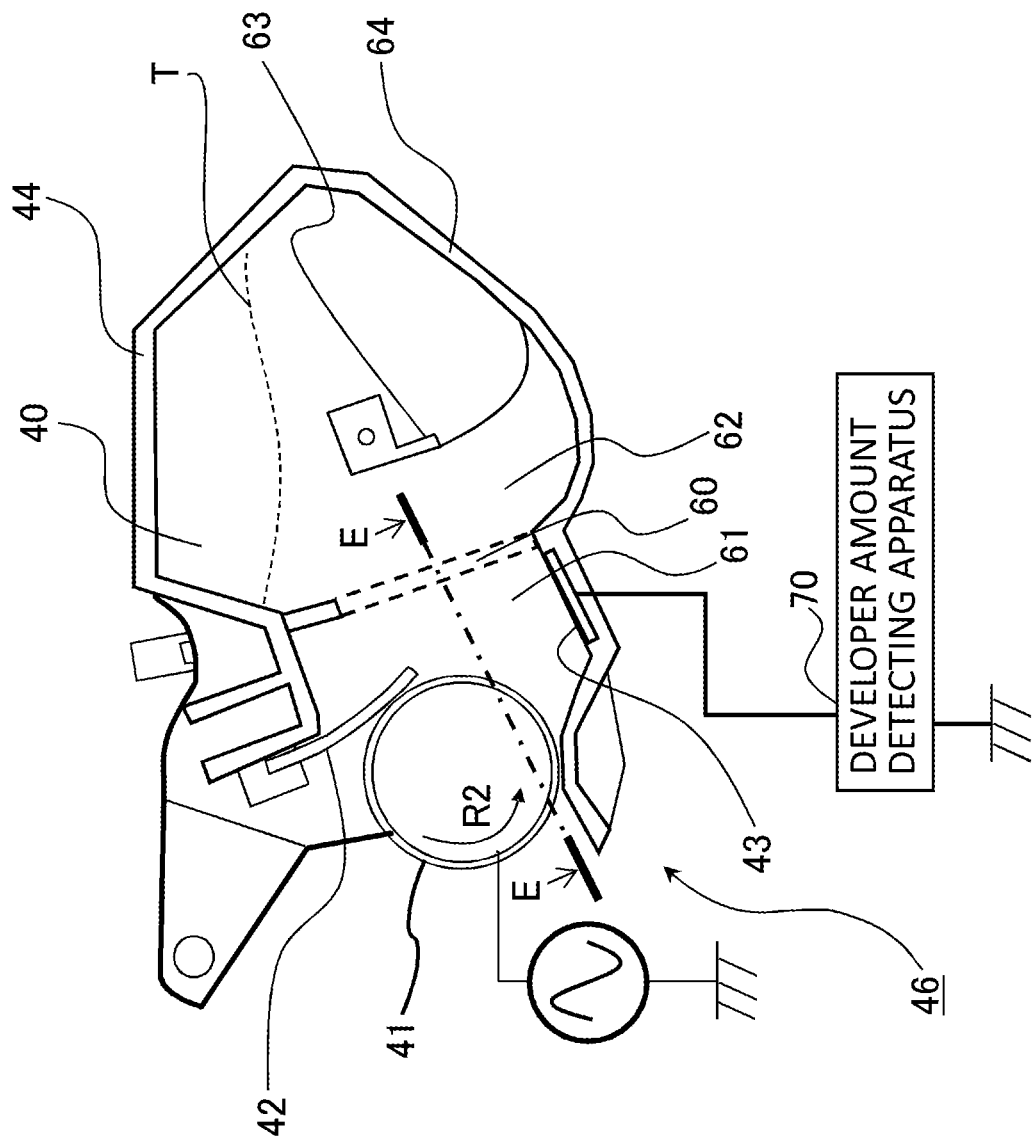

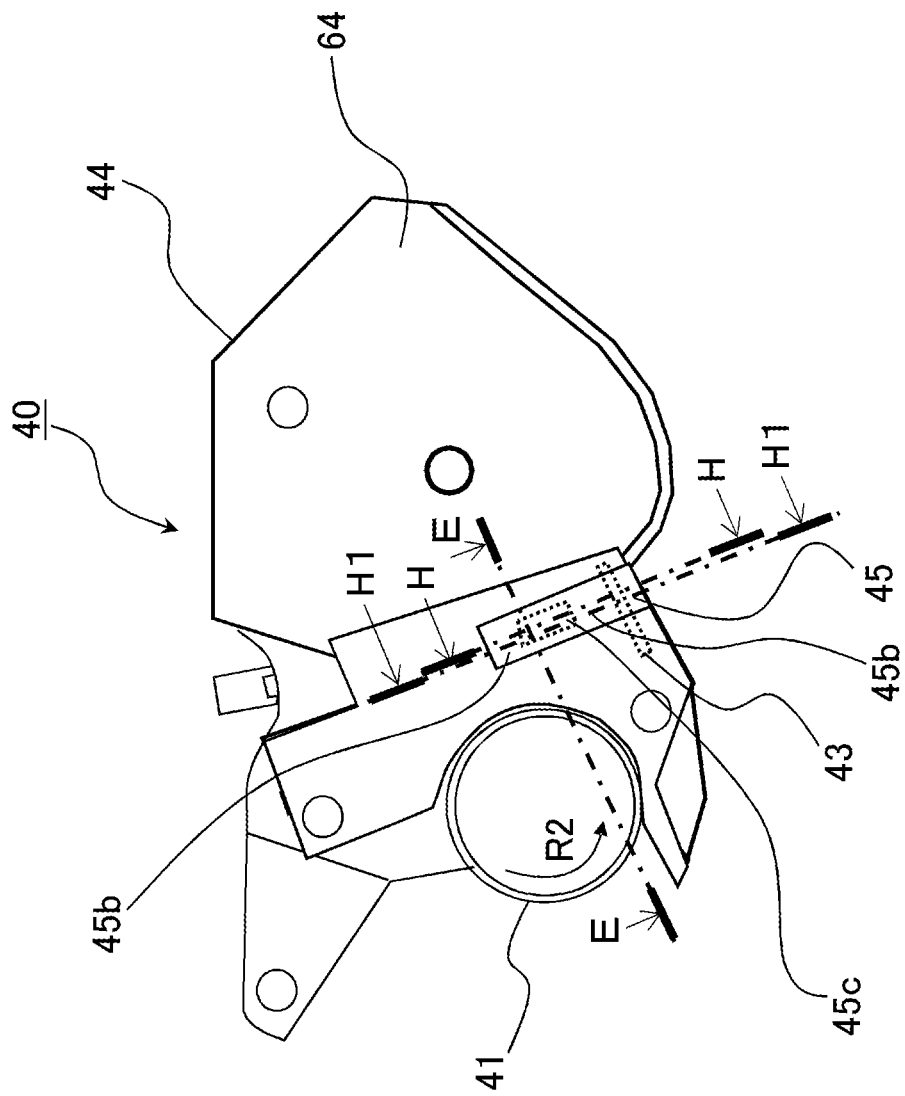

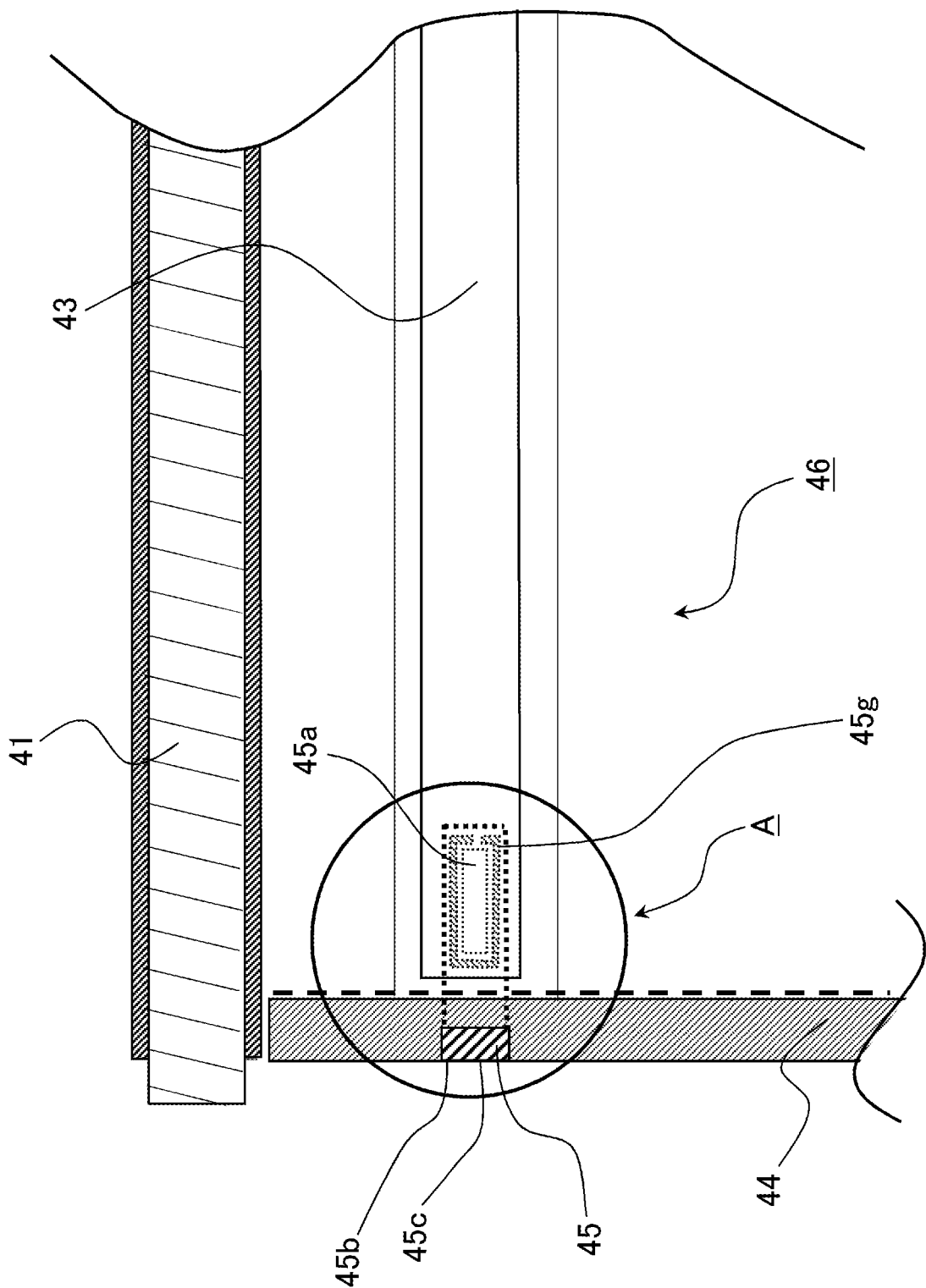

DEVELOPER CONTAINER, DEVELOPING APPARATUS, PROCESS CARTRIDGE, IMAGE FORMING APPARATUS, AND MANUFACTURING METHOD OF DEVELOPER CONTAINER

BACKGROUND OF THE INVENTION

Field of the Invention

The present invention relates to: a developer container which accommodates a developer to form an image on a recording medium; and a developing apparatus which develops an electrostatic latent image formed on a photosensitive drum. The present invention also relates to: a process cartridge which forms a developer image on a photosensitive drum and is detachable from the main body of an image forming apparatus; and an image forming apparatus which forms an image on a recording medium using developer.

Description of the Related Art

In an image forming apparatus using electrophotographic technology, a photosensitive drum is uniformly charged by a charging roller when an image is formed on a recording material. Then the charged photosensitive drum is selectively exposed by an exposing apparatus, so that an electrostatic latent image is formed on the photosensitive drum. The electrostatic latent image formed on the photosensitive drum is developed by a developing apparatus using toner, whereby a toner image is formed. The toner image formed on the photosensitive drum is transferred to a recording material, such as a recording paper and plastic sheet, and the toner image transferred onto the recording material is heated and pressed by a fixing apparatus, so as to be fixed to the recording material. Thus an image is formed on the recording material. After the toner image is transferred to the recording material, toner remaining on the photosensitive drum is removed by a cleaning blade.

Conventionally a technique of disposing a pair of electrodes inside a developer container is known, in order to measure the residual amount of toner accommodated in the developer container of the developing apparatus. According to this technique, the residual amount of toner in the developer container is measured by measuring an electrostatic capacitance between the electrodes disposed inside the developer container.

According to a technique disclosed in Japanese Patent Application Publication No. 2016-142790, an electrode to measure the residual amount of toner in a developer container is integrated with a frame constituting a developer container of the developing apparatus. In concrete terms, according to a technique disclosed in Japanese Patent Application Publication No. 2016-142790, the electrode to measure the residual amount of toner is a sheet type electrode, and a part of the sheet type electrode is embedded in the wall surface of the frame, so that the electrodes are partially exposed to the inside and outside of the frame respectively. Thereby a configuration of a conductive path to electrically connect the electrode to measure the residual amount of toner in the developer container, and the apparatus to measure the residual amount of toner, is simplified.

According to a technique disclosed in Japanese Patent Application Publication No. 2015-087747 as well, an electrode to measure the residual amount of toner in the developer container is integrated with a frame constituting the developer container of the developing apparatus. In the case of the technique disclosed in Japanese Patent Application Publication No. 2015-087747, the electrode to measure the residual amount of toner are made of conductive resin. Further, just like the technique disclosed in Japanese Patent Application Publication No. 2016-142790, a part of the electrode is embedded in the wall surface of the frame, so that the electrode is partially exposed to the inside and outside of the frame respectively. In concrete terms, the electrode is integrated with the frame by injecting conductive resin into a space formed in the frame.

Here a technique combining the technique disclosed in Japanese Patent Application Publication No. 2016-142790 and a technique disclosed in Japanese Patent Application Publication No. 2015-087747 will be considered. In concrete terms, according to this combined technique, a conductive sheet and a frame are integrated by adhering the conductive sheet to the frame made of resin, and a conductive resin is injected into a space between the frame integrated with the conductive sheet and a mold. The conductive sheet and the conductive resin are assumed to be electrically connected. The electrodes to measure the residual amount of toner are the conductive sheet and the conductive resin. This can simplify the configuration of the conductive path to electrically connect the electrodes to measure the residual amount of toner in the developer container and the apparatus to measure the residual amount of toner. Additionally, the design of the electrodes and the conductive path becomes more flexible.

Specifically, in this combining technique, the frame constituting the developer container includes a first resin portion which is made of a first resin, and a second resin portion which is made of a second resin having conductivity. The inner wall face of an accommodating portion which accommodates the developer in the frame is constituted by a first resin portion and a second resin portion, and one surface of the conductive sheet contacts the first resin portion and the second resin portion along the internal wall surface of the accommodating portion.

Further, a region in the first resin portion, to which the conductive sheet is adhered, and the second resin portion to which the conductive sheet member is adhered, are adjacent to each other. Furthermore, the electrodes to measure the residual amount of toner (inside the developer container) and the apparatus to measure the residual amount of toner (outside the developer container) are disposed such that the electrical connection is easier. Therefore a conducting portion, which electrically connects the conductive sheet and the conductive resin, is disposed near the edge of the conductive sheet.

A method of manufacturing the developer container according to this combined technique will be described next. To manufacture the developer container according to this technique, the conductive sheet is adhered to the first resin portion by injecting a molten resin into a mold in a state of contacting the sheet to the mold. Then the conductive sheet, the first resin portion and the second resin portion are integrally molded by injecting a second resin into a space created by the conductive sheet, the first resin portion and the mold.

SUMMARY OF THE INVENTION

However, in the case of the developer container based on the above-mentioned combined technique and the manufacturing method thereof, the following problems may occur: the first resin is injected in the first step and the second resin is injected in the second step. Therefore at a boundary between the first resin portion where the resin starts to shrink in the first step and the second resin portion where the resin starts to shrink in the second step, the timing of the start of the shrinking of the resin in each resin portion may deviate, and a gap may be generated at the boundary. And if a gap is generated at the boundary between the first resin portion and the second resin portion, an edge of the conductive sheet may peel off from the first resin portion when the developer container is subject to impact during transportation, for example. In this case, the inside and outside of the developer container may come into contact via the gap and the peeled portion of the conductive sheet. This may result in leakage of the developer from the developer container. If developer leaks out, not only the exterior of the developer container, but also the exterior of the process cartridge and the inside of the image forming apparatus may be contaminated by the developer. Then when the user attaches/detaches the developer container or the process cartridge, the hands of the user may become soiled by the developer that leaked from the developer container, creating problems with operation by the user.

With the foregoing in view, it is an object of the present invention to provide a technique to apply to the developer container, that can detect the residual amount of toner inside the developer container, to reduce the possibility of leakage from the developer to the outside of the developer container.

In order to achieve the object described above, a developer container comprising according to the present invention including:

an accommodating portion which includes a first frame formed of a first resin and a second frame formed of a second resin having conductivity and is configured to accommodate a developer; and a conductive sheet having conductivity, wherein the conductive sheet is disposed on an inner wall face of the accommodating portion, the second frame has a joining surface for joining the second frame to the conductive sheet, the first frame and the second frame share an uneven fitting portion where the first frame and the second frame fit with each other in a direction of intersecting the joining surface, the uneven fitting portion has a contact face where the first frame and the second frame are being in contact with each other, a gap is formed by the first frame, the second frame and the conductive sheet, and the contact face is a face facing the gap and being disposed in a direction along the joining surface.

In order to achieve the object described above, a developer according to the present invention including:

the above-mentioned developer container, wherein an electrostatic latent image formed on an image bearing member is developed using the developer accommodated in the accommodating portion.

In order to achieve the object described above, a process cartridge according to the present invention including:

the above-mentioned developer container; and an image bearing member on which a developer image is to be formed, wherein the developer image is formed on the image bearing member using the developer accommodated in the accommodating portion.

In order to achieve the object described above, an image forming apparatus according to the present invention including:

the above-mentioned developer container; and an image bearing member on which a developer image is to be formed, wherein a developer image is formed on the image bearing member using the developer accommodated in the accommodating portion, and an image is formed on a recording medium using the developer image formed on the image bearing member.

In order to achieve the object described above, a manufacturing method of a developer container that includes an accommodating portion, the accommodating portion including a first frame formed of a first resin and a second frame formed of a second resin having conductivity and being configured to accommodate a developer, and a conductive sheet having conductivity, the manufacturing method including:

forming the first frame integrally with the conductive sheet by injecting the first resin into a mold in which the conductive sheet is fixed; and forming the second frame integrally with the conductive sheet and the first frame by injecting the second resin into a mold in which the conductive sheet and the first frame are fixed, wherein the second frame has a joining surface for joining the second frame to the conductive sheet, the first frame and the second frame share an uneven fitting portion where the first frame and the second frame fit with each other in a direction of intersecting the joining surface, the uneven fitting portion has a contact face where the first frame and the second frame contact with each other, a gap is formed by the first frame, the second frame and the conductive sheet, the contact face is a face facing the gap which is disposed in a direction along the joining surface, and in the forming the second frame, the second resin is injected into the uneven fitting portion, and the injected second resin shrinks toward the contact face.

Further features of the present invention will become apparent from the following description of exemplary embodiments with reference to the attached drawings.

BRIEF DESCRIPTION OF THE DRAWINGS

FIG. 3 is a diagram depicting a configuration of a developing apparatus according to the first embodiment;

FIG. 4 is a side view of the developing apparatus according to the first embodiment;

FIG. 5 is a cross-sectional view of the developing apparatus according to the first embodiment;

DESCRIPTION OF THE EMBODIMENTS

Embodiments of the present invention will now be described with reference to the drawings. Dimensions, materials, shapes of the components and the relative positions thereof described in the embodiments may be appropriately changed depending on the configuration of an apparatus to which the present invention is applied, and on various conditions, and are not intended to limit the scope of the invention to the following embodiments.

First Embodiment (1) Configurations and Operations of Printer 1 and Process Cartridge 2

Figure 1:
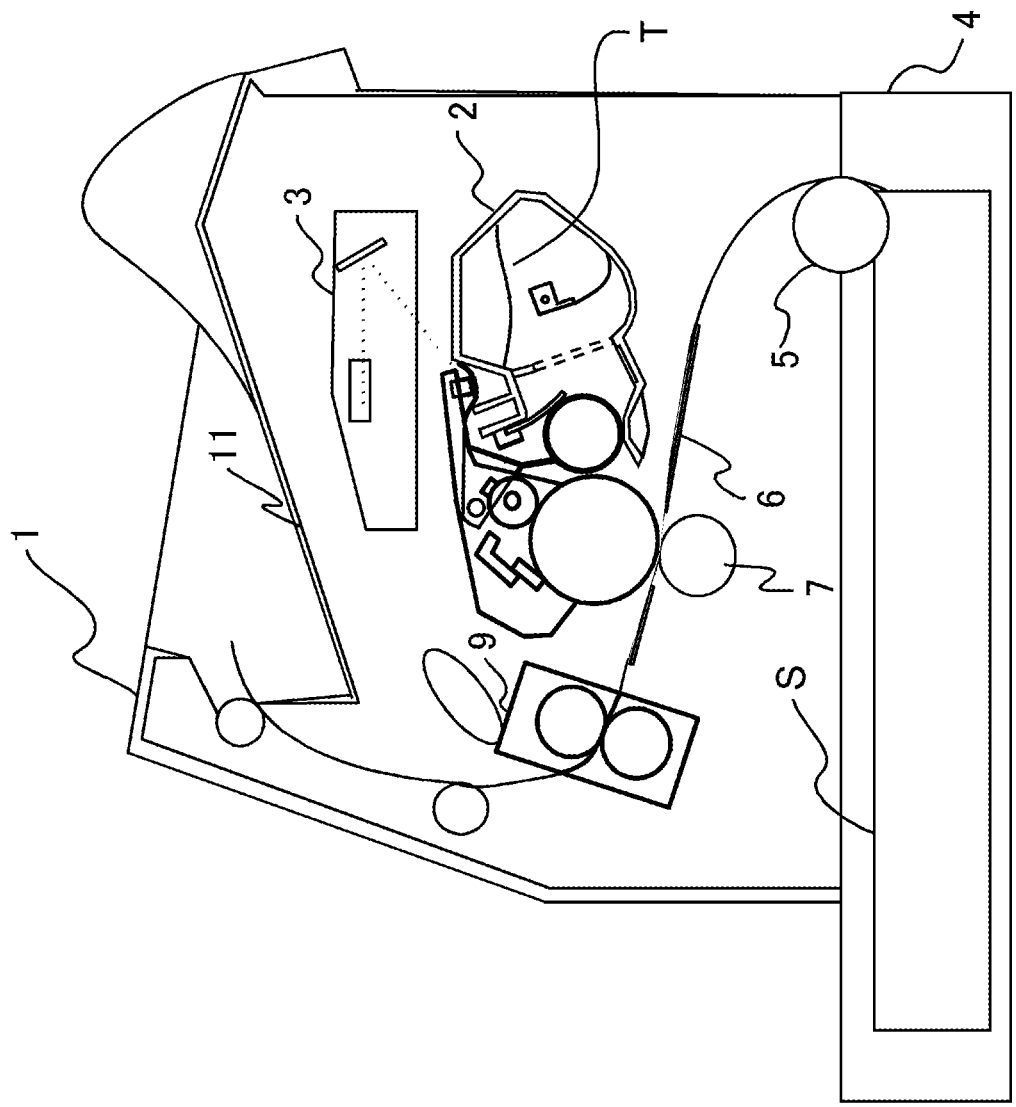
FIG. 1 is a diagram depicting a configuration of a printer according to a first embodiment.

FIG. 1 is a diagram depicting a configuration of a printer 1, which is an example of the image forming apparatus according to the first embodiment. The printer 1 is based on an electrophotographic image forming system, and is a laser beam printer where a process cartridge 2 is detachable from the apparatus main body. By connecting an external host device, such as a personal computer and an image reader, to this printer 1, the printer 1 executes the print operation based on the image information.

Figure 2:
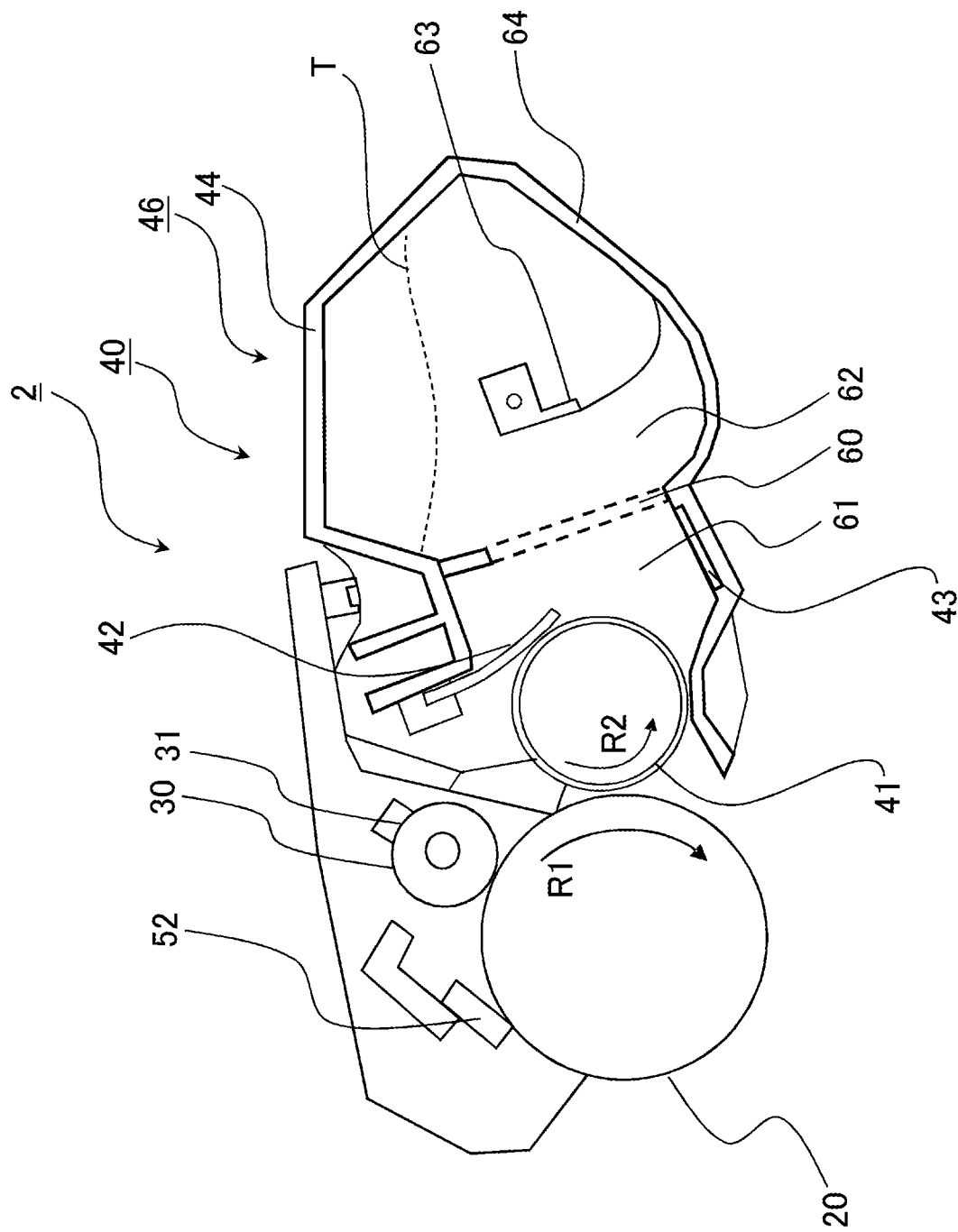
FIG. 2 is a diagram depicting a configuration of a process cartridge according to the first embodiment.

FIG. 2 is a diagram depicting the process cartridge 2 according to the first embodiment. The process cartridge 2 will be described with reference to FIG. 2. FIG. 2 illustrates a photosensitive drum 20 (corresponds to an image bearing member) which is a drum type electrophotographic photosensitive member. In the following description, the longitudinal direction is referred to as the rotation center axis line direction (direction vertical to the paper surface) of the photosensitive drum 20. In the first embodiment, four types of process apparatuses, that is, the photosensitive drum 20, a charging apparatus 30, a developing apparatus 40 and a cleaning apparatus 52 are integrated in the process cartridge 2, and the process cartridge 2 is detachable from the printer 1.

The photosensitive drum 20 is rotary-driven in the clockwise direction (arrow R1 direction) at a 157.6 mm/s peripheral velocity (process speed), based on the print start signal which indicates the start of the print operation. In the first embodiment, a charging roller 31 is disposed in the charging apparatus 30. The charging roller 31, to which charging bias is applied, contacts the photosensitive drum 20, and the charging roller 31 is rotary-driven by the rotation of the photosensitive drum 20. Then the peripheral surface of the rotating photosensitive drum 20 is uniformly charged by the charging apparatus 30 to a predetermined polarity and potential. In the first embodiment, the photosensitive drum 20 is charged to a predetermined potential in negative polarity.

An exposure apparatus 3 outputs a laser light which is modulated (ON/OFF conversion) corresponding to the time series electric digital pixel signals of the image information that is inputted from the host device to the controller unit. Thereby the outer peripheral surface of the photosensitive drum 20, which is uniformly charged by the charging roller 31, is scanned and exposed in the longitudinal direction. In the first embodiment, the portion of the photosensitive drum 20, where an image is formed, is exposed by the laser light (image exposure system). Then the electrostatic latent image, formed on the photosensitive drum 20 by the scanning exposure performed by the exposure apparatus 3, is developed by developer T on a developing roller 41 of the developing apparatus 40.

On the other hand, a pickup roller 5 of a sheet tray unit 4 is driven at a predetermined timing, whereby a recording material S (corresponds to the recording medium) (e.g. paper) that is stacked and stored in a sheet tray unit 4 is separated one sheet at a time, and fed. In the step of the recording material S passing the transfer roller 7 via a transfer guide 6, the developer image formed on the photosensitive drum 20 is sequentially transferred to the recording material S. Then the developer image on the recording material S is heated and pressed by a fixing apparatus 9, so as to be fixed to the recording material S, and the recording material S, on which the developer image is fixed, is discharged to a paper discharging tray 11. The developer or the like remaining on the photosensitive drum 20, after the developer image on the photosensitive drum 20 is transferred to the recording material S, is removed and cleaned by the cleaning apparatus 52. Then the photosensitive drum 20 is charged again by the charging apparatus 30.

(2) Developing Apparatus 40

FIG. 3 is a diagram depicting a configuration of the developing apparatus 40 according to the first embodiment. The developing apparatus 40 according to the first embodiment includes a frame 46, and has a developer container 64 which includes a developer chamber 62 to accommodate the developer T, an opening 60, and a developing chamber 61 in which the developing roller 41 is disposed to rotate. The developing apparatus 40 is separate from the cleaning unit, which includes the photosensitive drum 20 and a cleaning apparatus 52.

In the developing apparatus 40, the developer T, accommodated in the developer chamber 62 inside the developer container 64, is transported to the developing chamber 61 by a developer stirring unit 63 which transports and stirs the developer, via the opening 60 connecting the developer chamber 62 and the developing chamber 61. The developer transported to the developing chamber 61 is attracted to the developing roller 41 by a magnet (not illustrated) included in the developing roller 41. Further, by the developing roller 41 rotating in the arrow R2 direction, the developer on the developing roller 41 is transported to a developing blade 42, which is made of an elastic member. Then triboelectricity is applied to the developer on the developing roller 41 by the developing blade 42, and the layer thickness of the developer on the developing roller 41 is adjusted. Then the developer on the developing roller 41 is transported toward the photosensitive drum 20.

At the edge of the developing roller 41 in the longitudinal direction, the developing bias generated by superimposing AC voltage (inter-peak voltage=1600 Vpp, frequency f=2400 Hz) onto the DC voltage (Vdc=−400 V) is applied from the printer 1 to the developing roller 41. The photosensitive drum 20 is grounded, and an electric field is generated between the photosensitive drum 20 and the developing roller 41 in advance with the developing bias. As a result, the electrostatic latent image formed on the surface of the photosensitive drum 20 is developed as a developer image by the developer (charged developer) on the developing roller 41.

Here the frame 46 is manufactured by injection molding using a polystyrene (PS) type resin material, which is widely used for the manufacturing of frames and parts. However, the material of the frame 46 is not limited to this, and may be selected appropriately. The manufacturing method of the frame 46 will be described in detail later.

(2-1) Means of Detecting Developer Amount in Developer Container 64 of Developing Apparatus 40

Figure 6A:
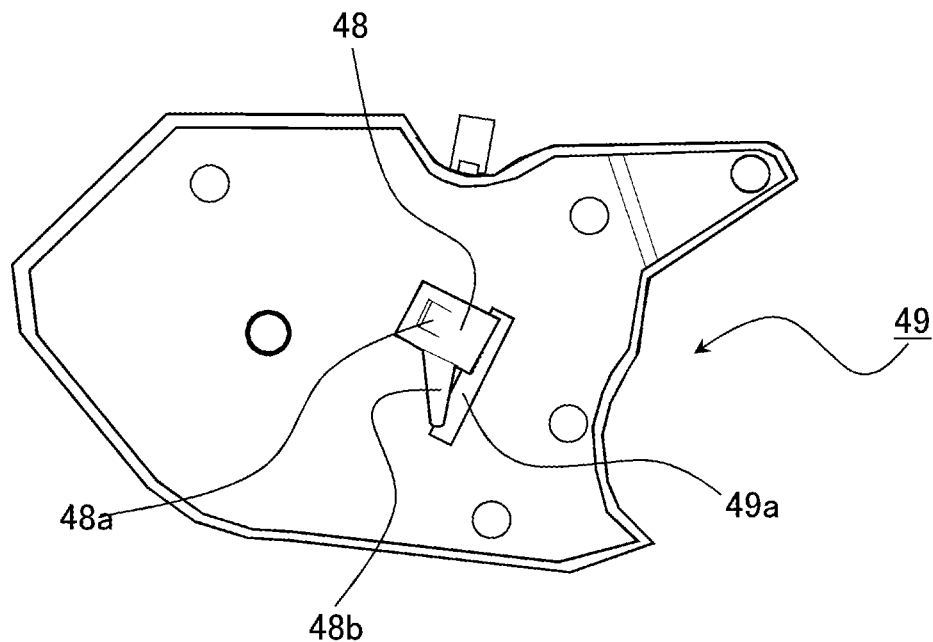
FIGS. 6A and 6B are each a side view of a side holder according to the first embodiment.
Figure 6B:
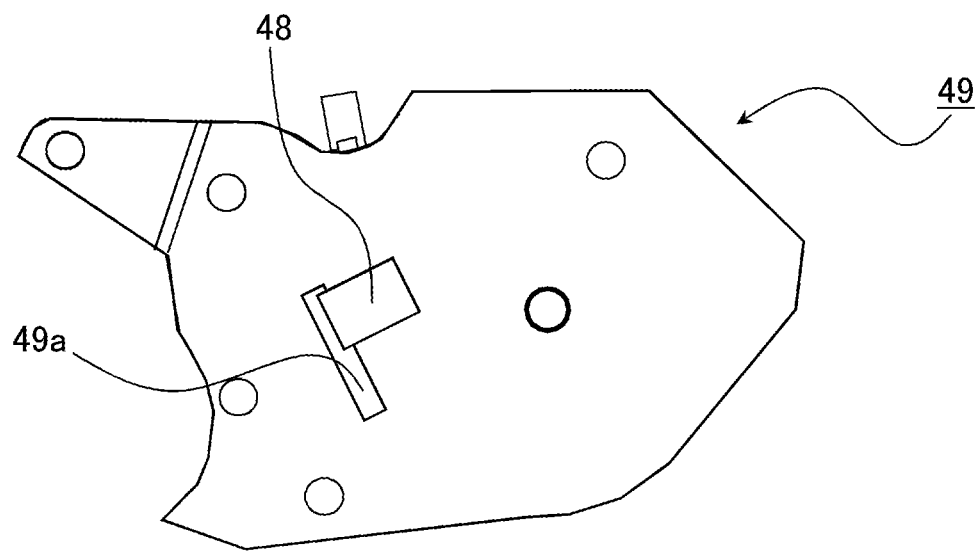

A means of detecting the developer amount in the developer container 64 of the developing apparatus 40 according to the first embodiment will be described next with reference to FIG. 3, FIG. 4 and FIGS. 6A and 6B. FIG. 4 is a side view of the developing apparatus 40 according to the first embodiment. FIGS. 6A and 6B are each a side view of a side holder 49 according to the first embodiment. In concrete terms, FIG. 6A is a side view depicting a side of the side holder 49 which is joined with the frame 46, and is a diagram of the developing apparatus 40 in FIG. 4 from the back to front direction with respect to the paper surface. (The side holder 49 is not illustrated in FIG. 4.) FIG. 6B is a side view depicting a side of the side holder 49 which is not joined with the frame 46 (opposite side of FIG. 6A), and is a diagram of the developing apparatus 40 in FIG. 4 when viewed in the front to back direction with respect to the paper surface. The side holder 49 is joined with the frame 46 on the side face of the frame 46, and protects gears for driving the developing roller 41 (not illustrated), the developer stirring unit 63 and the like.

In the developing apparatus 40, a conductive sheet 43 (corresponding to the conductive sheet) having conductivity is disposed to acquire the residual amount of the developer T in the developer container 64 using electrostatic capacitance. When AC voltage is applied to the developing roller 41, electric current, in accordance with the electrostatic capacitance between the developing roller 41 and the conductive sheet 43, flows between the developing roller 41 and the conductive sheet 43. This electrostatic capacitance changes in accordance with on the developer amount between the developing roller 41 and the conductive sheet 43.

In the first embodiment, an output conductive path 45 (corresponds to the second frame) made of conductive resin (corresponds to the second resin) is disposed in the frame 46 at the edge in the longitudinal direction. The output conductive path 45 has a joining surface with the conductive sheet 43 near the edge of the conductive sheet 43 in the longitudinal direction, and is electrically connected with a contact electrode 48 disposed in the side holder 49. The conductive sheet 43 and a developer amount detecting apparatus 70 in the printer 1 are electrically connected when the developer amount detecting apparatus 70 and the contact electrode 48 are electrically connected. The developer amount detecting apparatus 70 measures electric current that flows from the conductive sheet 43 to the developer amount detecting apparatus 70, whereby the developer amount in the developer container 64 of the developing apparatus 40 can be measured.

In the first embodiment, the developing roller 41 is used as one of the electrodes to measure the residual amount of the developer T in the developer container 64, but the electrode need not be the developing roller 41. In other words, in the developer container 64, an electrode may be independently disposed at a position facing the conductive sheet 43. In this case, the developing roller 41 need not be used as the electrode. Further, as illustrated in FIG. 3, the conductive sheet 43 is disposed on the bottom surface of a developing frame 44 (corresponds to the first frame) of the frame 46, hence the change of the developer amount in the developer container 64 of the developing apparatus 40 can be measured efficiently. However, the position at which the conductive sheet 43 is disposed is in accordance with the shapes of the frame 46 and the developer container 64, and is not especially limited, as long as the position is where the conductive sheet 43 is joined with the output conductive path 45, and the developer amount in the developer container 64 can be measured accurately.

(2-2) Configuration of Conductive Sheet 43

The configuration of the conductive sheet 43 will be described in detail with reference to FIG. 3 and FIG. 5. FIG. 5 is a cross-sectional view of the developing apparatus 40 according to the first embodiment, and indicates a cross-section at the E-E line in FIG. 3 and FIG. 4. As mentioned above, the conductive sheet 43 is a sheet to detect the residual amount of the developer T in the developer container 64. The position where the conductive sheet 43 is disposed will be described first. The conductive sheet 43 is disposed on the inner wall face of the frame 46 (corresponds to the accommodating portion) to detect the developer amount in the frame 46. As mentioned above, the conductive sheet 43 is adhered to a part of the bottom surface of the developing frame 44, so as to extend from a position facing the developing roller 41 in the longitudinal direction.

The material of the conductive sheet 43 will be described next. The conductive sheet 43 is made of a resin sheet having conductivity, and the thickness of the conductive sheet 43 is 0.1 mm in this example. By using the conductive sheet 43 to measure the residual amount of the developer T in the developer container 64, the configuration to measure the residual amount of the developer T can be simplified. In the first embodiment, "having conductivity" means that the surface resistivity measured by a measurement method specified in JIS K 7194 is not more than 10 kΩ/sq. And "not having conductivity" means that the surface resistivity measured by the same method is more than 10 kΩ/sq. In the first embodiment, the surface resistivity of the conductive sheet 43 is about 1 k to 5 kΩ/sq. The material used for the conductive sheet 43 is a resin made of ethylene vinyl acetate (EVA) copolymers in which carbon black is disposed.

In the first embodiment, the conductive sheet 43 is formed using EVA resin. Thereby the conductive sheet 43 made of EVA resin can be adhered to the developing frame 44 made of PS resin (corresponds to the first resin) by heat and pressure when the developing frame 44 is injected and molded. In other words, in the first embodiment, the conductive sheet 43 is embedded in the frame 46, and the developing frame 44 and the conductive sheet 43 are integrally molded.

However, the conductive sheet 43 may be a conductive sheet 43 having a different thickness, or a conductive sheet 43 made of a different material, and the developing frame 44 may be made of a material other than PS resin. In the first embodiment, the thickness of the conductive sheet 43 is 0.1 mm, considering the influence of the rigidity of the conductive sheet 43 to deformation of the developing frame 44, transferability when the developing frame 44 is injection-molded, and conductivity of the conductive sheet 43. However, the thickness of the conductive sheet 43 is not limited to this.

In the first embodiment, the EVA resin having adhesiveness with the material of the developing frame 44 is selected as the material of the conductive sheet 43, but the material of the conductive sheet 43 is not limited to this. For example, a compatible resin, which can be joined with the PS resin which is the material of the developing frame 44, may be used as the material of the conductive sheet 43. Resins that are compatible with a PS resin are: polystyrene (PS), acrylonitrile-butadiene-styrene (ABS) and polyphenylene oxide (PPO) resin. The conductive sheet 43 may have holes of which diameters are smaller than the particle size of the developer T, to reduce the volume (amount of resin) of the conductive sheet 43, which is expensive.

(2-3) Configuration of Output Conductive Path 45

Figure 7:
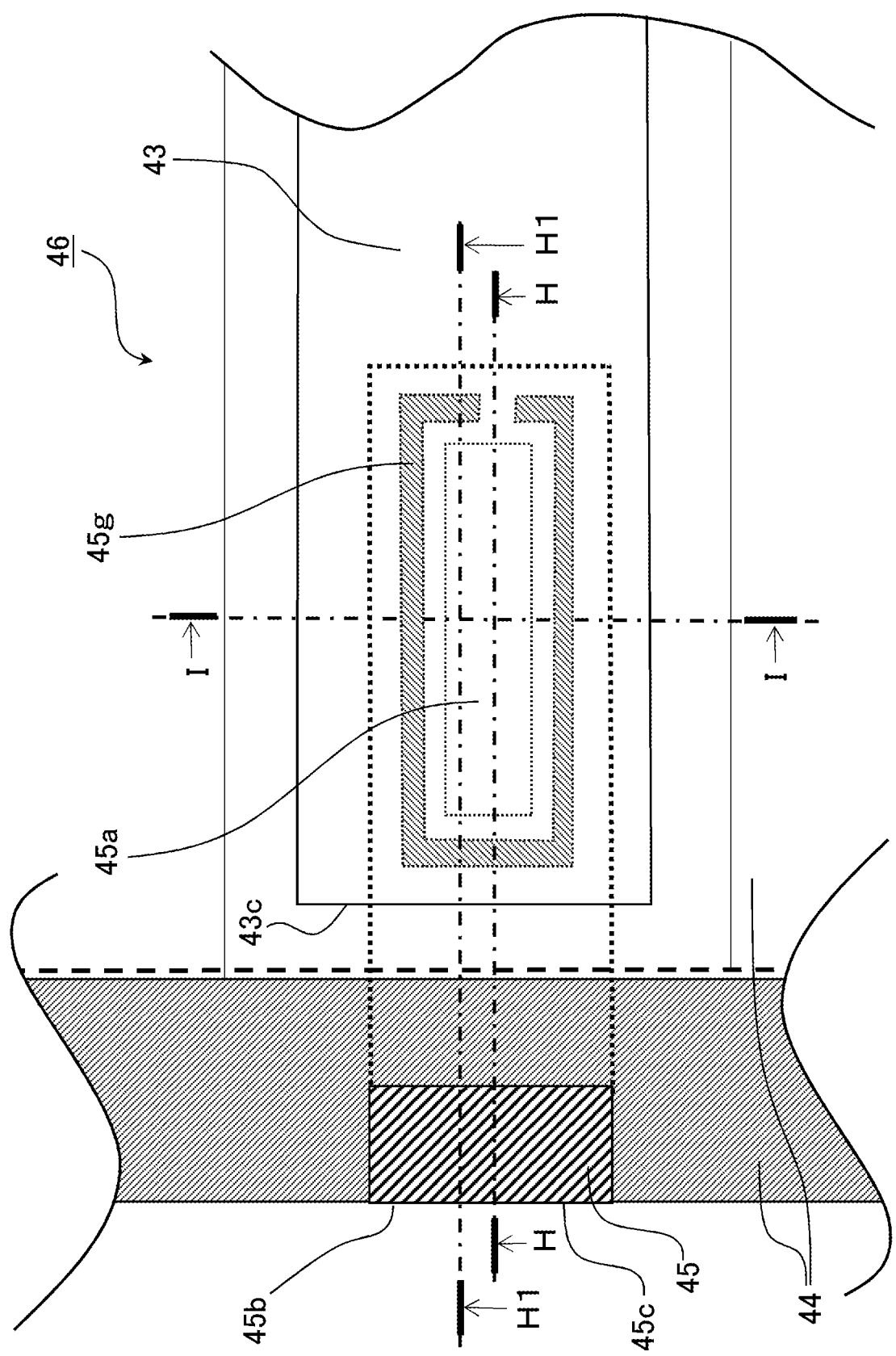
FIG. 7 is a detailed diagram depicting a part of a frame according to the first embodiment.
Figure 8:
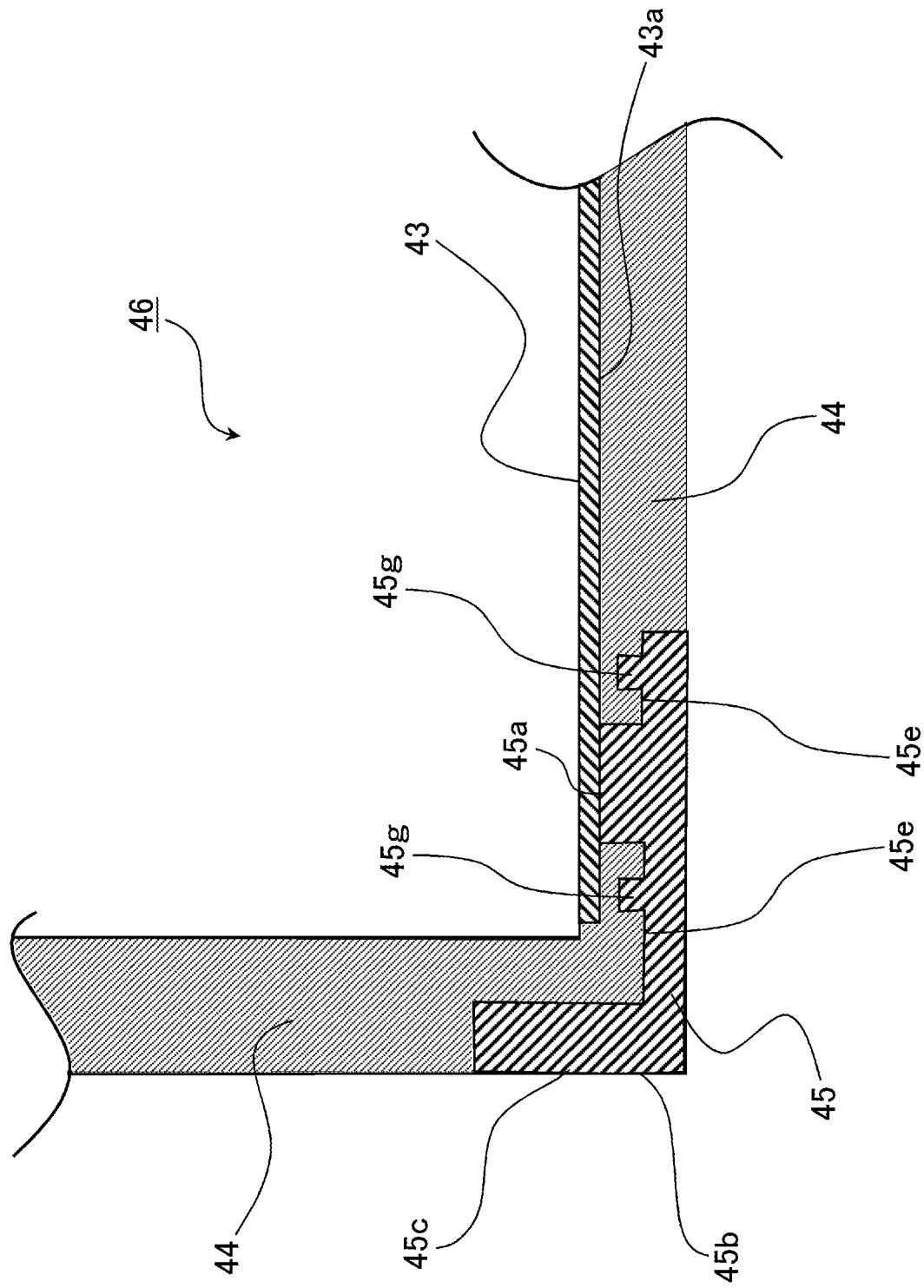
FIG. 8 is a cross-sectional view depicting a part of the frame according to the first embodiment.
Figure 9:
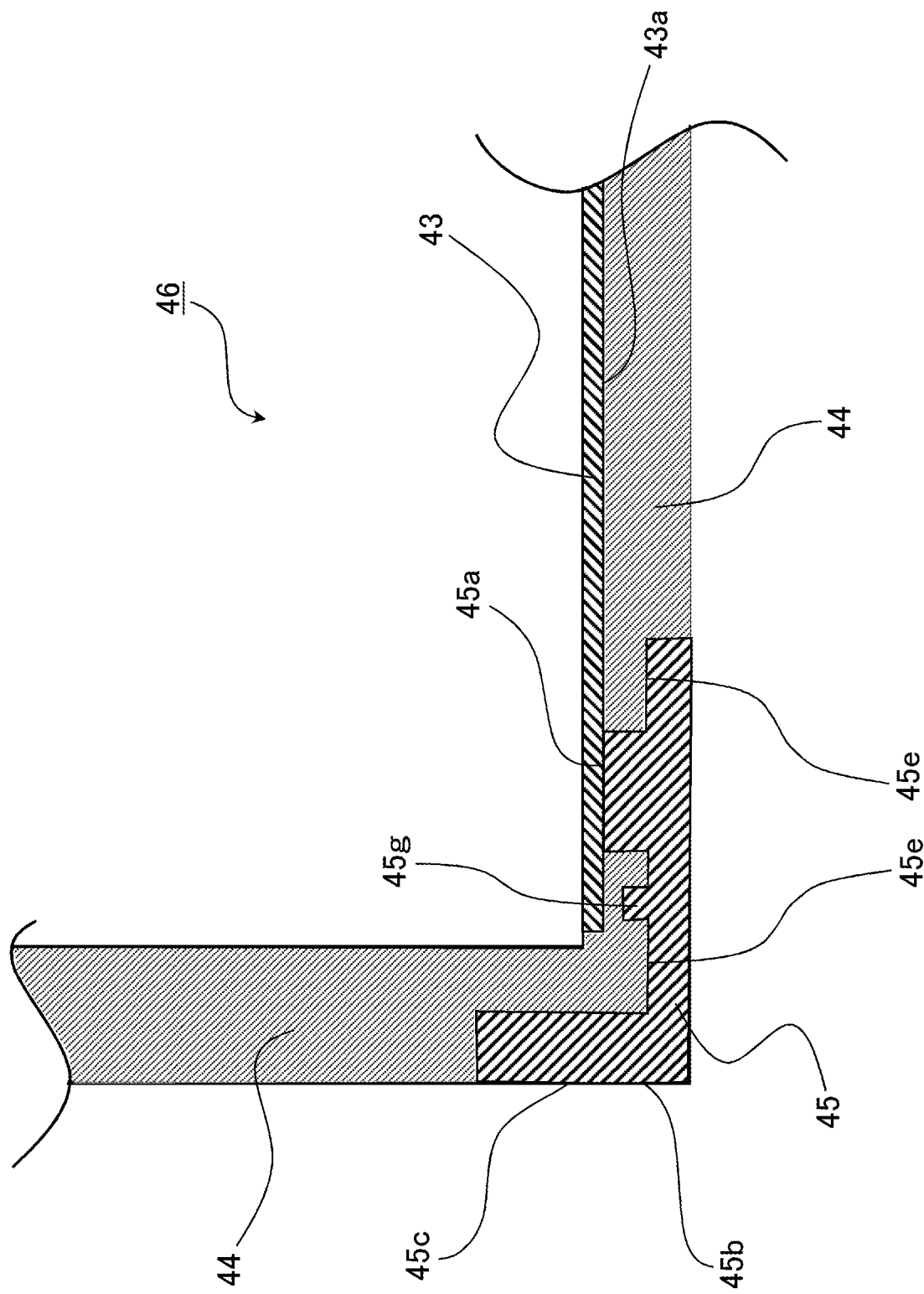
FIG. 9 is a cross-sectional view depicting a part of the frame according to the first embodiment.
Figure 10:
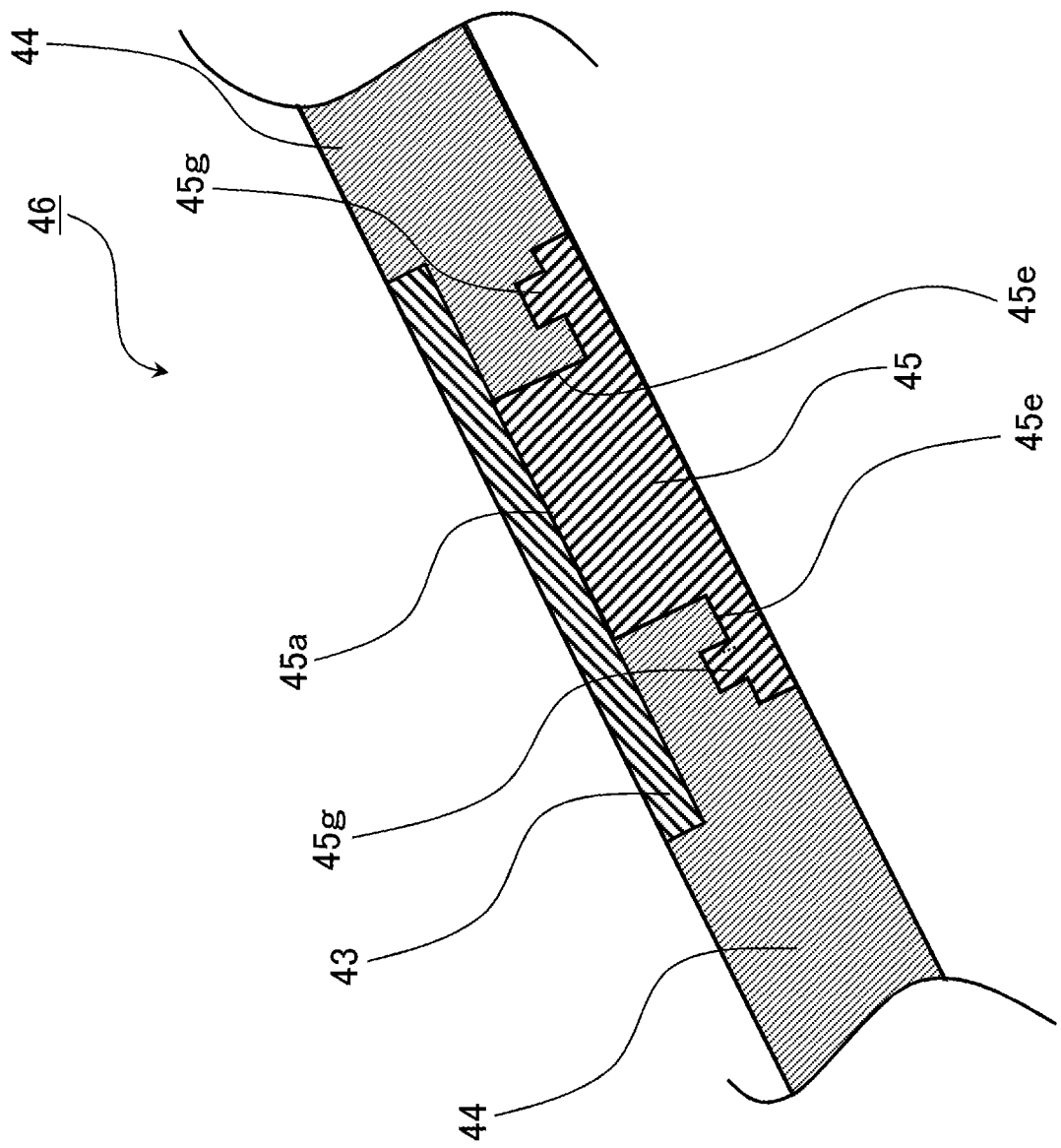
FIG. 10 is a cross-sectional view depicting a part of the frame according to the first embodiment.

The configuration of the output conductive path 45 will be described in detail with reference to FIG. 4, FIG. 5, FIG. 7, FIG. 8, FIG. 9 and FIG. 10. FIG. 7 is a detailed diagram depicting the portion of the frame 46 according to the first embodiment. In concrete terms, FIG. 7 is a detailed diagram of the portion A in the developing apparatus 40 in FIG. 5. FIG. 8 is a cross-sectional view depicting a part of the frame 46 according to the first embodiment. In concrete terms, FIG. 8 is a cross-section at the H1-H1 line indicated in FIG. 4 and FIG. 7. FIG. 9 is a cross-sectional view depicting a part of the frame 46 according to the first embodiment. In concrete terms, FIG. 9 is a cross-section at the H-H line indicated in FIG. 4 and FIG. 7. FIG. 10 is a cross-sectional view depicting a part of the frame 46 according to the first embodiment. In concrete terms, FIG. 10 is a cross-section at the I-I line indicated in FIG. 7.

As mentioned above, the output conductive path 45 contacts the conductive sheet 43 (see FIG. 4, FIG. 5 and FIG. 8), and is a conductive path made of a conductive resin. The output conductive path 45 also contacts the contact electrode 48 (not illustrated in FIG. 4, FIG. 5 and FIG. 8) disposed in the side holder 49. In other words, the output conductive path 45 plays a role of electrically connecting the conductive sheet 43 and the contact electrode 48 disposed in the side holder 49.

First the position where the output conductive path 45 is disposed will be described. As illustrated in FIG. 4, FIG. 5, FIG. 7 and FIG. 8, the output conductive path 45 is disposed on the edge of the frame 46 in the longitudinal direction. The output conductive path 45 is disposed on the edge because the contact electrode 48 of the side holder 49, which is disposed on the edge of the frame 46 in the longitudinal direction, can be easily connected with the output conductive path 45 electrically. Therefore the output conductive path 45 has a conductive portion 45a, which contacts with the conductive sheet 43, on an area near the edge of the conductive sheet 43 in the longitudinal direction. The conductive portion 45a has a joining surface between the conductive sheet 43 and the output conductive path 45.

Here a relative relationship between the output conductive path 45 and the conductive sheet 43 will be described. In the first embodiment, as illustrated in FIG. 8, at least a part of one surface 43a of the conductive sheet 43 is adhered to the developing frame 44 and the output conductive path 45, along the inner wall face of the frame 46. In other words, the conductive sheet 43 is disposed on the inner wall face of the frame 46 such that at least a part of the conductive sheet 43 contacts the developing frame 44 and the output conductive path 45.

The configuration of each portion of the output conductive path 45 will be described next with reference to FIG. 7, FIG. 8 and FIG. 10. The output conductive path 45 has an exposed portion 45b, which is exposed from the frame 46 on the edge of the frame 46 in the longitudinal direction.

The output conductive path 45 includes a boundary portion 45e which is the boundary with the developing frame 44, since the output conductive path 45 is manufactured according to a manufacturing method of the frame 46, which will be described later. An uneven fitting portion 45g is formed on the boundary portion 45e, where the developing frame 44 and the output conductive path 45 are fitted. The uneven fitting portion 45g is located at the outer side of the frame 46 from the joining surface of the conductive portion 45a, between the developing frame 44 and the output conductive path 45. Further, the uneven fitting portion 45g is a portion where the developing frame 44 and the output conductive path 45 are fitted in a normal direction (vertical direction to the paper surface in FIG. 7, and upper/lower direction on the paper surface in FIG. 8), which is one of the directions where the developing frame 44 and the output conductive path 45 cross the joining surface.

The position of the uneven fitting portion 45g will be further described. When the frame 46 is sectioned at an arbitrary surface parallel with the normal direction of the joining surface between the developing frame 44 and the output conductive path 45, there is a cross-section where the uneven fitting portion 45g is disposed on both one side and the other side of the conductive portion 45a. In other words, when viewing from the normal direction of the joining surface between the conductive sheet 43 and the output conductive path 45 in the conductive portion 45a, the uneven fitting portion 45g includes a portion which fits with the joining surface on one side in the direction along the joining surface. Further, the uneven fitting portion 45g includes a portion which fits with the joining surface on the other side, which is on the opposite side of one side. Here the cross-section of the frame 46 is the cross-section at the H1-H1 line indicated in FIG. 4 and FIG. 7, or is the cross-section at the I-I line indicated in FIG. 7. Further, when viewing from the normal direction of the joining surface in the conductive portion 45a, the uneven fitting portion 45g includes a portion which fits with one side of the joining surface in the direction along the joining surface, and a portion which fits with the other side of the joining surface, which is on the opposite side of the one side. When viewing in the cross-sections in FIG. 8 and FIG. 10, the uneven fitting portion 45g is disposed on one side (e.g. left side on the paper surface) and the other side (e.g. right side on the paper surface) of the conductive portion 45a (joining surface) respectively. In FIG. 8, a total of two uneven fitting portions 45g are disposed, and in FIG. 10, a total of two uneven fitting portions 45g are disposed.

The material of the output conductive path 45 will be described next. The output conductive path 45 is made of a conductive resin having conductivity, such as a polyacetal (POM) resin in which carbon black is dispersed. By forming the output conductive path 45 using conductive resin, the configuration to measure the residual amount of the developer T can be simplified. In the first embodiment, the output conductive path 45 is formed using a resin having conductivity, so that the developing frame 44 is integrated with the output conductive path 45, which is formed by injection-molding after the developing frame 44 is injection-molded, using the later mentioned manufacturing method. The material of the output conductive path 45 is not limited to the above, but may be, for example, an EVA resin in which carbon black is dispersed, or a PS resin in which carbon black is dispersed.

(2-4) Configuration of Contact Electrode 48

The configuration of the contact electrode 48 will be described next with reference to FIG. 4 and FIGS. 6A and 6B. As mentioned above, FIGS. 6A and 6B are each a side view of the side holder 49 according to the first embodiment. The contact electrode 48 is made of a copper electrode plate, and as illustrated in FIG. 6A, the contact electrode 48 is fitted with a convex boss (not illustrated) of the side holder 49, so as to be secured to the side holder 49. A convex boss fitting portion 48a of the contact electrode 48 is formed by making a U-shaped cut in the contact electrode 48. Further, as illustrated in FIG. 6A, the contact electrode 48 is bent so as to pass through a hole 49a of the side holder 49.

With the side holder 49 contacting with the side face of the frame 46 in the contact electrode 48, an output conductive path contacting portion 48b, which has a plate spring shape, contacts the contact electrode contacting portion 45c at the exposed portion 45b of the output conductive path 45 illustrated in FIG. 4. Thereby the contact electrode 48 and the output conductive path 45 are conducted. In other words, the conductive sheet 43 in the frame 46 is electrically conducted via the output conductive path 45. Further, the contact electrode 48 includes a contact portion (not illustrated) with the printer 1. Therefore when the process cartridge 2 or the developer container 64 is attached to the printer 1, the developer amount detecting apparatus 70 of the printer 1 and the contact electrode 48 are electrically connected. When the developer amount detecting apparatus 70 of the printer 1 and the contact electrode 48 are connected, the contact electrode 48 and the output conductive path 45 are connected, and the output conductive path 45 and the conductive sheet 43 are connected. Then the electric current that flows to the conductive sheet 43 also flows to the developer amount detecting apparatus 70 in the printer 1.

Method of Manufacturing Frame 46

A method of manufacturing the frame 46 will be described next. The frame 46 is manufactured in two stages.

In the first step, which is the first stage, the developing frame 44 and the conductive sheet 43 are integrally insert-molded in order to embed the conductive sheet 43 in the frame 46. In the step of the insert-molding, the conductive sheet 43 is inserted into a mold, then the first resin, which is a PS molten resin and is a primary material of the developing frame 44, is injected into the mold, so as to mold a first resin portion 44a and form the developing frame 44.

In the second step, which is the second stage, a second resin, which is a conductive resin, is injected into a space created by the conductive sheet 43 and the developing frame 44 and the mold. Thereby a second resin portion 45d is molded and the output conductive path 45 is formed, and the output conductive path 45 and the developing frame 44 are integrally outsert-molded.

Figure 11:
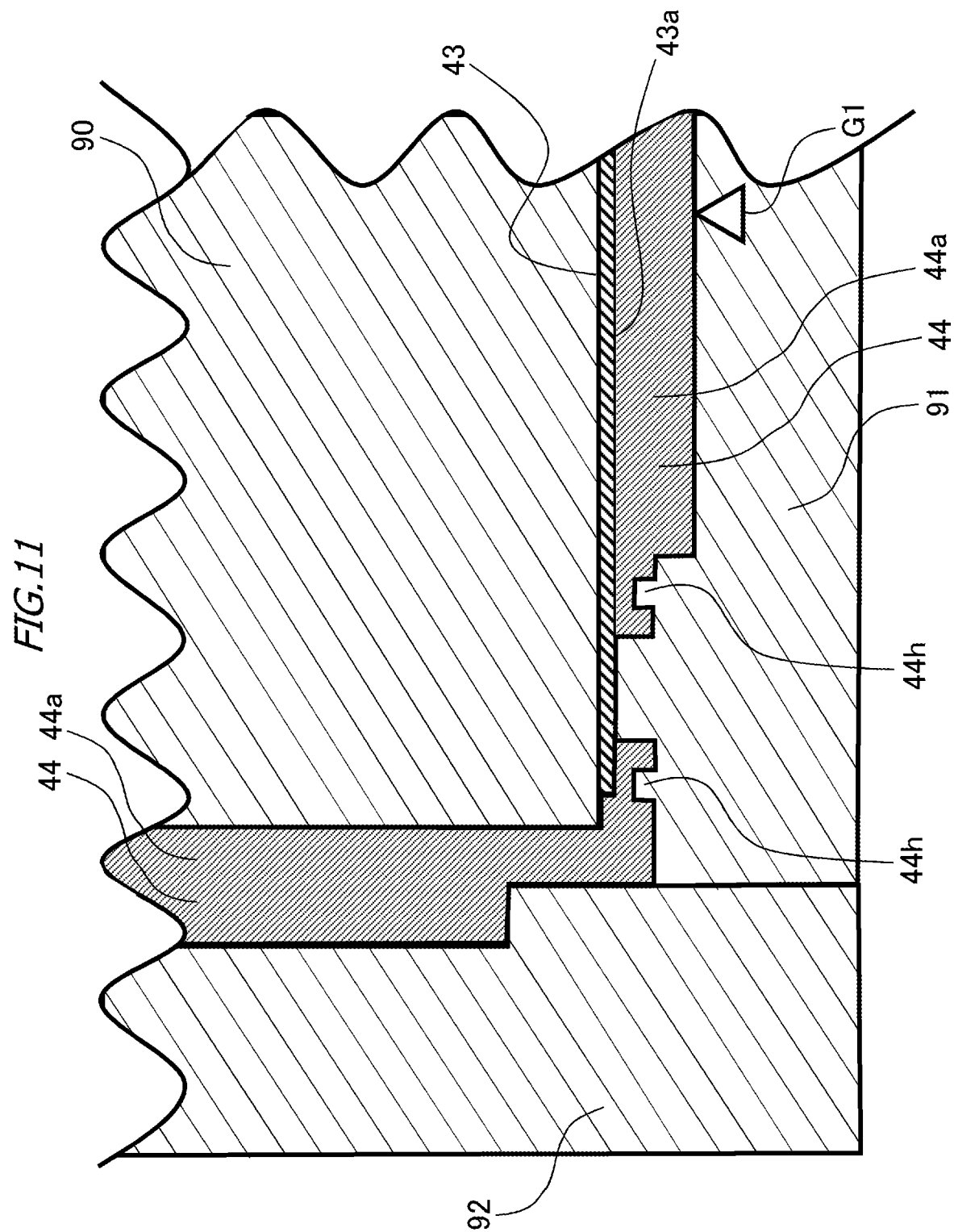
FIG. 11 is a cross-sectional view depicting a step of manufacturing the frame according to the first embodiment.
Figure 12:
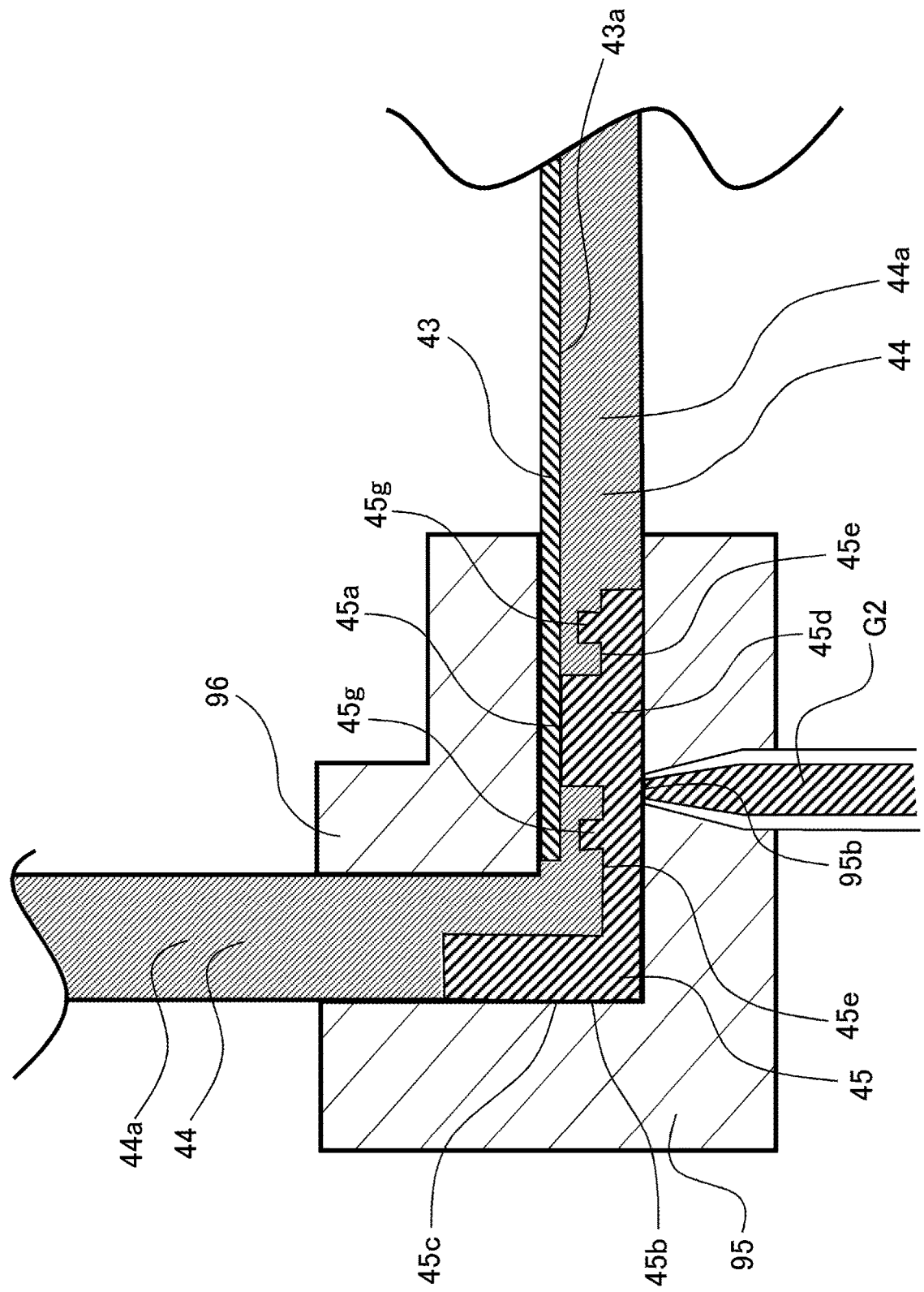
FIG. 12 is a cross-sectional view depicting a step of manufacturing the frame according to the first embodiment.

The first step and the second step will be described concretely with reference to FIG. 11 and FIG. 12. Here FIG. 11 is a cross-sectional view depicting a step of manufacturing the frame 46 according to the first embodiment. FIG. 12 as well is a cross-sectional view depicting a step of manufacturing the frame 46 according to the first embodiment. Specifically, FIG. 11 is a diagram for describing the first step of the manufacturing steps of the frame 46 according to the first embodiment. FIG. 12 is a diagram for describing the second step of the manufacturing steps of the frame 46 according to the first embodiment. Both FIG. 11 and FIG. 12 are cross-sections at the H1-H1 line indicated in FIG. 4 and FIG. 7, and correspond to FIG. 8.

First Step

As mentioned above, the first step is a step of integrally insert-molding the developing frame 44 and the conductive sheet 43 in the frame 46. This step will be described with reference to FIG. 11. In concrete terms, in the first step, the developing frame 44 is formed, and the conductive sheet 43 is fixed to the developing frame 44.

First, as illustrated in FIG. 11, the conductive sheet 43 is adhered to the mold 90 automatically or manually using a robot hand or the like (not illustrated). In the first embodiment, the conductive sheet 43 is adhered to the mold 90 by air suction (suction unit is not illustrated), for example.

The mold clamping is performed using the mold 90, a mold 91 and a slide mold 92, so as to become the state illustrated in FIG. 11. Then the first resin, which is a PS molten resin, is injected into the space created by the mold 90, the mold 91 and the slide mold 92, through an injection portion G1 disposed near the center of the mold 91 in the longitudinal direction. Then the first resin portion 44a is molded by injection molding, and the developing frame 44 is formed. In concrete terms, the developing frame 44 in the frame 46 is formed by injecting the first resin onto a surface 43a along one surface 43a of the conductive sheet 43 illustrated in FIG. 11, whereby the conductive sheet 43 is fixed to the developing frame 44. In the developing frame 44, the shape of the mold 91 is transferred, and a concave portion 44h is formed in the developing frame 44.

In the first embodiment, the injection portion G1 is disposed near the center of the mold 91 in the longitudinal direction of the developing frame 44. However, the position of the injection portion G1 is not limited to this. The injection portion G1 may be disposed in the mold 90 or the slide mold 92. Further, in the first embodiment, the mold 90, the mold 91 and the slide mold 92, as illustrated in FIG. 11, are used, but the type of mold is not limited to this. For example, the developing frame 44 may be molded using a mold having a different shape.

Second Step

As mentioned above, the second resin portion 45d is molded by injecting the second resin, which is a conductive resin, into a space created by the conductive sheet 43, the developing frame 44 and the mold, and the output conductive path 45 is formed, then the output conductive path 45 and the developing frame 44 are integrally outsert-molded. The second step is a step of forming the output conductive path 45. The second step will be described with reference to FIG. 12.

First a mold 95 and a mold 96, which are different from the mold 90, the mold 91 and the slide mold 92 used in the first step, are contacted to the developing frame 44 formed in the first step, and mold clamping is performed. The mold 95 has an injection hole 95b to inject a second resin, which is a conductive resin to form the output conductive path 45.

Then at the edge of the frame 46 in the longitudinal direction, the second resin is injected via an injection portion G2 disposed in the mold 95, and the second resin is injected into a space created by the conductive sheet 43, the developing frame 44 and the mold 95 via the injection hole 95b, so as to mold the second resin portion 45d. Thus using the second resin, which is a conductive resin, the output conductive path 45 is outsert-molded by the second resin portion 45d.

When the output conductive path 45 is formed by this outsert molding, the following configuration is also formed. As mentioned above, the conductive portion 45a, which has a joining surface to contact with the conductive sheet 43, is formed in the output conductive path 45. Further, the boundary portion 45e, to create a boundary with the developing frame 44, is also formed in the output conductive path 45. In the second step, this boundary portion 45e is formed by the injected second resin contacting the developing frame 44. Further, as illustrated not only in FIG. 12 but also in FIG. 8 and FIG. 10, the second resin flows into the concave portion 44h of the developing frame 44 indicated in FIG. 11, in the step of forming the boundary portion 45e. Then in the boundary portion 45e, a plurality of uneven fitting portions 45g, which partially protrude from the boundary portion 45e toward the developing frame 44, are formed. For example, as the cross-section in FIG. 12 indicates, at the boundary portion 45e, one uneven fitting portion 45g is formed on one side of the conductive portion 45a (e.g. left side of the paper surface), and on the other side of the conductive portion 45a (e.g. right side of the paper surface) respectively. That is, a total of two uneven fitting portions 45g are formed. Further, in the output conductive path 45, an exposed portion 45b, which is exposed from the frame 46, is formed, and the contact electrode contacting portion 45c, which contacts with the contact electrode 48, is formed in a part of the exposed portion 45b.

Problem of Frame Not Using Configuration According to the First Embodiment and Effect of Using Frame of the First Embodiment A frame 946 and a frame 846 are examples of frames which do not use the configuration of the first embodiment, and problems that may occur with the frame 946 and the frame 846, and the effect of using the frame 46 according to the first embodiment will be described next.

Problem of Frame Not Using Configuration According to the First Embodiment

A problem that may occur with the frame 946 and the frame 846, which are two examples of a frame not using the configuration according to the first embodiment, will be described.

First the frame 946 not using the configuration according to the first embodiment will be described with reference to FIG. 16, FIG. 17 and FIG. 18.

Figure 16:
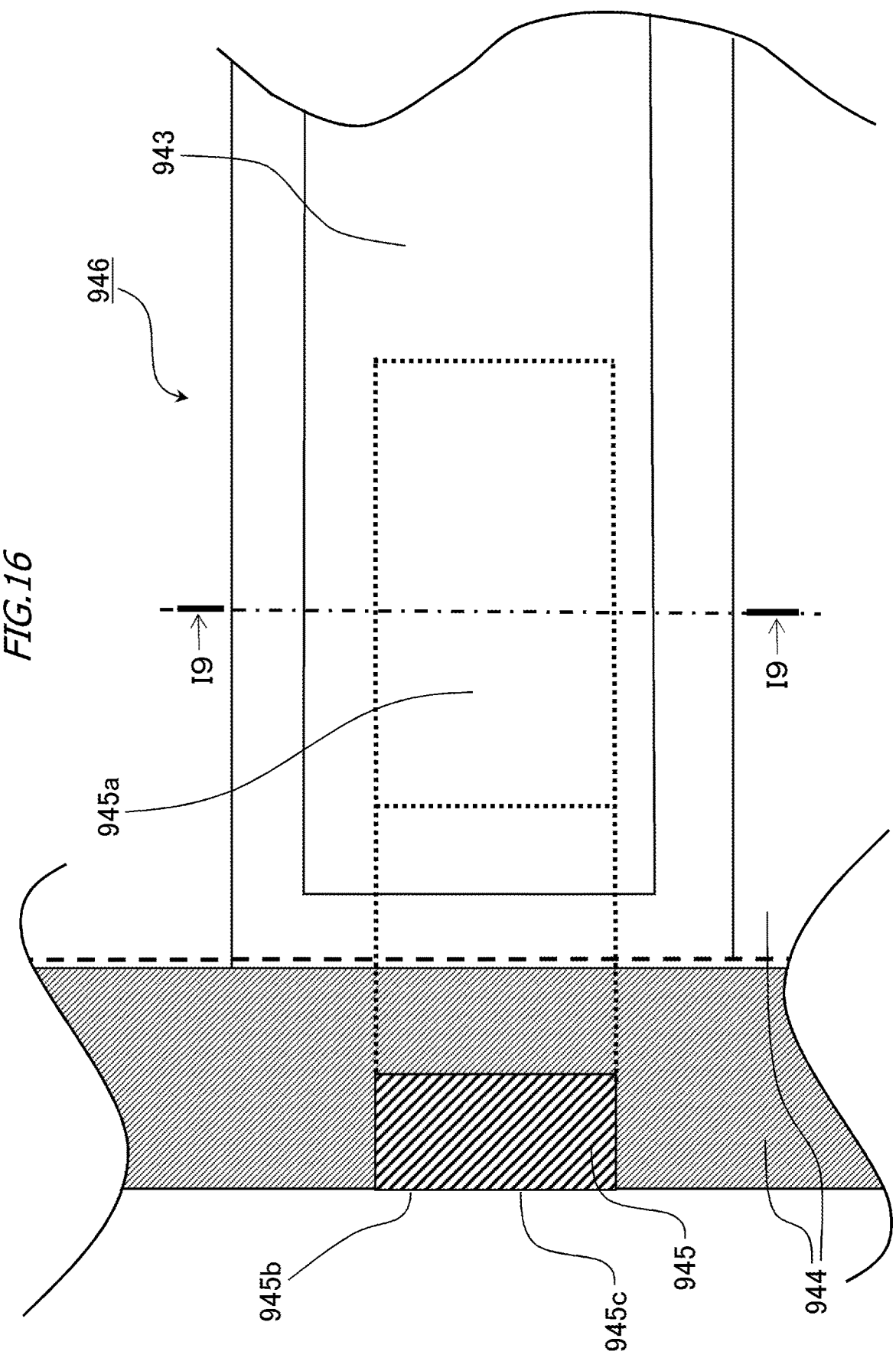
FIG. 16 is a detailed diagram depicting a part of a frame that is not using the configuration according to the first embodiment.

FIG. 16 is a detailed diagram depicting a part of the frame 946 not using the configuration according to the first embodiment, and corresponds to FIG. 7, which is a detailed diagram depicting a part of the frame 46 according to the first embodiment. FIG. 17 is a cross-sectional view depicting a part of the frame 946 which does not use the configuration according to the first embodiment, sectioned at the I9-I9 line in FIG. 16, and corresponds to FIG. 10 which illustrates a part of the frame 46 according to the first embodiment. FIG. 18 is a cross-sectional view depicting a part of the frame 946 not using the configuration according to the first embodiment, and a problem thereof. Just like FIG. 17, FIG. 18 is a cross-section at the I9-I9 line in FIG. 16, and corresponds to FIG. 14 which is a cross-sectional view depicting a part of the frame 46 according to the first embodiment and a later mentioned effect thereof.

Figure 17:
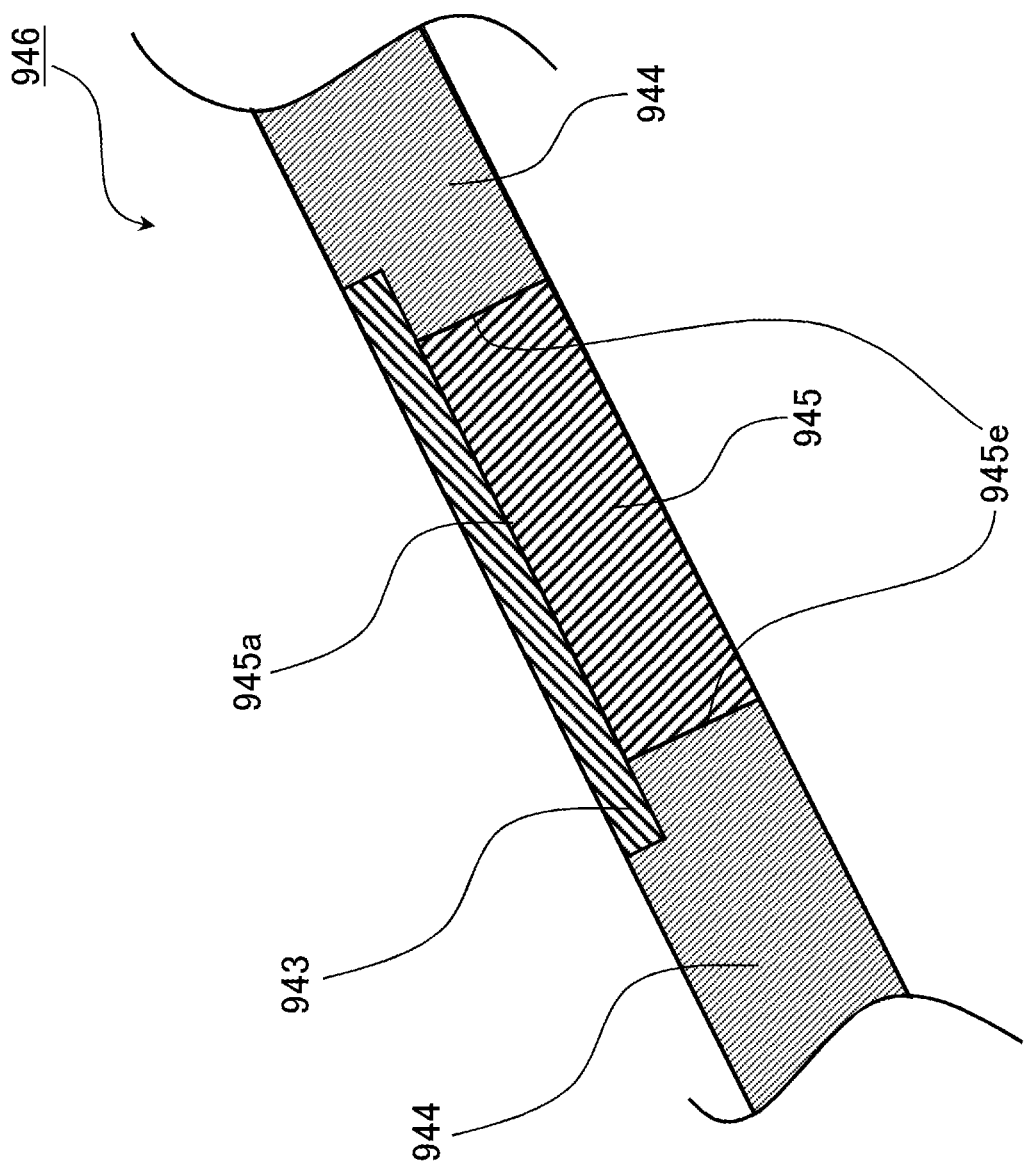
FIG. 17 is a cross-sectional view depicting a part of a frame that is not using the configuration according to the first embodiment.
Figure 18:
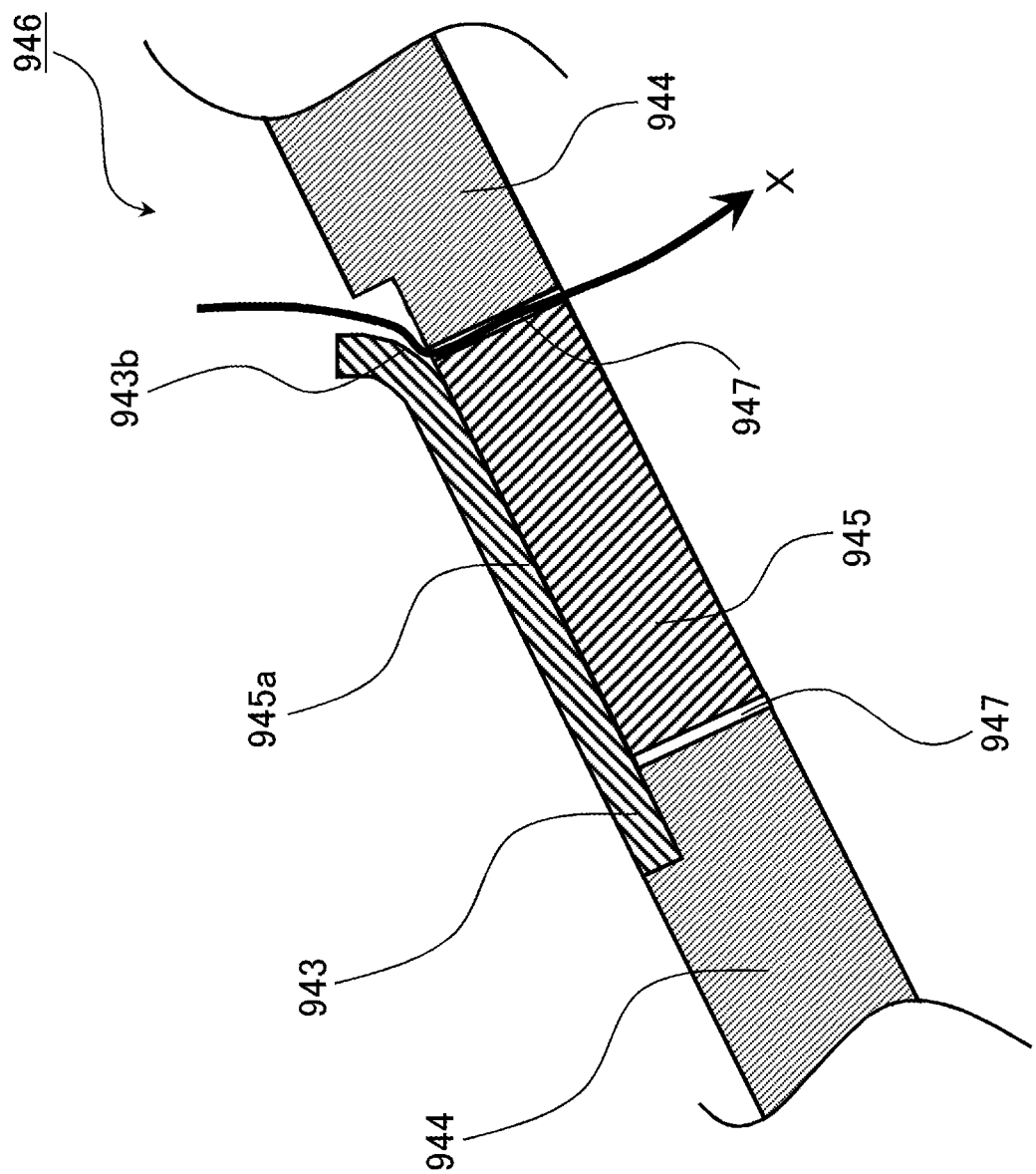
FIG. 18 is a cross-sectional view depicting a part of the frame that is not using the configuration according to the first embodiment and a problem thereof.

In FIG. 16, FIG. 17 and FIG. 18 which illustrate the frame 946 not using the configuration according to the first embodiment, a reference sign of each composing element starts with "9" which is added to the beginning of each reference sign according to the first embodiment. For example, the frame 46 according to the first embodiment is the frame 946, as mentioned above, in the frame not using the configuration according to the first embodiment. In the reference sign indicating a position in a cross-section in FIG. 16, FIG. 17 and FIG. 18, "9" is added after the reference sign in the first embodiment. For example, the cross-sectional at the I-I line in the frame 46 according to the first embodiment is indicated as the cross-section at the I9-I9 line in the frame 946, as mentioned above. The other items of the frame 946 not using the configuration according to the first embodiment are the same as those of the frame 46 according to the first embodiment, and description thereof is omitted. The manufacturing method of the frame 946 is the same as the manufacturing method in FIG. 11 (first step) and FIG. 12 (second step), which are the steps of manufacturing the frame 46 according to the first embodiment.

In the frame 946 not using the configuration according to the first embodiment, the uneven fitting portion 45g in the frame 46 of the first embodiment is not included in the output conductive path 945, as illustrated in FIG. 16 and FIG. 17. Therefore the following problem may occur.

Figure 38:
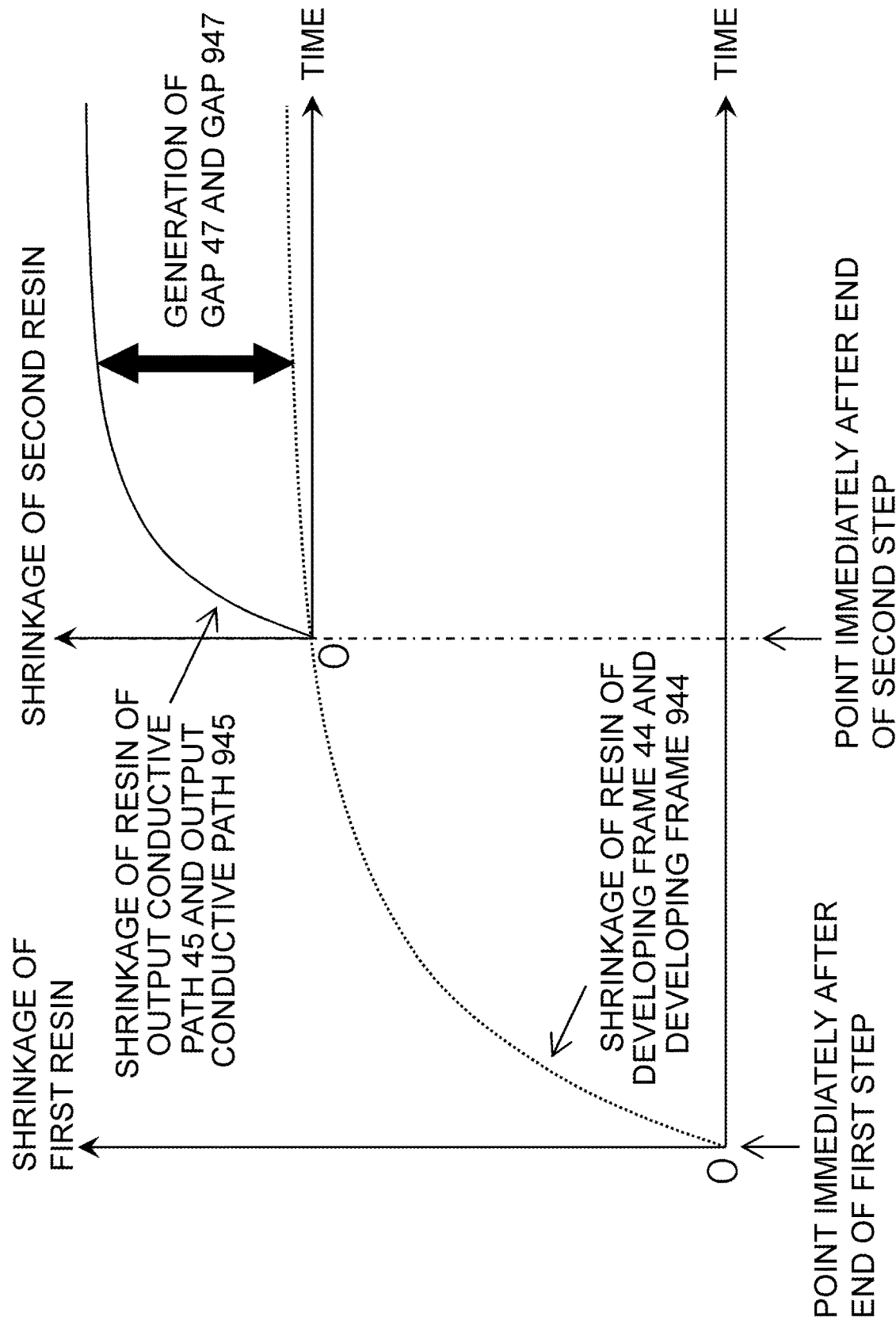
FIG. 38 is a conceptual diagram depicting an example of the shrinkage of resin in the frame that is not the configuration according to the first embodiment.

This problem will be described with reference to FIG. 18 and FIG. 38. FIG. 38 is a conceptual diagram (graph) for explaining the shrinkage of resin in the frame 46 according to the first embodiment, and in the frame 946 not having the configuration according to the first embodiment. The above-mentioned problem occurs because in the step of manufacturing the frame 946, a time difference is generated between the first step (corresponds to FIG. 11 which is a step of manufacturing the frame 46 according to the first embodiment) and the second step (corresponds to FIG. 12).

In the first step, the first resin portion 944a is injection-molded by injecting a first resin in order to embed the conductive sheet 943 in the frame 946, and the developing frame 944 is formed, whereby the developing frame 944 and the conductive sheet 943 are integrally insert-molded. Then as time elapses, the developing frame 944 shrinks due to the shrinkage of the first resin. As depicted in the graph in FIG. 38, where the abscissa is time and the ordinate is the shrinkage of the first resin, the shrinkage of the resin of the developing frame 944, indicated by the dotted line, has a tendency in which the shrinkage speed is initially fast, and later is slower (shrinks gradually).

In the second step, the second resin portion 945d is injection-molded by injecting the second resin into a space created by the conductive sheet 943, the developing frame 944 and the mold, and the output conductive path 945 is formed, thereby the output conductive path 945 and the developing frame 944 are integrally outsert-molded. Here too, as time elapses, the output conductive path 945 shrinks due to the shrinkage of the second resin. In this case as well, as depicted in the graph in FIG. 38, where the abscissa is time and the ordinate is the shrinkage of the second resin, the shrinkage of the resin of the output conductive path 945, indicated by the solid line, has a tendency in which the shrinkage speed is initially fast, and later is slower (shrinks gradually), just like the developing frame 44.

In the second step, the output conductive path 945, constituted of the second resin portion 945d having a high shrinkage speed, is disposed in the developing frame 944, constituted of the first resin portion 944a of which shrinkage speed is slowing down. Therefore when the second step ends and time elapses, a gap 947 may be generated between the developing frame 944 and the output conductive path 945, as illustrated in FIG. 18. This gap 947 is, as depicted in FIG. 38, a difference between the shrinkage of the resin of the output conductive path 945 indicated by the solid line, and the shrinkage of the resin of the developing frame 944 indicated by the dotted line, and is an amount indicated by the large arrow mark in FIG. 38.

Here it is assumed that the edge of the conductive sheet 943 is peeled from the developing frame 944 due to impact or the like, as illustrated in FIG. 18, and the peeled portion 943b is generated (e.g. a case of external impact applied while transporting the process cartridge 902 or the developer container 964). If the gap 947 is generated in this case, the inside (upper side of the paper surface in FIG. 18) and the outside (lower side of the paper surface in FIG. 18) of the developer container 964 are connected, as indicated by the arrow mark X in FIG. 18, via the peeled portion 943b of the conductive sheet 943 and the gap 947. As a result, a leak path X of the developer may be generated.

As a result, the developer may leak from the developer container 964, and if the developer leaks to the outside, not only the exterior of the developer container 964 but also the exterior of the process cartridge 902 and the inside of the printer 901 may be contaminated by the developer. Further, the hands of the user may become soiled when the developer container 964 or the process cartridge 902 is attached or detached, and operation by the user may be interrupted.

The above problem may occur in the frame 946 not using the configuration according to the first embodiment. Next the frame 846 will be described with reference to FIG. 19, FIG. 20 and FIG. 21 as another example of not using the configuration according to the first embodiment.

Figure 19:
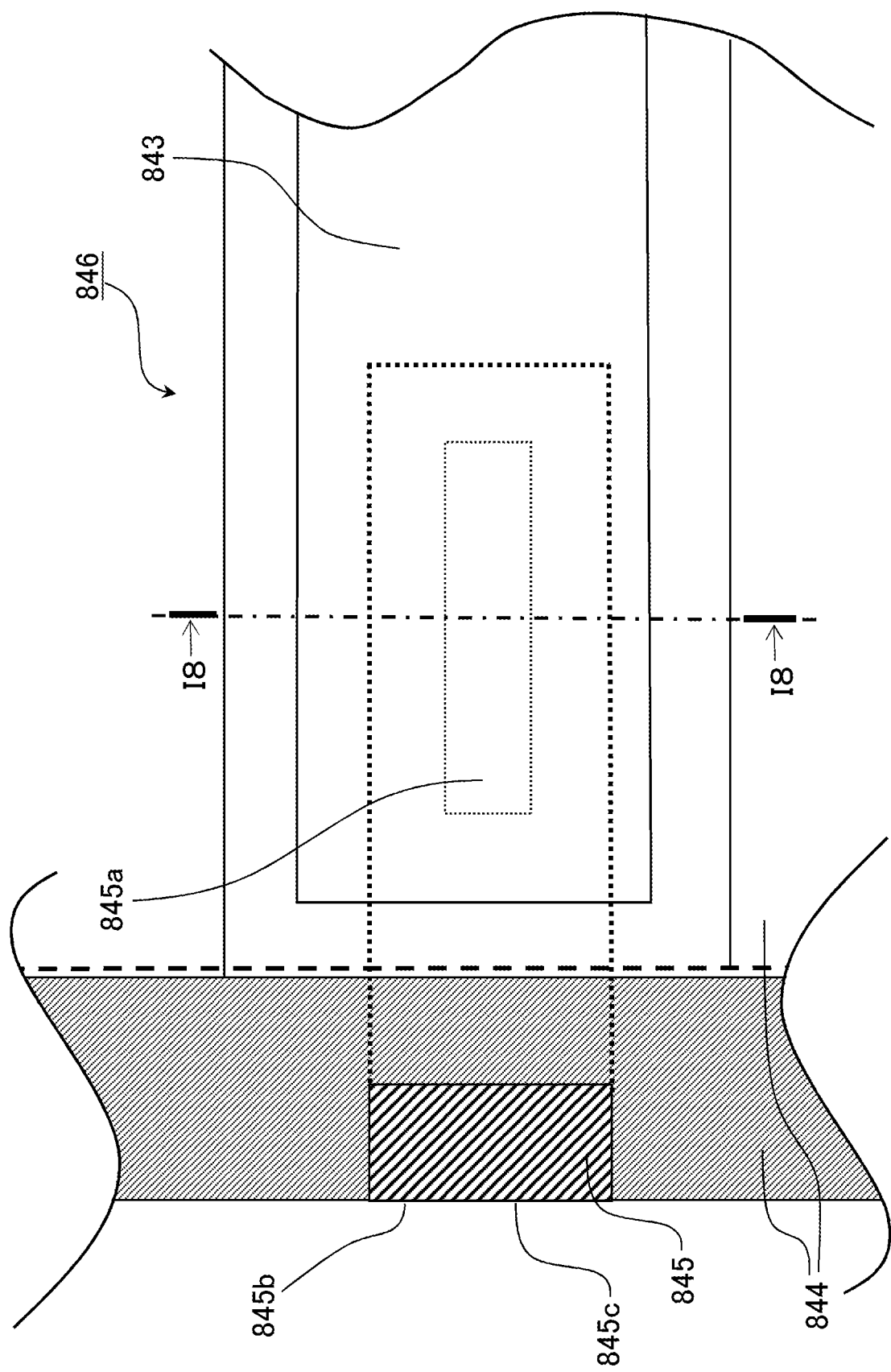
FIG. 19 is a detailed diagram depicting a part of the frame that is not using the configuration according to the first embodiment.
Figure 20:
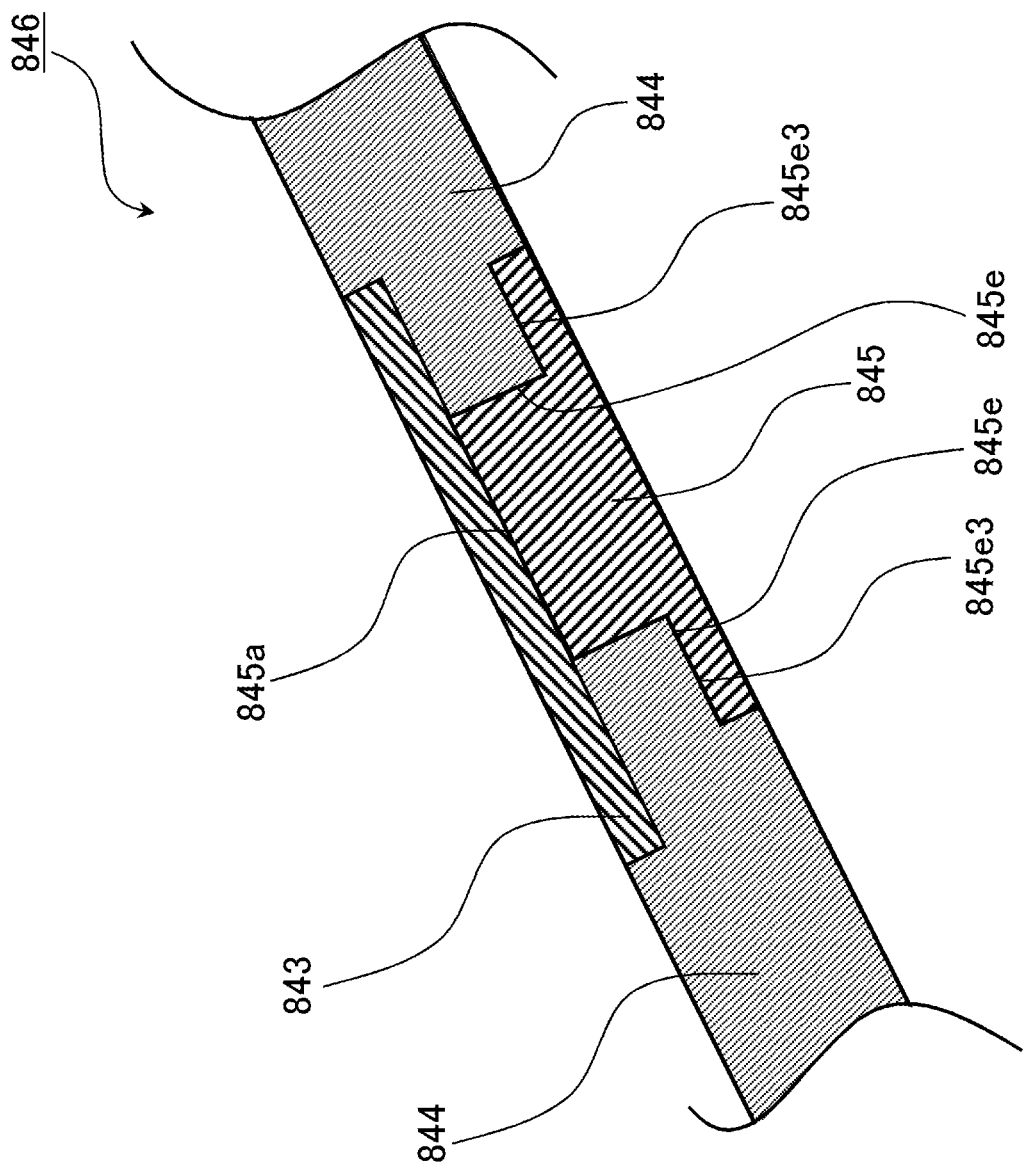
FIG. 20 is a cross-sectional view depicting a part of the frame that is not using the configuration according to the first embodiment.
Figure 21:
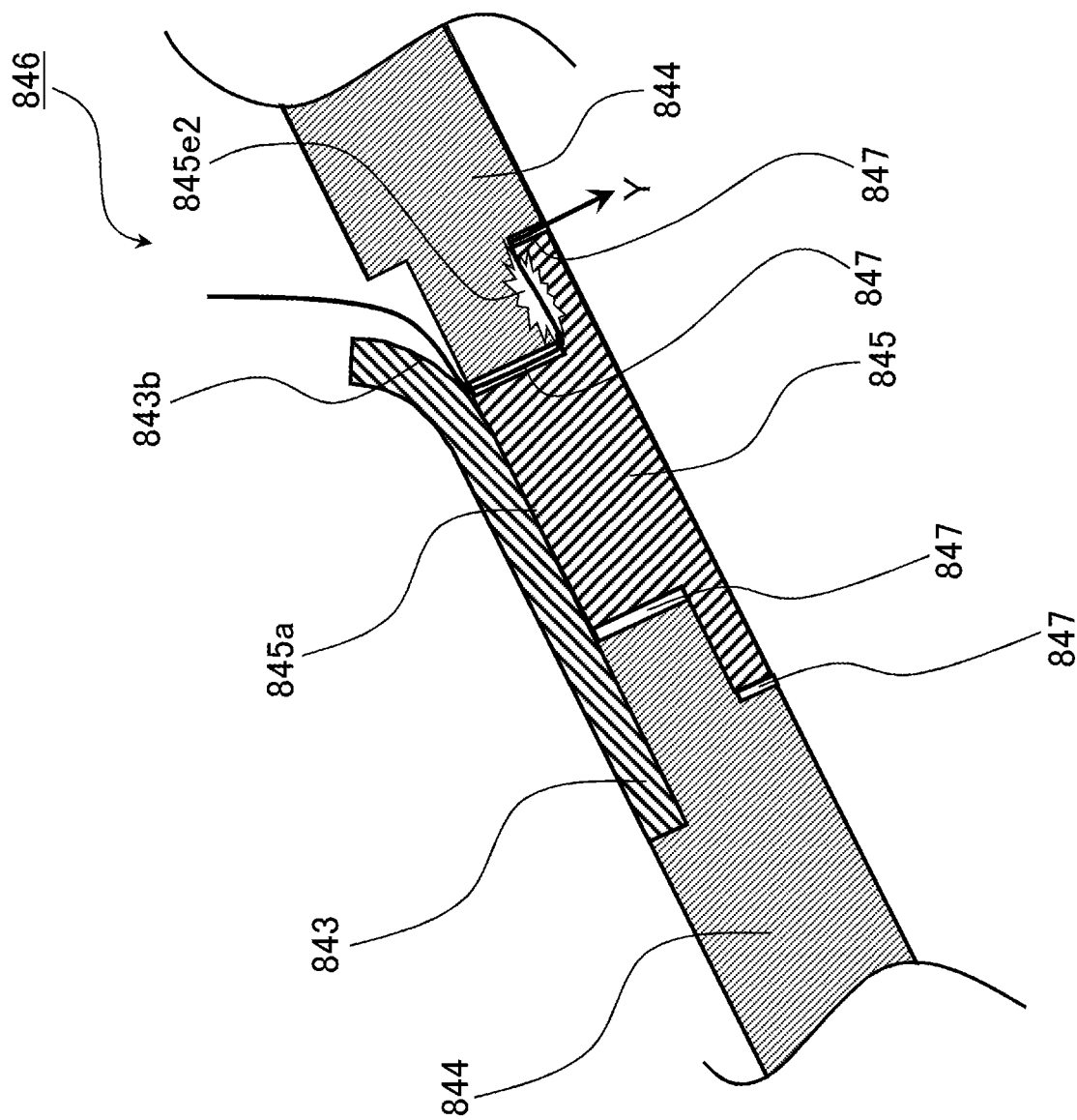
FIG. 21 is a cross-sectional view depicting a part of the frame that is not using the configuration of the first embodiment and a problem thereof.

FIG. 19 is a detailed diagram depicting a part of the frame 846 not using the configuration according to the first embodiment. FIG. 19 corresponds to FIG. 7, which is a detailed diagram depicting a part of the frame 46 according to the first embodiment, and to FIG. 16, which is a detailed diagram depicting a p art of the frame 946 not using the configuration according to the first embodiment. FIG. 20 is a cross-sectional view depicting a part of the frame 846 not using the configuration according to the first embodiment. FIG. 20 is a cross-section at the I8-I8 line in FIG. 19, and corresponds to FIG. 10, which illustrates a part of the frame 46 according to the first embodiment, and to FIG. 17, which illustrates the frame 946 not using the configuration according to the first embodiment. FIG. 21 is a cross-sectional view depicting a part of the frame 846 not using the configuration according to the first embodiment, and a problem thereof, and is a cross-section at the I8-I8 line in FIG. 19, just like FIG. 20. FIG. 21 corresponds to FIG. 14, which is a cross-sectional view depicting a part of the frame 46 according to the first embodiment, and a later mentioned effect thereof, and to FIG. 18, which illustrates a part of the frame 946 not using the configuration according to the first embodiment, and a problem thereof.

In FIG. 19, FIG. 20 and FIG. 21 which illustrate the frame 846 not using the configuration according to the first embodiment, a reference sign of each composing element starts with "8" which is added to the beginning of each reference sign according to the first embodiment. For example, the frame 46 according to the first embodiment is the frame 846, as mentioned above, in the frame not using the configuration according to the first embodiment. In the reference sign indicating a position in a cross-section in FIG. 19, FIG. 20 and FIG. 21, "8" is added after the reference sign in the first embodiment. For example, the cross-section at the I-I line in the frame 46 according to the first embodiment is indicated as the cross-section at the I8-I8 line in the frame 846, as mentioned above. The other items of the frame 846 not using the configuration according to the first embodiment are the same as those of the frame 46 according to the first embodiment, and description thereof is omitted. The manufacturing method of the frame 846 is the same as the manufacturing method in FIG. 11 (first step) and FIG. 12 (second step), which are the steps of manufacturing the frame 46 according to the first embodiment.

A configuration of the frame 846 not using the configuration according to the first embodiment will be described first. In the frame 846 as well, just like the frame 946 not using the configuration according to the first embodiment, the uneven fitting portion 45g in the frame 46 of the first embodiment is not included in the output conductive path 845, as illustrated in FIG. 19 and FIG. 20. Further, unlike the frame 946, a step difference 845e3 is formed in the boundary portion 845e in the output conductive path 845 of the frame 846. Here, as illustrated in the cross-section in FIG. 20, the step difference 845e3 is a portion where the boundary portion 845e is formed in an area from the outside to the inside of the frame 846 (on the conductive sheet 843 side). The step difference 845e3 is also a portion extending along the joining surface between the conductive sheet 843 and the output conductive path 845 in the conductive portion 845a.

In the frame 846 not using the configuration according to the first embodiment as well, the following problem may occur, just like the frame 946 not using the configuration according to the first embodiment.

This problem will be described with reference to FIG. 21. Just like the step of manufacturing the frame 946, this problem occurs also in the step of manufacturing the frame 846, because of a time difference generated between the first step (corresponds to FIG. 11 which is a step of manufacturing the frame 46 according to the first embodiment), and the second step (corresponds to FIG. 12). In concrete terms, just like the case of the frame 946, in the second step, the output conductive path 845 constituted of the second resin portion 845d having a high shrinkage speed is disposed in the developing frame 844 constituted of the first resin portion 844a of which shrinking speed is slowing down. Therefore when the second step ends and time elapses, a gap 847 may be generated between the developing frame 844 and the output conductive path 845, as illustrated in FIG. 21.

Here it is assumed that the edge of the conductive sheet 843 has peeled from the developing frame 844 due to impact or the like, as illustrated in FIG. 21, and the peeled portion 843b is generated (e.g. a case of external impact applied while transporting the process cartridge 802 or the developer container 864). In this case, peeling 845e2 is generated at a step difference 845e3 of the boundary portion 845e of the output conductive path 845. Then the gap 847 is generated between the developing frame 844 and the output conductive path 845. Then the inside (upper side in FIG. 21) and the outside (lower side in FIG. 21) of the developer container 864 are connected, as indicated by the arrow mark Y in FIG. 21, via the peeled portion 843b of the conductive sheet 843, and the gap 847, and the peeled portion 845e2 of the boundary portion 845e. As a result, a leakage path Y of the developer may be generated. The probability of the generation of the leakage path Y of the developer is less than the probability of the generation of the leakage path X of the developer, described in the frame 946 not using the configuration according to the first embodiment, but probability is not zero.

As a result, the developer may leak from the developer container 864, because of the leakage path Y of the developer. Therefore even in the case of the frame 846 not using the configuration according to the first embodiment, the hands of the user may become soiled when attaching or detaching the developer container 864 or the process cartridge 802, just like the case of the frame 946, and the operation of the user may be interrupted.

The above is a problem that may occur in the frame 846 not using the configuration according to the first embodiment.

Effect of Using Frame 46 According to the First Embodiment

The effect of reducing the probability of an occurrence of the above-mentioned problem, implemented by including the uneven fitting portion 45g in the output conductive path 45 in the frame 46 according to the first embodiment, will be described. This effect will be described while comparing the frame 846 with the frame 946 and the frame 846, which do not use the configuration according to the first embodiment, with reference to FIG. 9, FIG. 12, FIG. 13, FIG. 14 and FIG. 15.

FIG. 9 is a cross-sectional view depicting a part of the frame 46 according to the first embodiment, and is a cross-section at the H-H line indicated in FIG. 4 and FIG. 7.

Figure 13:
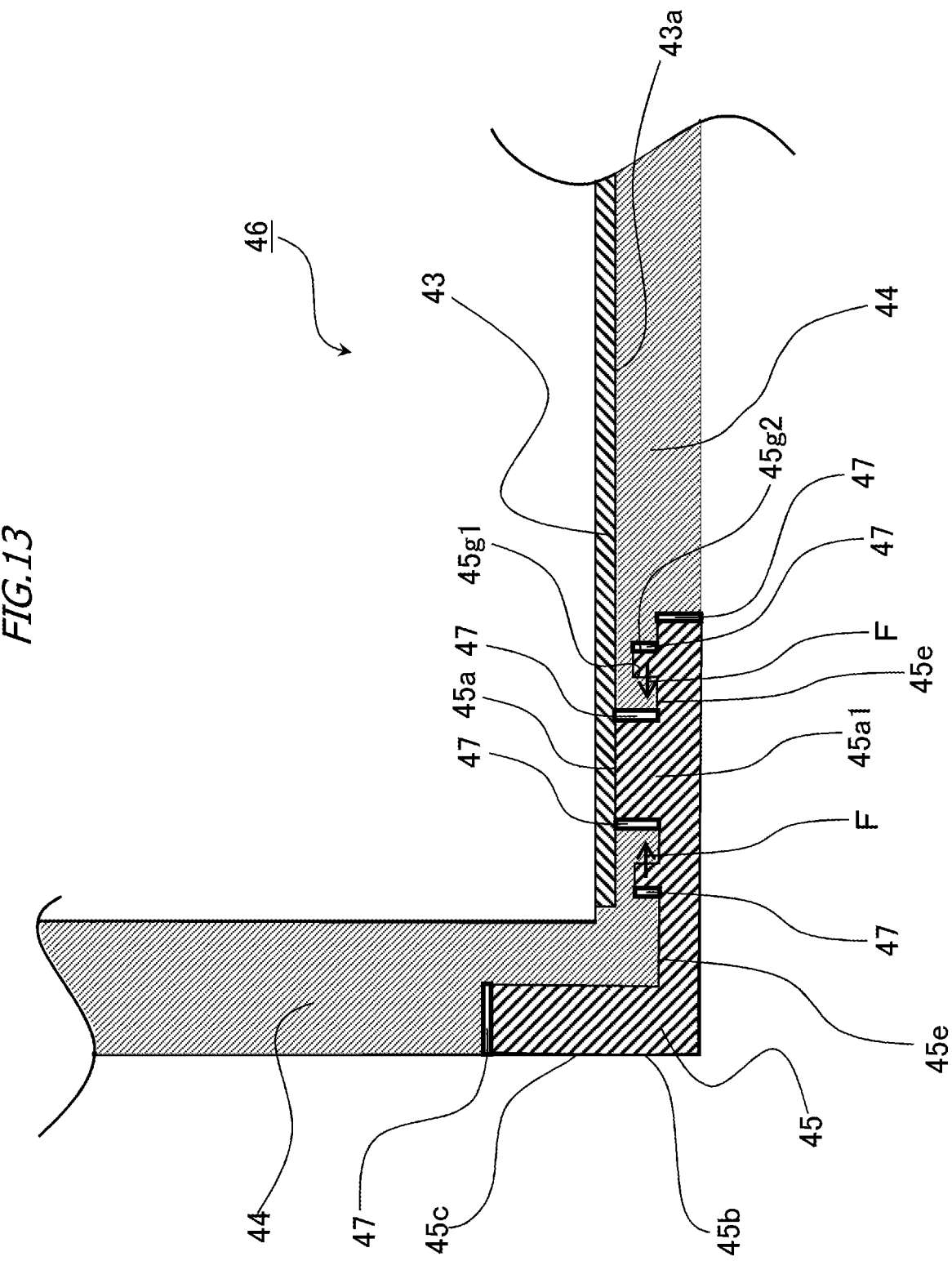
FIG. 13 is a cross-sectional view depicting a part of the frame according to the first embodiment and the effect thereof.

FIG. 13 is a cross-sectional view depicting a part of the frame 46 according to the first embodiment, and the effect thereof. FIG. 13 is equivalent to FIG. 8, and is a cross-section at the H1-H1 line indicated in FIG. 4 and FIG. 7.

Figure 14:
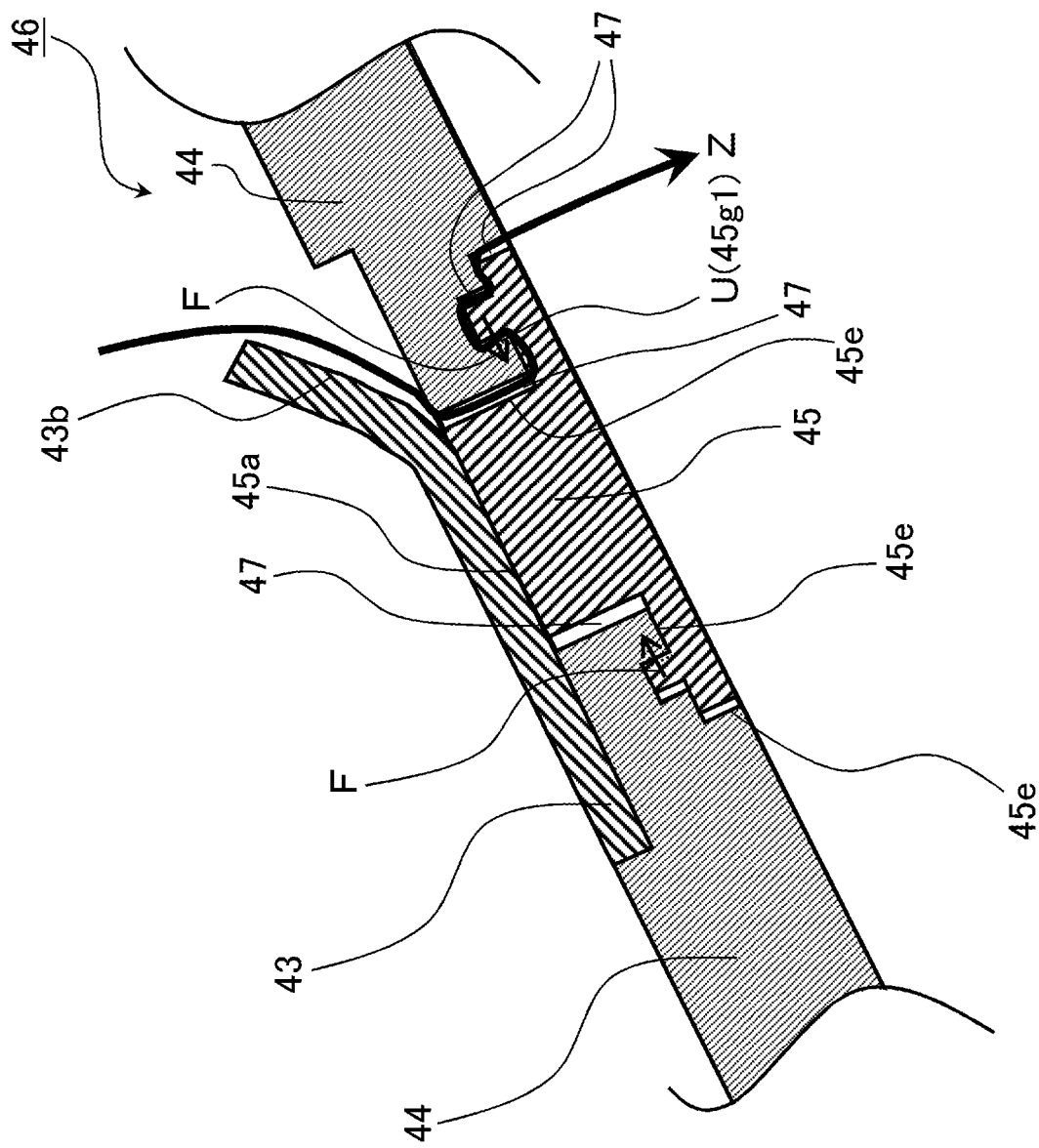
FIG. 14 is a cross-sectional view depicting a part of the frame according to the first embodiment and the effect thereof.

FIG. 14 is a cross-sectional view depicting a part of the frame 46 according to the first embodiment, and the effect thereof. FIG. 14 is equivalent to FIG. 10, and is a cross-section at the I-I line indicated in FIG. 7. FIG. 14 is also used to compare with FIG. 18 and FIG. 21 described above, regarding the problems of the frame 946 and the frame 846, which do not use the configuration according to the first embodiment.

Figure 15:
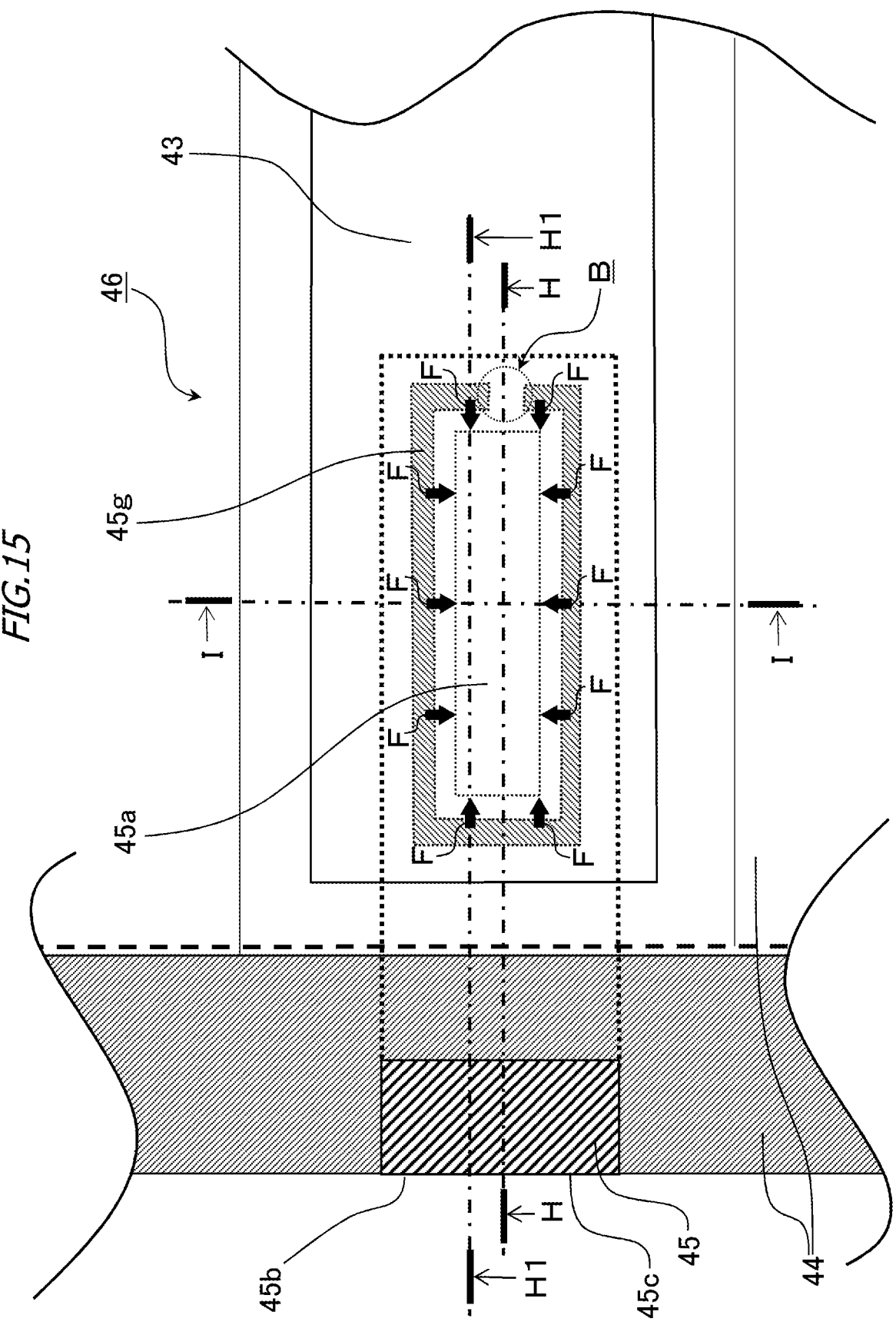
FIG. 15 is a detailed diagram depicting a part of the frame according to the first embodiment and the effect thereof.

FIG. 15 is a detailed diagram depicting a part of the frame 46 according to the first embodiment, and the effect thereof. FIG. 15 is equivalent to FIG. 7, and is a detailed diagram of the portion A in the developing apparatus 40 in FIG. 5.

An effect of including the uneven fitting portion 45g in the output conductive path 45 in the frame 46 according to the first embodiment will be described with reference to FIG. 9, FIG. 12, FIG. 13, FIG. 14 and FIG. 15.

The position of the uneven fitting portion 45g will be described first, with reference to FIG. 13 and FIG. 14. As described above, in FIG. 13, in the boundary portion 45e, the uneven fitting portion 45g is disposed on one side of the conductive portion 45a (e.g. left side of the paper surface) and on the other side of the conductive portion 45a (e.g. right side of the paper surface) respectively, as mentioned above. Further, in FIG. 14 as well, in the boundary portion 45e, the uneven fitting portion 45g is disposed on one side of the conductive portion 45a (e.g. left side of the paper surface) and on the other side of the conductive portion 45a (e.g. right side of the paper surface).

Phenomena generated during the step of manufacturing the frame 46 and the effect of disposing the uneven fitting portion 45g will be described next.

As described above, the phenomena generated in the step of manufacturing the frame 46 is the same as the case of the frame 946 and the frame 846, which do not use the configuration according to the first embodiment. Just like the case of the frame 946 and the frame 846, this phenomena is generated in the step of manufacturing the frame 46 as well, because of the time difference between the first step (FIG. 11) and the second step (FIG. 12) of manufacturing of the frame 46. In concrete terms, just like the case of the frame 946 and the frame 846, the output conductive path 45 constituted of the second resin portion 45d having a high shrinkage speed is disposed in the second step in the developing frame 44 constituted of a first resin portion 44a, of which shrinkage speed is lowering. Therefore when the second step ends and time elapses, a gap 47 may be generated between the developing frame 44 and the output conductive path 45, as illustrated in FIG. 13 and FIG. 14. Thus in the step of manufacturing the frame 46, the gap 47 may be generated in a part of the boundary portion 45e due to the shrinkage of the resin of the output conductive path 45. The gap 47 is formed by the developing frame 44, the output conductive path 45 and the conductive sheet 43. This gap 47 connects to the joining surface of the conductive sheet 43 and the output conductive path 45, and extends toward the outside of the frame 46.

Here it is assumed that the edge of the conductive sheet 43 is peeled from the developing frame 44 due to impact or the like, as illustrated in FIG. 14, and the peeled portion 43b is generated (e.g. a case of external impact applied while transporting the process cartridge 2 or the developer container 64). In this case, if the gap is generated in the frame 946 or the frame 846, the leakage path X or the leakage path Y of the developer may be generated respectively, but in the case of the frame 46 according to the first embodiment, the uneven fitting portion 45g is disposed, even if the gap 47 is generated. Therefore the probability of generating the leakage path Z of the developer illustrated in FIG. 14 can be minimized. In other words, in the case of the frame 46 according to the first embodiment, the following effect can be implemented by disposing the uneven fitting portion 45g of the output conductive path 45 on both sides of the conductive portion 45a.

The uneven fitting portion 45g is a part of the boundary portion 45e where the developing frame 44 and the output conductive path 45 fit with each other in the direction intersecting the conductive portion 45a (joining surface). Further, the uneven fitting portion 45g includes a contact face 45g1 where the developing frame 44 and the output conductive path 45 contact with each other. The contact face 45g1 is a face that is formed in the developing frame 44 and the output conductive path 45 respectively when the resin of the output conductive path 45, injected into the uneven fitting portion 45g, shrinks toward the developing frame 44. The contact face 45g1 is a face facing the gap 47, disposed in a direction along the joining surface, between the conductive sheet 43 and the output conductive path 45, that is, the direction parallel with the joining surface. Here in the output conductive path 45, where the injection amount of the resin 45a1 is more than the injection amount of the resin to the uneven fitting portion 45g when the resin of the output conductive path 45 is injected, is formed when viewed in the normal direction of the joining surface with the conductive sheet 43. The region 45a1 is a rectangular-parallelepiped portion of which top face is the joining surface of the conductive portion 45a. The contact face 45a1 of the developing frame 44 is disposed in a position sandwiched between the region 45a1 and the contact face 45g1 of the output conductive path 45. Therefore the resin of the output conductive path 45, injected into the uneven fitting portion 45g, shrinks toward the region 45a1 where the injection amount is more. As a result, the contact face 45g1 of the output conductive path 45 and the contact face 45g1 of the developing frame 44 contact with each other due to the shrinkage of the resin of the output conductive path 45, as indicated by the shrinking direction F toward the conductive portion 45a in FIG. 13, FIG. 14 and FIG. 15. To differentiate, the contact face 45g1 of the developing frame 44 corresponding to the first frame may be called the first contact face, and the contact face 45g1 of the output conductive path 45 corresponding to the second frame may be called the second contact face.

In this way, the uneven fitting portion 45g is formed by the boundary portion 45e between the developing frame 44 and the output conductive path 45, and the contact face 45g1 is formed as a surface of the developing frame 44 and the surface of the output conductive path 45 respectively in the boundary portion 45e. This contact portion can seal the developer when the resin of the output conductive path 45, injected into the uneven fitting portion 45g, shrinks, and the contact face 45g1 of the output conductive path 45 and the contact face 45g1 of the developing frame 44 contact with each other. The gap 47 may be generated in a part of the boundary portion 45e, but on the other hand, a portion to seal the developer is also generated by the contact between the contact face 45g1 of the output conductive path 45 and the contact face 45g1 of the developing frame 44. As a result, the contact face 45g1 of the output conductive path 45 and the contact face 45g1 of the developing frame 44 contact with each other in the uneven fitting portion 45g, which is formed in a part of the leakage path Z of the developer. Because of this, it is more likely that the leakage path Z of the developer is blocked by this contact portion (portion indicated by "U" in FIG. 14).

Further, as illustrated in FIG. 7, the joining surface between the conductive sheet 43 and the output conductive path 45 in the conductive portion 45a is disposed inside the conductive sheet 43 when viewed in the normal direction of the joining surface (vertical direction to the paper surface). Furthermore, the uneven fitting portion 45g is disposed along the shorter side 43c of the conductive sheet 43, on the side of the joining surface in the longitudinal direction of the conductive sheet 43. By disposing the uneven fitting portion 45g on the leakage path of the developer in a portion where it is most likely that the conductive sheet 43 peels off, and the peeled portion and the conductive portion 45a are connected, the effect of the uneven fitting portion 45g blocking the leakage path of the developer can be further improved.

The uneven fitting portion 45g will be further described with reference to FIG. 9 and FIG. 15. FIG. 9 is a cross-sectional view depicting a cross-section at the H-H line indicated in FIG. 7. In any of the cross-sections passing through the conductive portion 45a, the uneven fitting portion 45g may be disposed only on the one side (e.g. left side on the paper surface) or on the other side (e.g. right side on the paper surface) of the conductive portion 45a. Normally the second region (conductive region), which is a material of the output conductive path 45, is more expensive than the first resin, which is a material of the developing frame 44. If the uneven fitting portion 45g is disposed only on one side of the conductive portion 45a, the amount of the second resin to be used and the cost of the second resin can be minimized. As illustrated in FIG. 15, if the adhesive force of the second resin to the developing frame 44 in the shrinking direction F toward the conductive portion 45a can be assured, the size and cross-sectional shape of the uneven fitting portion 45g can be appropriately determined by the shrinkage of the resin of the output conductive path 45 and the like. In FIG. 15, the region, not including the uneven fitting portion 45g, is a region indicated by "B", but the position of a region and a number of the regions is not limited to these in FIG. 15, but may be appropriately determined.

Further, as illustrated in FIG. 13, the uneven fitting portion 45g includes a counter surface 45g2 for the developing frame 44 and the output conductive path 45 to contact with each other, when the resin of the output conductive path 45 shrinks, and the contact face 45g1 of the output conductive path 45 and the counter surface 45g1 of the developing frame 44 contact with each other. A gap 47 is formed between the contact face 45g2 and the developing frame 44. By forming the uneven fitting portion 45g like this, the contact face 45g1 of the output conductive path 45 and the contact face 45g1 of the developing frame 44 contact with each other to block the leakage path of the developer when the resin of the output conductive path 45, injected into the uneven fitting portion 45g, shrinks. In the above description, it is assumed that the resin of the output conductive path 45 shrinks toward the conductive portion 45a. However, in FIG. 13, the region, where the injection amount of the resin to the output conductive path 45 is more than the injection amount of the resin to the uneven fitting portion 45g, may be formed on the opposite side of the region 45a1 with respect to the uneven fitting portion 45g. In this case it is assumed that the resin injection amount to this region is sufficiently more than the resin injection amount to the region 45a1. Here the resin injected to the uneven fitting portion 45g shrinks in a direction that departs from the region 45a1 (opposite direction of the direction indicated by "F" in FIG. 13). However, even in this case, the relationship between the contact face 45g1, where the developing frame 44 and the output conductive path 45 are in contact with each other and the gap 47, and the relationship between the contact face 45g1, where the developing frame 44 and the output conductive path 45 are in contact with each other, and the counter surface 45g2, in the uneven fitting portion 45g, are reversed. In other words, the contact face in this case is a face that is more distant from the gap 47, out of the two faces of the uneven fitting portion 45g facing the gap 47, in the direction where the gap 47 and the two facing faces are disposed. Then the resin injected into the uneven fitting portion 45g can contact the contact face when the resin shrinks, so as to block the leakage path of the developer.

Thus according to the first embodiment, a probability of the developer leaking out of the developer container 64 to the outside can be reduced, and a probability of the exterior of the process cartridge 2 and the inside of the printer 1 being contaminated by the developer can be reduced. Furthermore, a probability of the hands of the user becoming soiled by the developer when attaching or detaching the developer container 64 or the process cartridge 2 can be reduced.

Second Embodiment

The second embodiment will be described next with reference to FIG. 22, FIG. 23 and FIG. 24.

Figure 22:
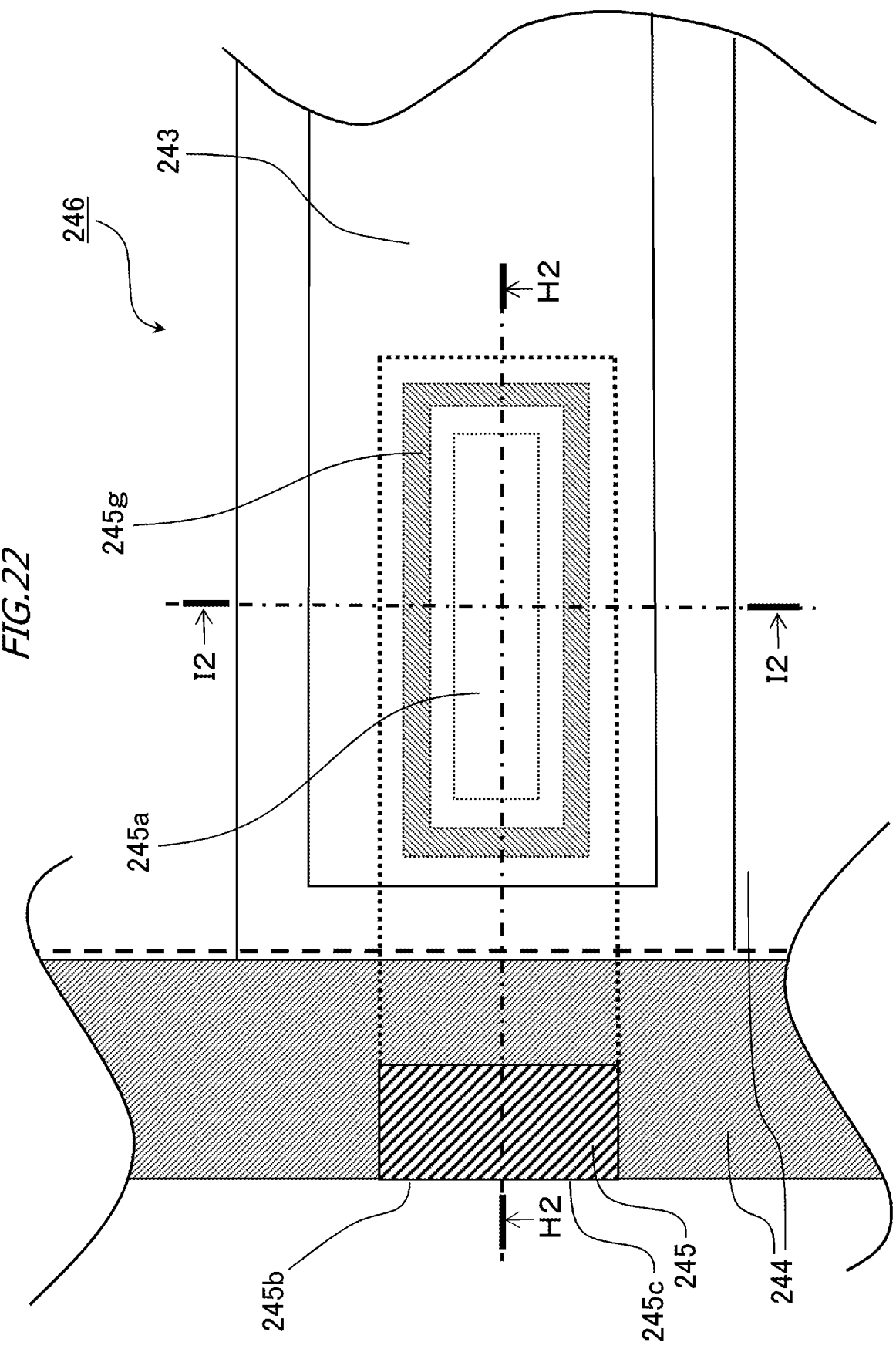
FIG. 22 is a detailed diagram depicting a part of a frame according to a second embodiment.

FIG. 22 is a detailed diagram depicting a part of the frame 246 according to the second embodiment, and corresponds to FIG. 7, which is a detailed diagram depicting a part of the frame 46 according to the first embodiment (detailed diagram depicting the portion A of the cross-section at the E-E line). FIG. 23 is a cross-sectional view depicting a part of the frame 246 according to the second embodiment, sectioned at the H2-H2 line indicated in FIG. 22, and corresponds to FIG. 8, which is a cross-sectional view depicting a part of the frame 46 according to the first embodiment. FIG. 24 is a cross-sectional view depicting a part of the frame 246 according to the second embodiment, which is a cross-section at the I2-I2 line indicated in FIG. 22, and corresponds to FIG. 10, which is a cross-sectional view depicting a part of the frame 46 according to the first embodiment. In FIG. 22, FIG. 23 and FIG. 24 depicting the second embodiment, a reference sign of each composing element starts with "2" which is added to the beginning of each reference sign according to the first embodiment. For example, the developing frame 44 according to the first embodiment is the developing frame 244 according to the second embodiment. In the following, description on a portion the same as the frame 46 according to the first embodiment will be omitted.

Figure 23:
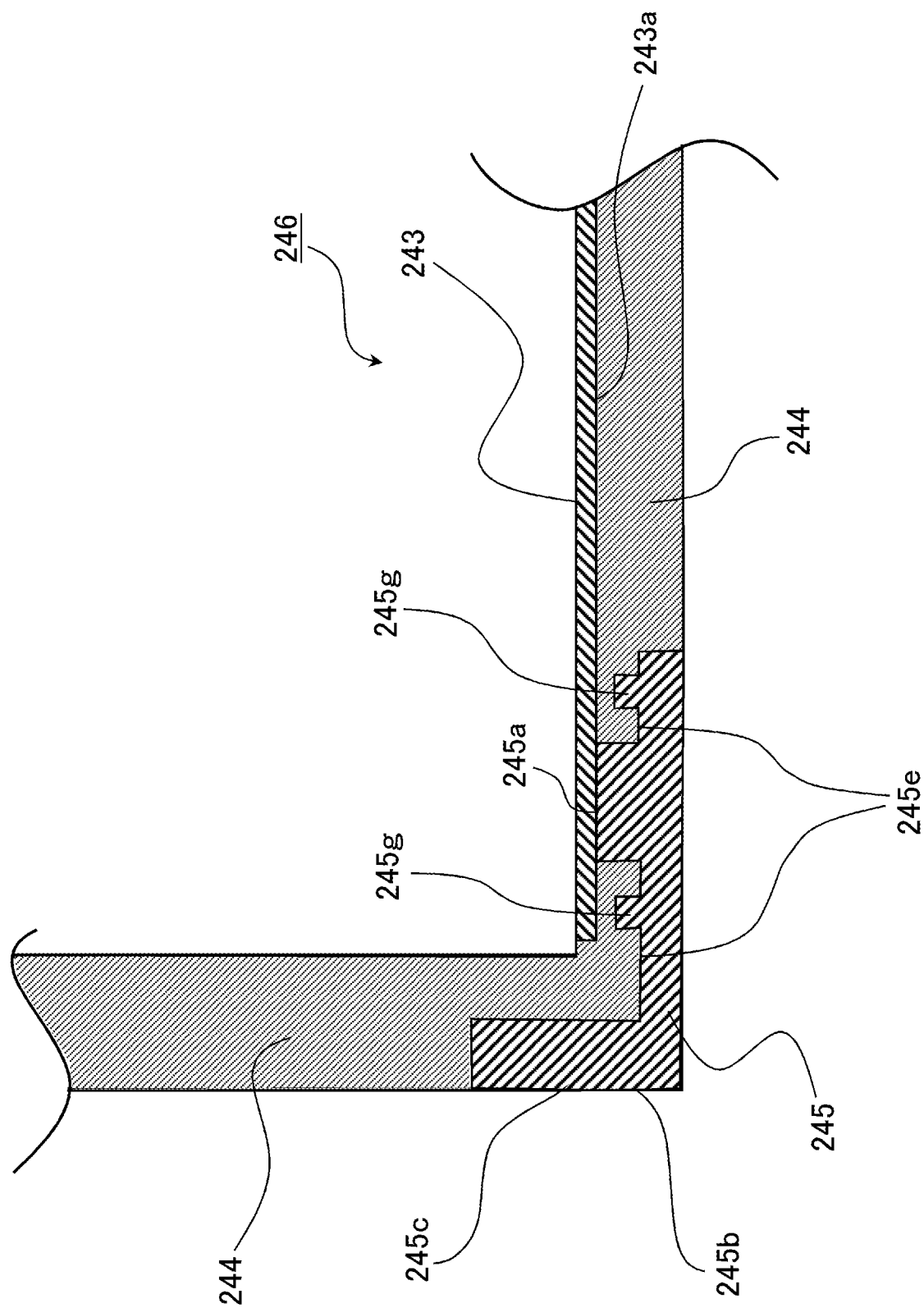
FIG. 23 is a cross-sectional view depicting a part of the frame according to the second embodiment.
Figure 24:
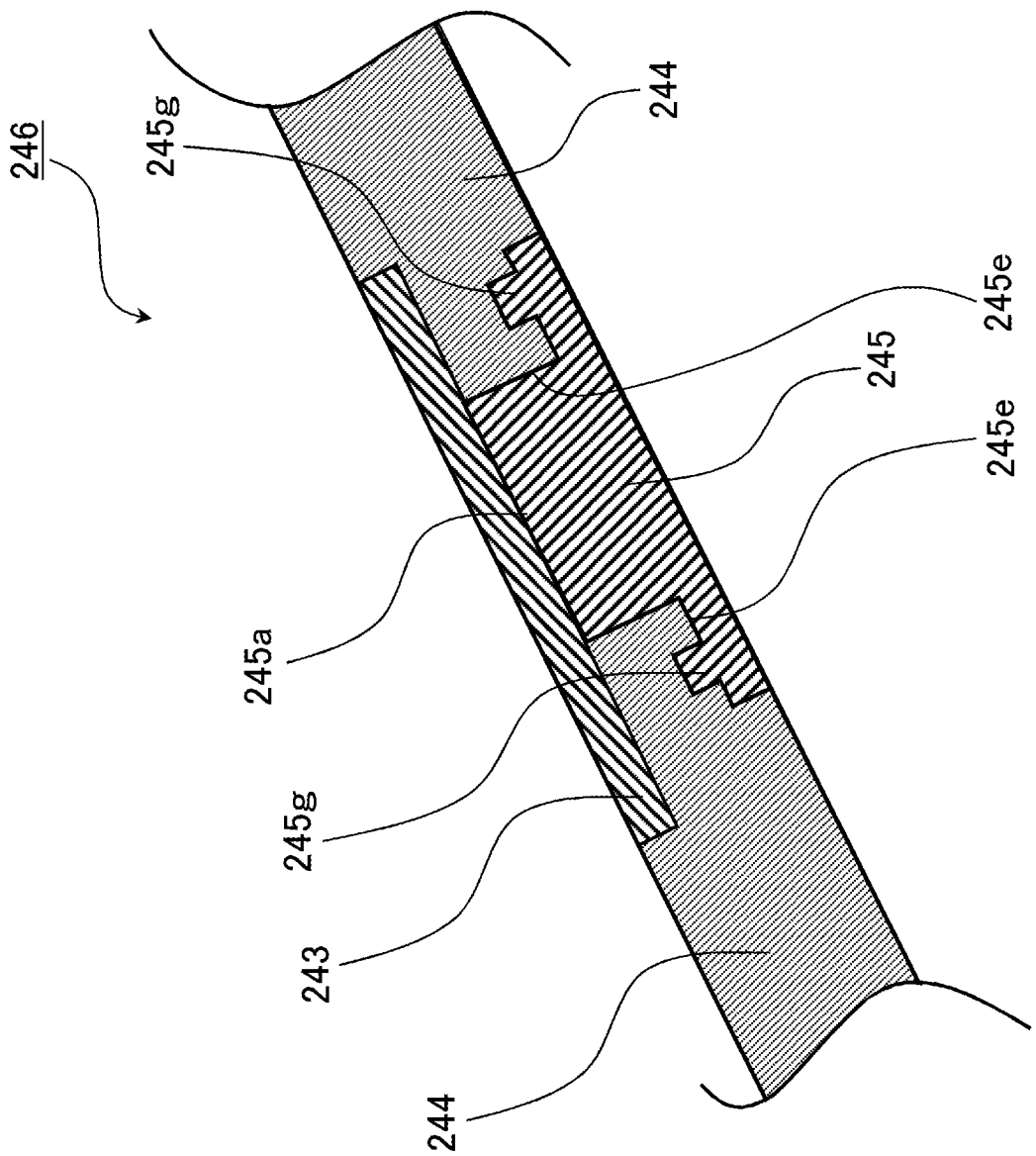
FIG. 24 is a cross-sectional view depicting a part of the frame according to the second embodiment.

In the frame 246 according to the second embodiment, the uneven fitting portion 445g is disposed so as to completely surround the conductive portion 245a, as illustrated in FIG. 22, FIG. 23 and FIG. 24. In the frame 46 according to the first embodiment, a region where the uneven fitting portion 45g is not formed (region indicated by "B" in FIG. 15), exists, but no such region exists in the frame 246 according to the second embodiment. Compared with the frame 46 according to the first embodiment, in the case of the frame 246 according to the second embodiment, a stronger adhesive force to the developing frame 244 can be ensured by shrinkage of the second resin used for the output conductive path 245 in the shrinking direction F (not illustrated in FIG. 22). Further, the effect of blocking the leakage path of the developer by the uneven fitting portion 445g can be improved.

Thus according to the second embodiment as well, a probability of the developer leaking out of the developer container 264 to outside can be reduced, and a probability of the exterior of the process cartridge 202 and the inside of the printer 201 being contaminated by the developer can be reduced. Furthermore, a probability of the hands of the user becoming soiled by the developer when attaching or detaching the developer container 264 or the process cartridge 2 can be reduced.

Third Embodiment

Figure 26:
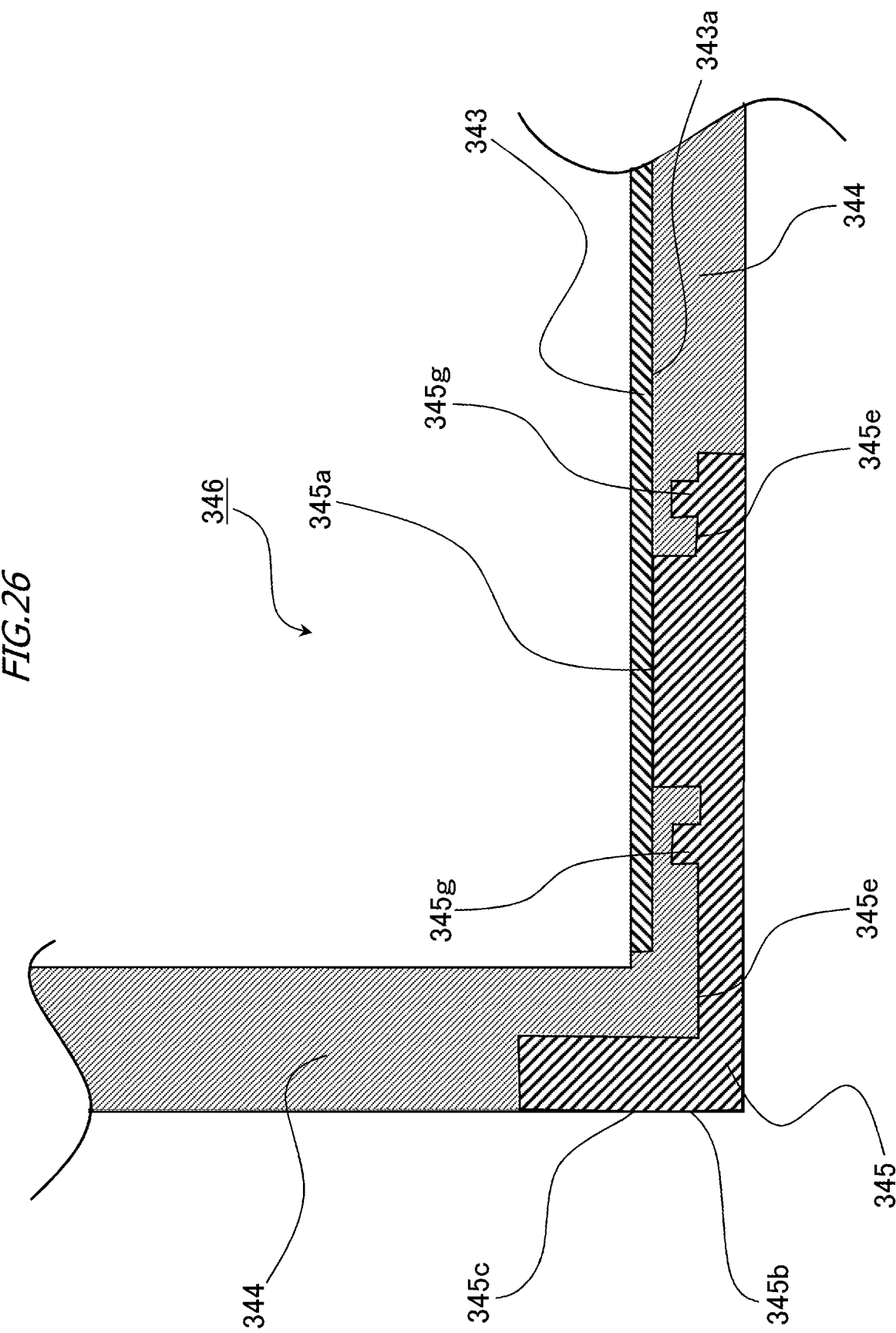
FIG. 26 is a cross-sectional view depicting a part of the frame according to the third embodiment.
Figure 27:
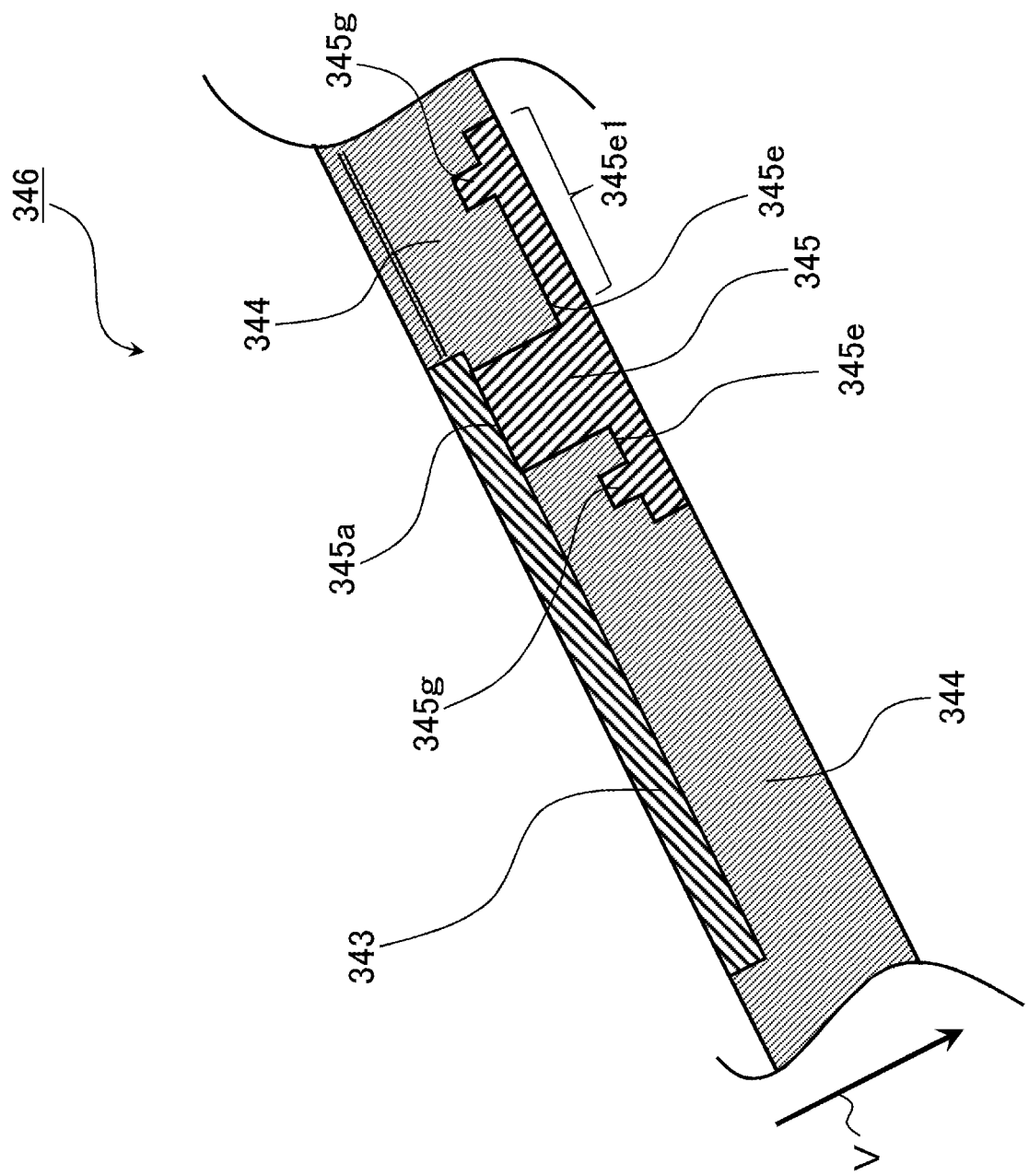
FIG. 27 is a cross-sectional view depicting a part of the frame according to the third embodiment.

The third embodiment will be described next with reference to FIG. 25, FIG. 26 and FIG. 27.

Figure 25:
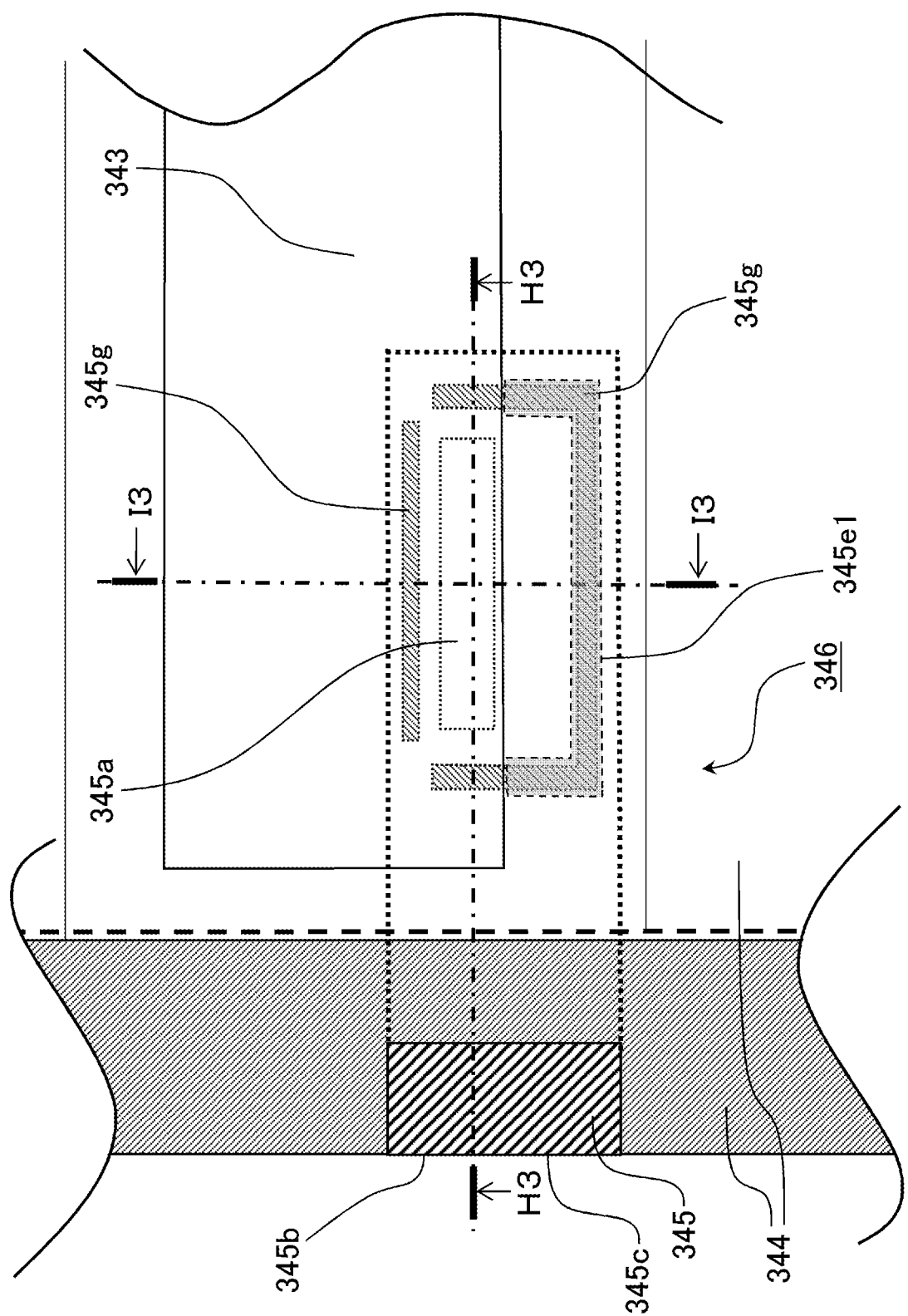
FIG. 25 is a detailed diagram depicting a part of a frame according to a third embodiment.

FIG. 25 is a detailed diagram depicting a part of the frame 346 according to the third embodiment, and corresponds to FIG. 7, which is a detailed diagram depicting a part of the frame 46 according to the first embodiment (detailed diagram depicting the portion A of the cross-section at the E-E line). FIG. 26 is a cross-sectional view depicting a part of the frame 346 according to the third embodiment, sectioned at the H3-H3 line indicated in FIG. 25, and corresponds to FIG. 8, which is a cross-sectional view depicting a part of the frame 46 according to the first embodiment. FIG. 27 is a cross-sectional view depicting a part of the frame 346 according to the third embodiment, sectioned at the I3-I3 line indicated in FIG. 25, and corresponds to FIG. 10, which is a cross-sectional view depicting a part of the frame 46 according to the first embodiment. In FIG. 25, FIG. 26 and FIG. 27 depicting the third embodiment, a reference sign of each composing element starts with "3" which is added to the beginning of each reference sign according to the first embodiment. For example, the developing frame 44 according to the first embodiment is the developing frame 344 according to the third embodiment. In the following, description on a portion the same as the frame 46 according to the first embodiment will be omitted.

Characteristics of the frame 346 according to the third embodiment will be described. In the frame 346 according to the third embodiment, a region where the conductive sheet 343 and the output conductive path 345 do not overlap with each other is disposed when viewed in the thickness direction of the frame 346 (direction indicated by "V"), as illustrated in the cross-sectional views of the frame 346 in FIG. 25 and FIG. 27. In concrete terms, in the boundary portion 345e on the right side of the conductive portion 345a, the boundary portion 345e has a region 345e1 which does not overlap with the conductive sheet 343 when viewed in the thickness direction of the frame 346, as illustrated in FIG. 27. Then the uneven fitting portion 345g is disposed in the region 345e1. Further, a part of the uneven fitting portion 345g is disposed in the region 345e1 which does not overlap with the conductive sheet 343 when viewed in the thickness direction of the frame 346, as illustrated in FIG. 25.

In this configuration, a region which does not overlap with the conductive sheet 343 may exist in a part of the region where the uneven fitting portion 345g is disposed when viewed in the thickness direction of the frame 346.

By this configuration as well, the frame 346 according to the third embodiment can have an adhesive force in the shrinking direction F (not illustrated in FIG. 25) due to the shrinkage of the resin of the output conductive path 345, and as a result, the effect of blocking the leakage path of the developer by the uneven fitting portion 345g can be implemented.

Thus according to the third embodiment as well, a probability of the developer leaking out of the developer container 364 to the outside can be reduced, and a probability of the exterior of the process cartridge 302 and the inside of the printer 301 being contaminated by the developer can be reduced. Furthermore, a probability of the hands of the user becoming soiled by the developer when attaching or detaching the developer container 364 or the process cartridge 302 can be reduced.

Fourth Embodiment

The fourth embodiment will be described with reference to FIG. 28 to FIG. 34.

Figure 28:
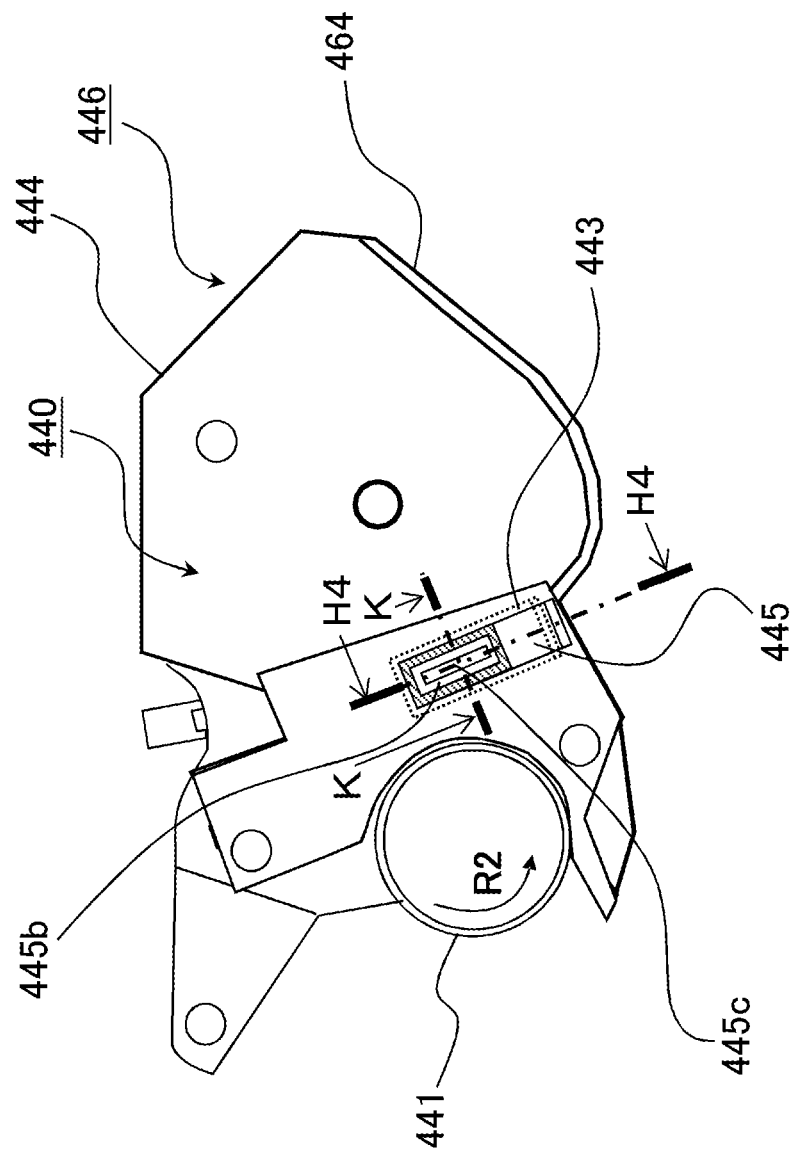
FIG. 28 is a side view depicting a developing apparatus according to a fourth embodiment.
Figure 29:
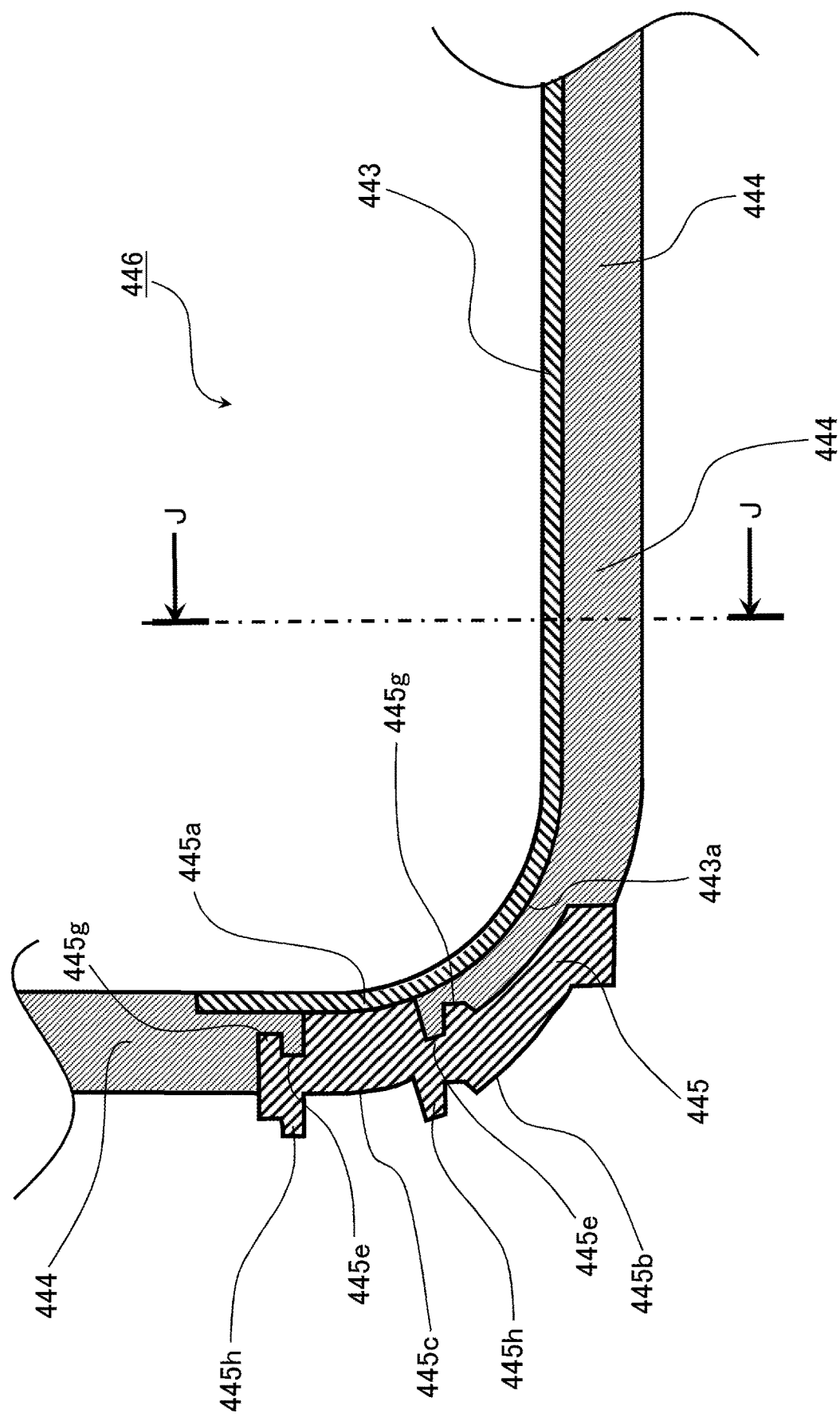
FIG. 29 is a cross-sectional view depicting a part of the frame according to the fourth embodiment.
Figure 30:
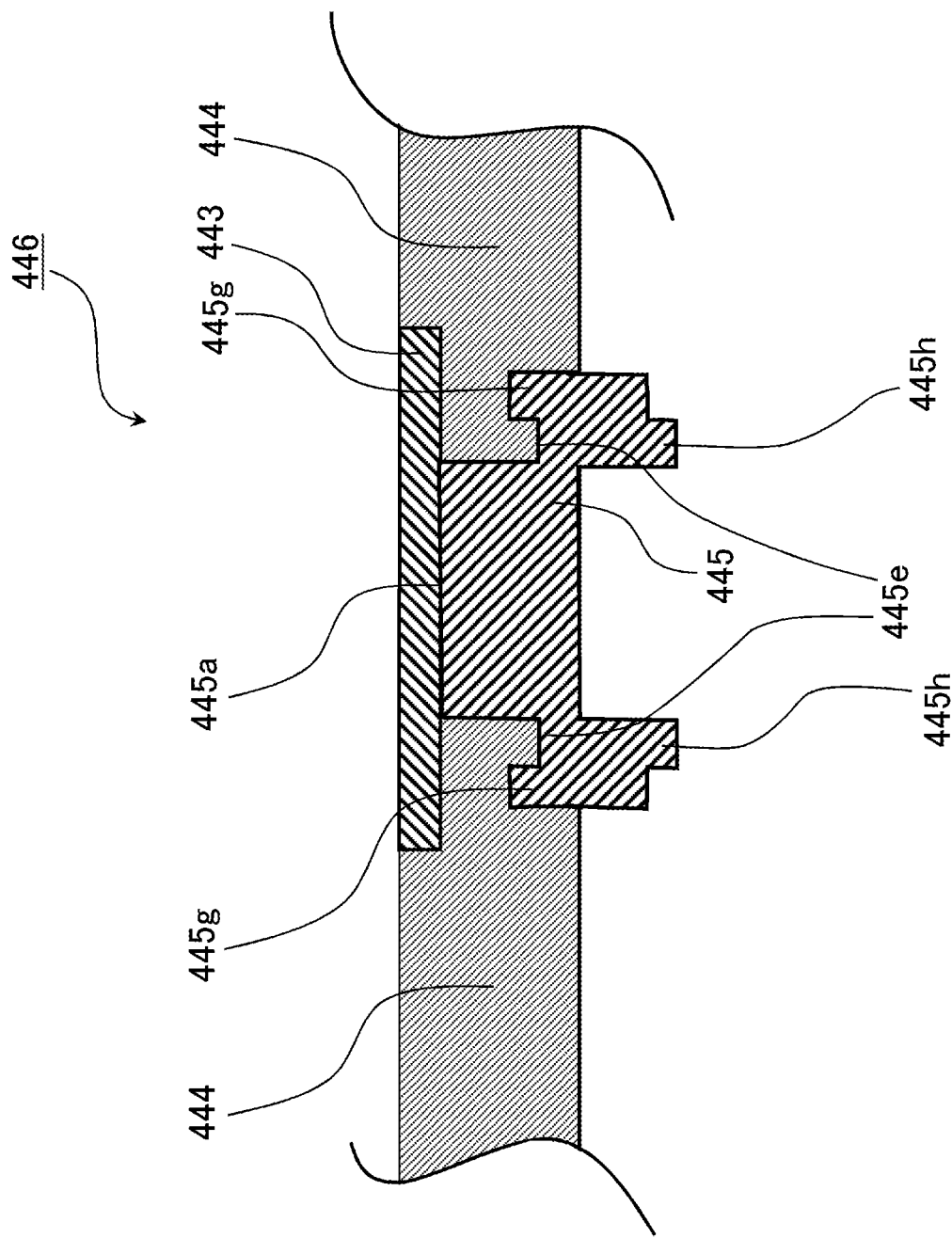
FIG. 30 is a cross-sectional view depicting a part of the frame according to the fourth embodiment.
Figure 31:
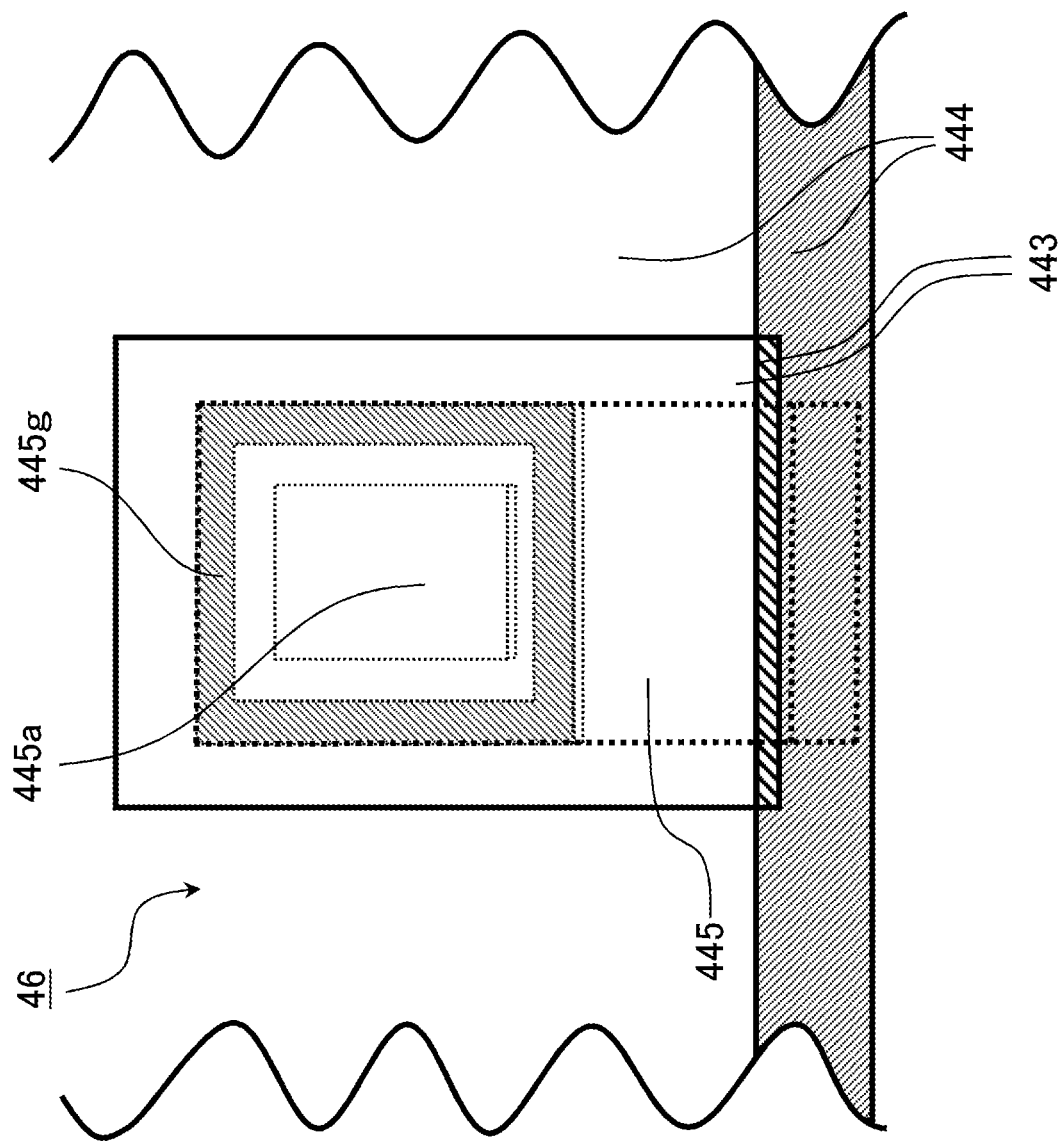
FIG. 31 is a cross-sectional view depicting a part of the frame according to the fourth embodiment.
Figure 32:
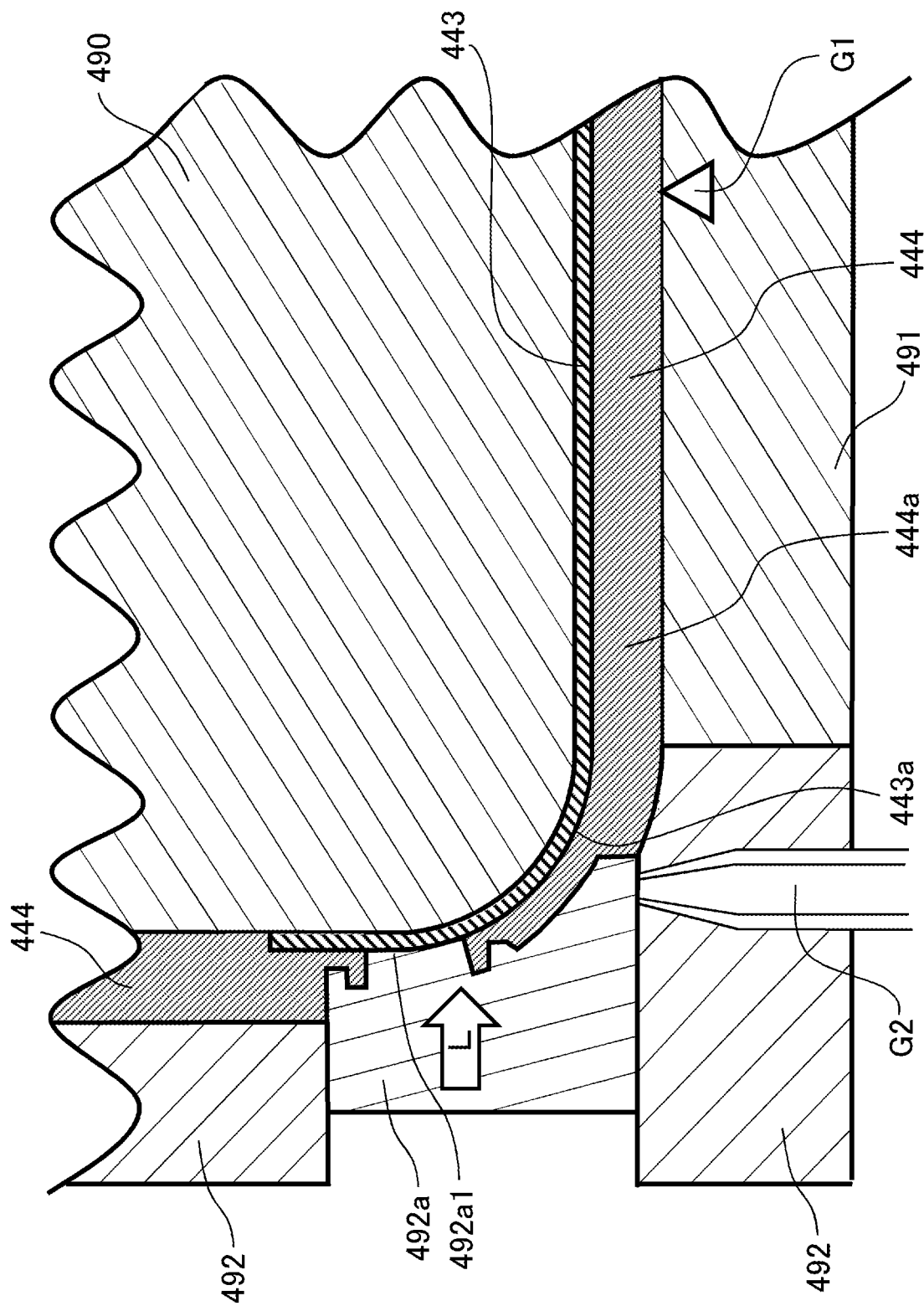
FIG. 32 is a cross-sectional view depicting a step of manufacturing the frame according to the fourth embodiment.
Figure 33:
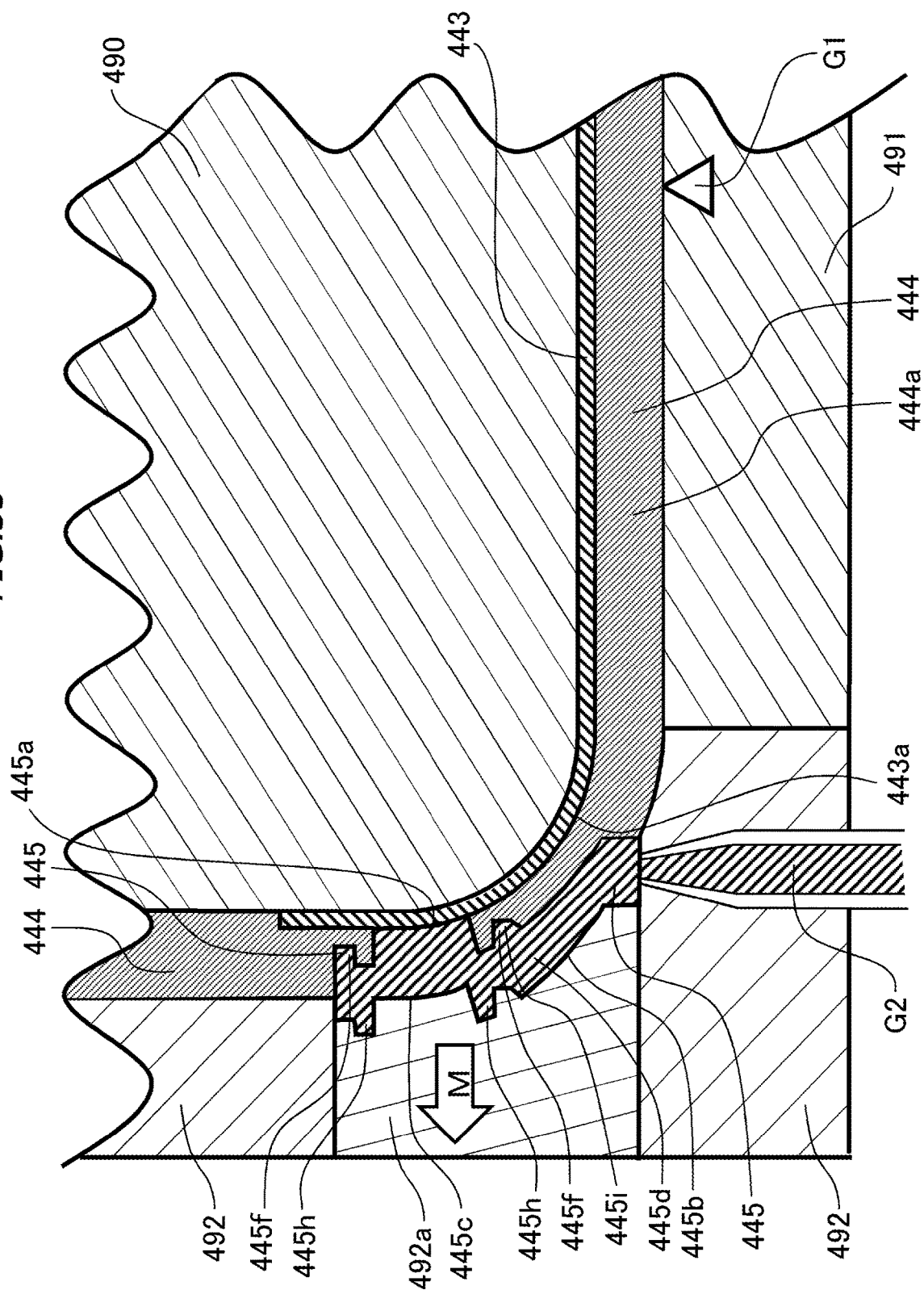
FIG. 33 is a cross-sectional view depicting a step of manufacturing the frame according to the fourth embodiment.
Figure 34:
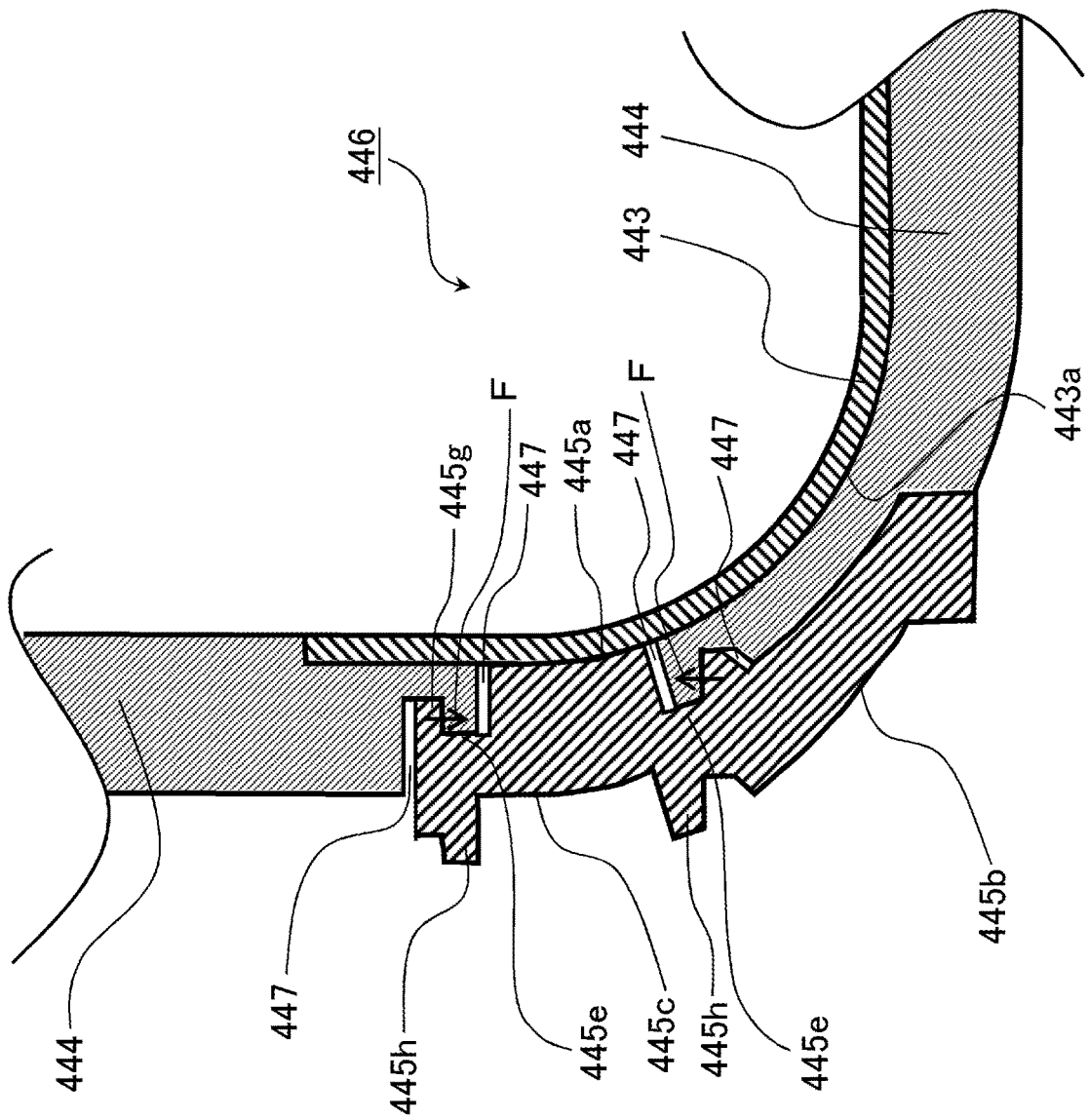
FIG. 34 is a cross-sectional view depicting a part of the frame according to the fourth embodiment and the effect thereof.

FIG. 28 is a side view of a developing apparatus 440 according to the fourth embodiment, and corresponds to FIG. 4, which is a side view of the developing apparatus 40 according to the first embodiment. FIG. 29 is a cross-sectional view depicting a part of the frame 446 according to the fourth embodiment, sectioned at the H4-H4 line indicated in FIG. 28. FIG. 30 is a cross-sectional view depicting a part of the frame 446 according to the fourth embodiment, sectioned at the K-K line indicated in FIG. 28. FIG. 31 is a cross-sectional view depicting a part of the frame 446 according to the fourth embodiment, sectioned at the J-J line in FIG. 29. FIG. 32 is a cross-sectional view depicting steps of manufacturing the frame 446 according to the fourth embodiment, sectioned at the H4-H4 line indicated in FIG. 28, just like FIG. 29, and corresponds to FIG. 11, which is a cross-sectional view depicting steps of manufacturing the frame 46 according to the first embodiment. FIG. 33 is a cross-sectional view depicting steps of manufacturing the frame 446 according to the fourth embodiment, sectioned at the H4-H4 line indicated in FIG. 28, just like FIG. 29, and corresponds to FIG. 12, which is a cross-sectional view depicting steps of manufacturing the frame 46 according to the first embodiment. FIG. 34 is a cross-sectional view depicting a part of the frame 446 according to the fourth embodiment, and the effect thereof. FIG. 34 is a cross-section at the H4-H4 line in FIG. 28, just like FIG. 29. FIG. 34 is an enlarged view of the left side of FIG. 29, and corresponds to FIG. 13, which is a cross-sectional view depicting a part of the frame 46 according to the first embodiment, and the effect thereof. In FIG. 28 to FIG. 34 depicting the fourth embodiment, a reference sign of each composing element starts with "4", which is added to the beginning of each reference sign according to the first embodiment. For example, the developing frame 44 according to the first embodiment is the developing frame 444 according to the fourth embodiment. In the following, description on a portion the same as the frame 46 according to the first embodiment is omitted.

The manufacturing method of the frame 446 according to the fourth embodiment will be described next. The first step of the manufacturing method of the frame 446 will be described with reference to FIG. 32, and the second step thereof will be described with reference to FIG. 33. The manufacturing method of the frame 446 according to the fourth embodiment will be described with reference to FIG. 32 and FIG. 33, while comparing with FIG. 11 and FIG. 12 used for describing the first step and the second step of the manufacturing method of the frame 46 according to the first embodiment.

In the manufacturing method of the frame 446 according to the fourth embodiment, as illustrated in FIG. 32 and FIG. 33, a sliding piece 492a is disposed in a part of a slide mold 492. In the slide mold 492, the sliding piece 492a can move independently from the other portion than the sliding piece 492a. In the first step and the second step, the developing frame 444 and the output conductive path 445 are molded using a mold 490, a mold 491 and the slide mold 492.

In the first step, as illustrated in FIG. 32, a part of the sliding piece 492a is moved in the arrow L direction, which is an entry direction of the sliding piece 492a, so that a sheet contact portion 492a1 of the sliding piece 492a contacts the conductive sheet 443. Then in the state of the part of the sliding piece 492a contacting with the conductive sheet 443, the first resin, which is a PS type molten resin, is injected via the injection portion G1, into the space created by the mold 491, the slide mold 492 and the conductive sheet 443. In this way, the first resin portion 444a is injection-molded, and the developing frame 444 is formed, whereby the developing frame 444 and the conductive sheet 443 are integrally insert-molded.

Then in the second step, the sliding piece 492a is retracted in the arrow M direction (opposite direction of arrow L direction), which is the retracting direction of the sliding piece 492a. Then, into a space created by the retraction of the sliding piece 492a (space created by the slide mold 492, the conductive sheet 443 and the developing frame 444), the second resin, which is a conductive resin, is injected via the injection portion G2 disposed in the slide mold 492. Here in this manufacturing step, in order to form the shapes of a protruding portion 445i and the like, the sliding piece 492a is retracted in the arrow M direction to transfer these shapes, hence an external protrusion 445h is formed in the exposed portion 445b in the output conductive path 445, as illustrated in FIG. 33. Thus the second resin portion 445d is injection-molded, and the output conductive path 445 is formed, whereby the output conductive path 445 and the developing frame 444 are integrally outsert-molded.

Further, in the frame 446 according to the fourth embodiment, as illustrated in FIG. 28 to FIG. 31, the uneven fitting portion 445g is disposed all around the conductive portion 445a. In other words, the uneven fitting portion 445g is disposed so as to completely surround the conductive portion 445a.

By using this manufacturing method, the configuration of the frame 446 according to the fourth embodiment, as illustrated in FIG. 28 to FIG. 31, is implemented, although detailed description thereof is omitted. In this way, in the frame 446 according to the fourth embodiment, the resin of the output conductive path 445 in the uneven fitting portion 445g shrinks in the shrinking direction F, as illustrated in FIG. 34. As a result, the adhesive force between the developing frame 444 and the output conductive path 445 can be ensured, and the effect of blocking the leakage path of the developer can be implemented.

Thus according to the fourth embodiment as well, a probability of the developer leaking out of the developer container 464 to the outside can be reduced, and a probability of the exterior of the process cartridge 402 and the inside of the printer 401 being contaminated by the developer can be reduced. Furthermore, a probability of the hands of the user becoming soiled by the developer when attaching or detaching the developer container 464 or the process cartridge 402 can be reduced.

Modifications of the fourth embodiment will be described next with reference to FIG. 35 and FIG. 36.

Figure 35:
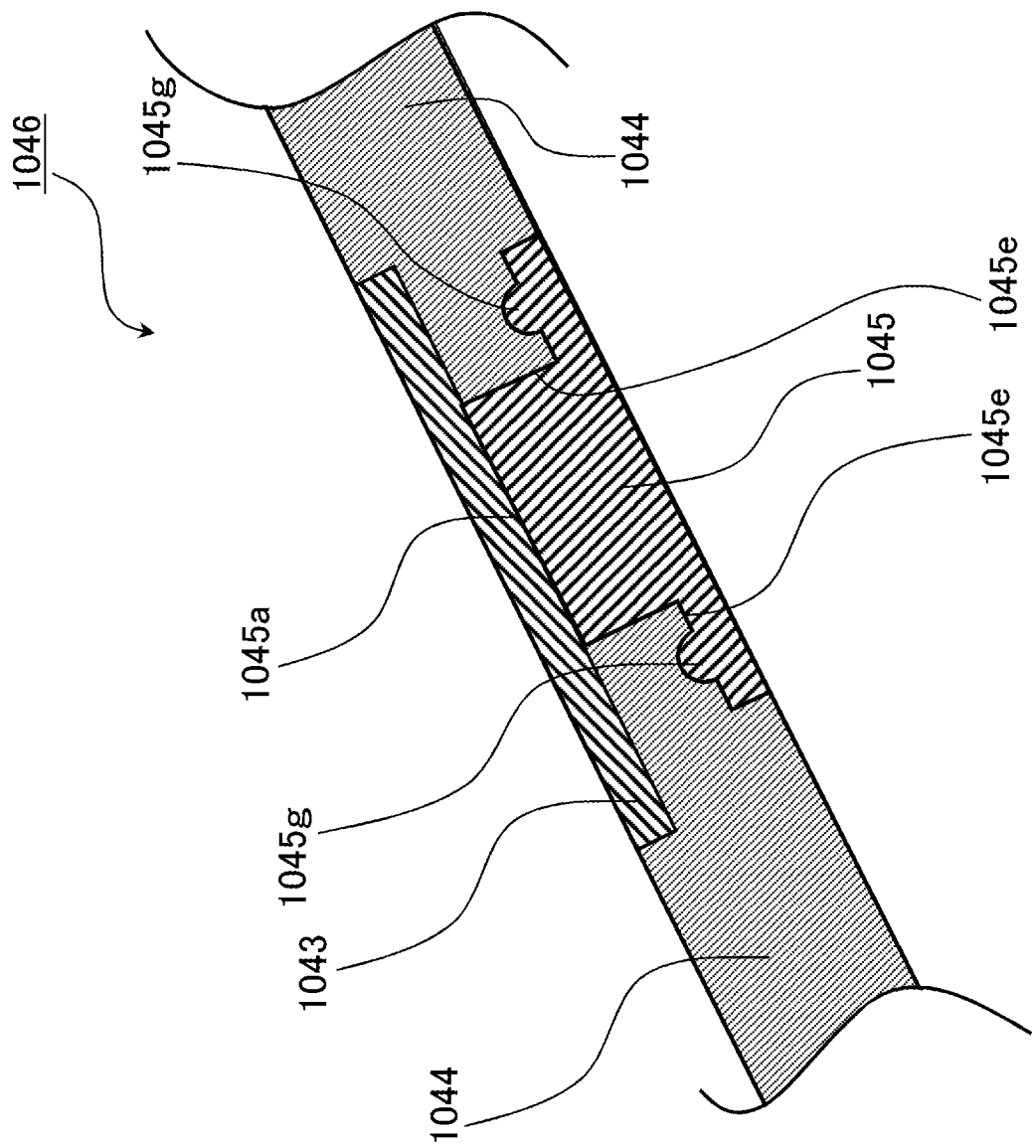
FIG. 35 is a cross-sectional view depicting a part of a frame according to Modification 1.

FIG. 35 is a cross-sectional view depicting a part of the frame 1046 according to Modification 1, and corresponds to FIG. 10, which is a cross-sectional view depicting a part of the frame 46 according to the first embodiment. In FIG. 35, a reference sign of each composing element starts with "10" which is added to the beginning of each reference sign according to the first embodiment. For example, the developing frame 44 according to the first embodiment is the developing frame 1044 in FIG. 35.

Figure 36:
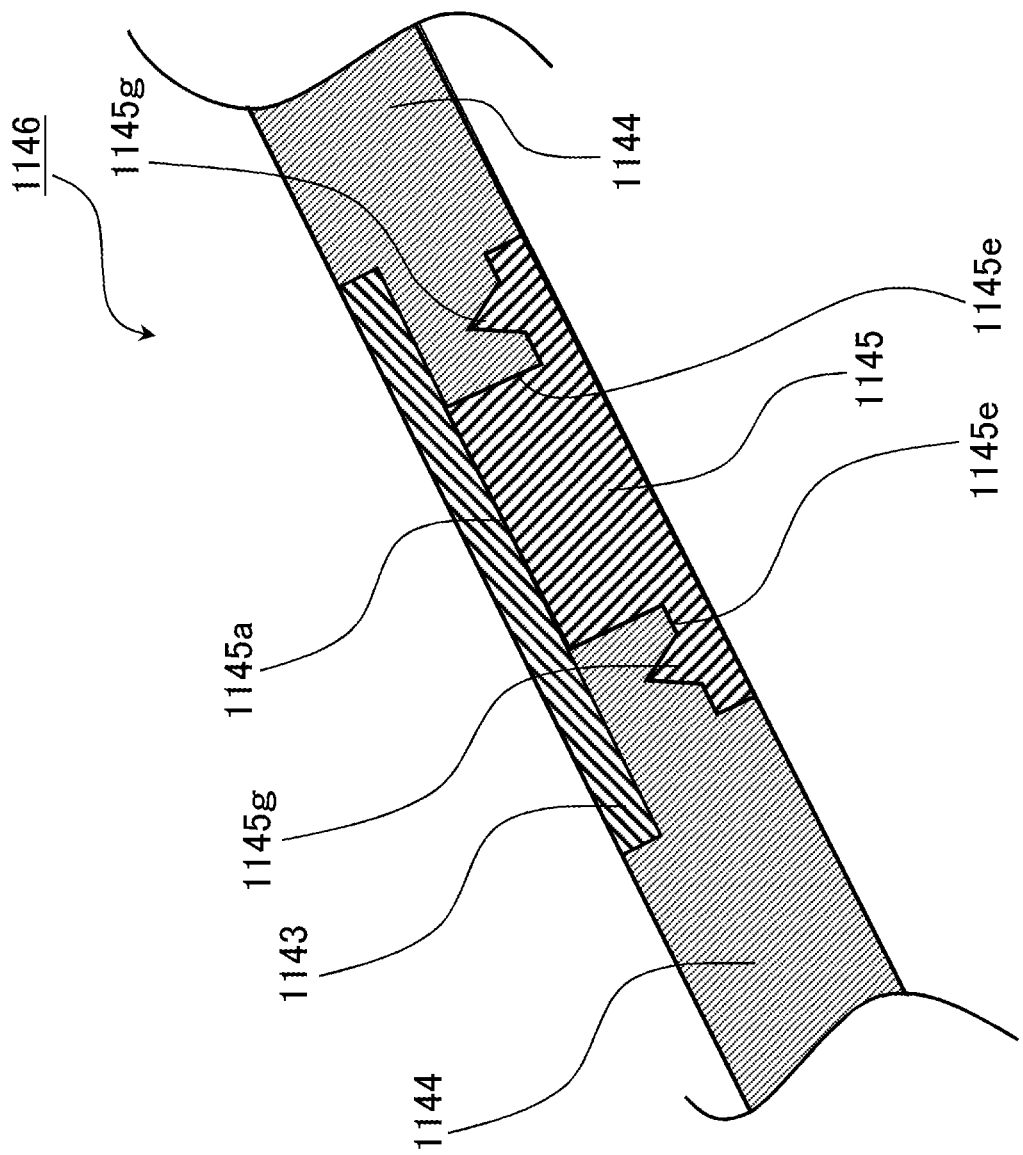
FIG. 36 is a cross-sectional view depicting a part of a frame according to Modification 2.

FIG. 36 is a cross-sectional view depicting a part of a frame 1146 according to Modification 2, which is different from the frame 1046, and corresponds to FIG. 10, which is a cross-sectional view depicting a part of the frame 46 according to the first embodiment. In FIG. 36, a reference sign of each composing element starts with "11" which is added to the beginning of each reference sign according to the first embodiment. For example, the developing frame 44 according to the first embodiment is the developing frame 1144 in FIG. 36.

In the frame 1046 according to Modification 1, the cross-section of the uneven fitting portion 1045g, sectioned by a plane that is parallel with the direction intersecting the joining surface of the conductive portion 1045a, may have a circular arc configuration, as illustrated in FIG. 35. In the frame 1146 according to Modification 2, the cross-section of the uneven fitting portion 1145g, sectioned by a plane that is parallel with the direction intersecting the joining surface of the conductive portion 1145a, has a tapered configuration, as illustrated in FIG. 36. By these uneven fitting portions 1045g and 1145g as well, a leakage path of the developer that may be generated at the joining portion between the developing frame 1044 and the output conductive path 1045, or between the developing frame 1144 and the output conductive path 1145, can be blocked.

Figure 37:
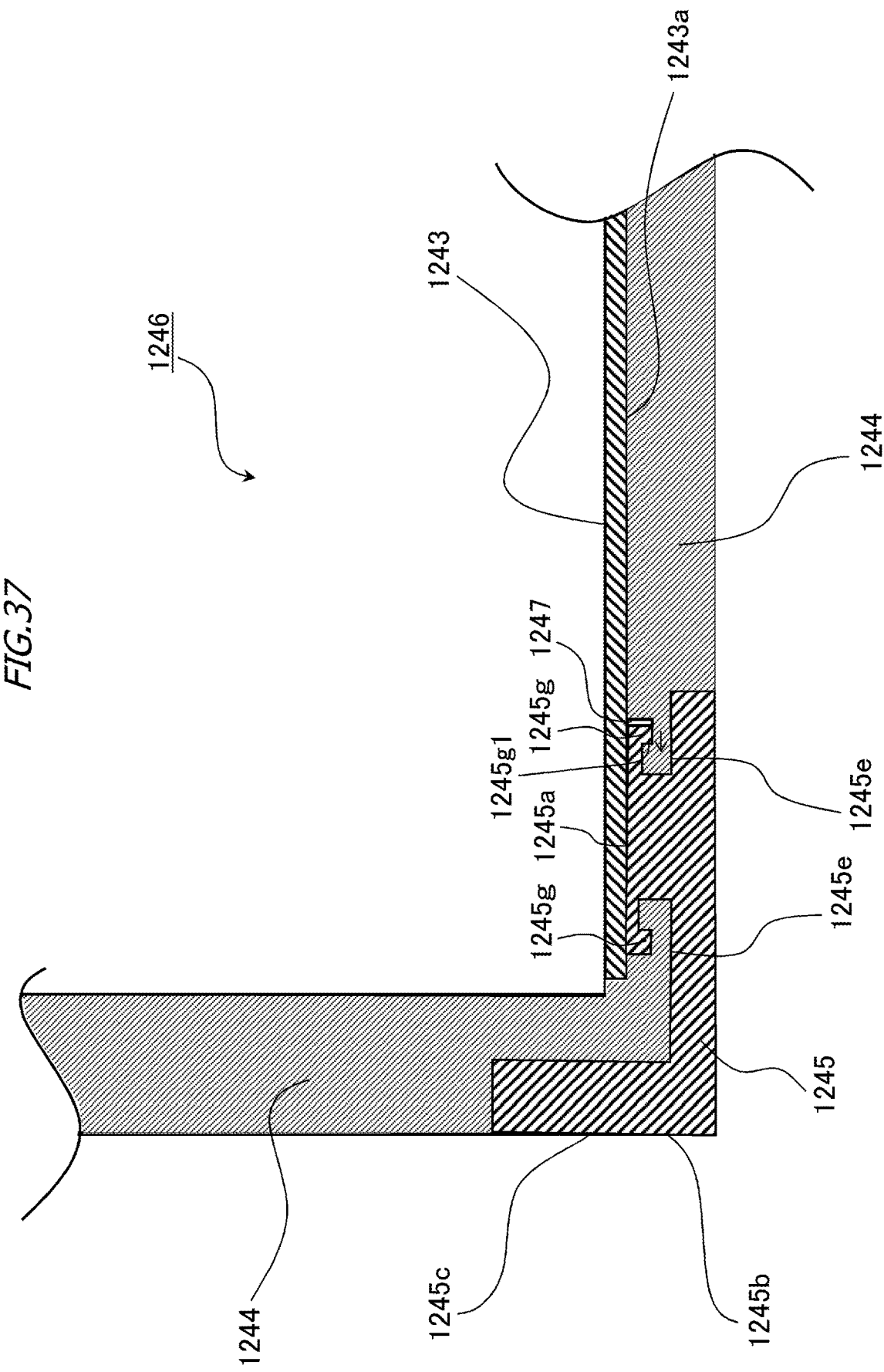
FIG. 37 is a cross-sectional view depicting a part of a frame according to Modification 3.

FIG. 37 is a cross-sectional view depicting a part of a frame 1246 according to Modification 3, and corresponds to FIG. 10, which is a cross-sectional view depicting a part of the frame 46 according to the first embodiment. In FIG. 37, a reference sign of each composing element starts with "12" which is added to the beginning of each reference sign according to the first embodiment. For example, the developing frame 44 according to the first embodiment is the developing frame 1244 in FIG. 37.

In the frame 1246 according to Modification 3, the relationship of the concave and convex parts between the developing frame 1244 and the output conductive path 1245 in the uneven fitting portion 1245g is the opposite that of the relationship of the developing frame 44 and the output conductive path 45 in the uneven fitting portion 45g of the frame 46 according to the first embodiment. In this uneven fitting portion 1245g of the frame 1246 as well, when a gap 1247 is generated due to the shrinkage of the resin of the output conductive path 45 in the arrow direction in FIG. 37, the shrinking resin contacts the contact face 1245g1 of the uneven fitting portion 1245g. As a result, a leakage path of the developer that may be generated between the developing frame 1244 and the output conductive path 1245 can be blocked.

In each example, it is not always necessary for one surface of the conductive sheet to entirely adhere to the inner wall face of the frame.

In each example, it is not always necessary for the other surface of the conductive sheet to be entirely exposed to the frame.

Further, in each example, the shapes of the developing frame and the output conductive path are not limited to the shapes described in each example.

According to the present invention, a technique to reduce a probability of the toner leaking out of the developer container can be provided for the developer container, which can detect the residual amount of toner in the developer container.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-071758, filed on Apr. 3, 2018, which is hereby incorporated by reference herein in its entirety.

What is claimed is:

1. A developer container comprising:
    an accommodating portion which includes a first frame formed of a first resin and a second frame formed of a second resin having conductivity and is configured to accommodate a developer; and
    a conductive sheet having conductivity,
    wherein the conductive sheet is disposed on an inner wall face of the accommodating portion,
    the second frame has a joining surface for joining the second frame to the conductive sheet,
    the first frame and the second frame share an uneven fitting portion where the first frame and the second frame fit with each other in a direction of intersecting the joining surface,
    the uneven fitting portion has a contact face where the first frame and the second frame are being in contact with each other,
    a gap is formed by the first frame, the second frame and the conductive sheet, and
    the contact face is a face facing the gap and being disposed in a direction along the joining surface.

2. The developer container according to claim 1,
    wherein the uneven fitting portion is formed by a boundary portion between the first frame and the second frame, and
    the contact face is a face which the first frame and the second frame respectively have at the boundary portion.

3. The developer container according to claim 1,
    wherein the joining surface is disposed at an inner side of the conductive sheet when viewed in a normal direction of the joining surface, and
    the uneven fitting portion is disposed along a shorter side of the conductive sheet on a side where the joining surface is disposed in a longitudinal direction of the conductive sheet.

4. The developer container according to claim 1,
    wherein the uneven fitting portion includes a portion configured to fit with the joining surface on one side in the direction along the joining surface, and a portion configured to fit with the joining surface on the other side, which is on an opposite side of the one side, when viewed in a normal direction of the joining surface.

5. The developer container according to claim 1,
    wherein the contact face is a face located more distant from the gap, out of two surfaces of the uneven fitting portion facing the gap, in a direction where the gap and the two surfaces are disposed.

6. The developer container according to claim 1,
    wherein a region in which an injection amount of the second resin is more than the injection amount of the second resin to the uneven fitting portion is disposed at a position where the contact face of the first frame is sandwiched between the region and the uneven fitting portion when viewed in a normal direction of the joining surface.

7. The developer container according to claim 1,
    wherein the uneven fitting portion is formed so as to surround an entire circumference of the joining surface, when viewed in a normal direction of the joining surface.

8. The developer container according to claim 1, wherein the uneven fitting portion is formed in a region where at least a part of the uneven fitting portion overlaps with the conductive sheet, when viewed in a normal direction of the joining surface.

9. The developer container according to claim 1, wherein a cross-section of the uneven fitting portion sectioned by a plane parallel with the direction intersecting the joining surface has a circular arc configuration.

10. The developer container according to claim 1, wherein a cross-section of the uneven fitting portion sectioned by a plane parallel with the direction intersecting the joining surface has a tapered configuration.

11. A developer comprising:
the developer container according to claim 1,
wherein an electrostatic latent image formed on an image bearing member is developed using the developer accommodated in the accommodating portion.

12. A process cartridge which is detachable from a main body of an image forming apparatus, comprising:
the developer container according to claim 1; and
an image bearing member on which a developer image is to be formed,
wherein the developer image is formed on the image bearing member using the developer accommodated in the accommodating portion.

13. An image forming apparatus, comprising:
the developer container according to claim 1; and
an image bearing member on which a developer image is to be formed,
wherein a developer image is formed on the image bearing member using the developer accommodated in the accommodating portion, and
an image is formed on a recording medium using the developer image formed on the image bearing member.

14. A manufacturing method of a developer container that includes an accommodating portion, the accommodating portion including a first frame formed of a first resin and a second frame formed of a second resin having conductivity and being configured to accommodate a developer, and a conductive sheet having conductivity, the manufacturing method comprising:
forming the first frame integrally with the conductive sheet by injecting the first resin into a mold in which the conductive sheet is fixed; and
forming the second frame integrally with the conductive sheet and the first frame by injecting the second resin into a mold in which the conductive sheet and the first frame are fixed,
wherein the second frame has a joining surface for joining the second frame to the conductive sheet,
the first frame and the second frame share an uneven fitting portion where the first frame and the second frame fit with each other in a direction of intersecting the joining surface,
the uneven fitting portion has a contact face where the first frame and the second frame contact with each other,
a gap is formed by the first frame, the second frame and the conductive sheet,
the contact face is a face facing the gap which is disposed in a direction along the joining surface, and
in the forming the second frame, the second resin is injected into the uneven fitting portion, and the injected second resin shrinks toward the contact face.

* * * * *